United States Patent Office 3,646,027
Patented Feb. 29, 1972

3,646,027
1-SUBSTITUTED-NITROIMIDAZOL-2-YL-
ALKYL CARBAMATES
John A. Carlson, Delmar, N.Y., Dale R. Hoff, Basking Ridge, N.J., and Clarence S. Rooney, Beaconsfield, Quebec, Canada, assignors to Merck & Co., Inc., Rahway, N.J.
No Drawing. Continuation-in-part of application Ser. No. 550,932, May 18, 1966, which is a continuation-in-part of application Ser. No. 470,239, July 7, 1965. This application Sept. 5, 1969, Ser. No. 855,765
Int. Cl. C07d 49/36, 87/36
U.S. Cl. 260—247.2 B            14 Claims

ABSTRACT OF THE DISCLOSURE 1-substituted-5-nitroimidazol-2-yl-alkyl carbamates and acid addition salts thereof are prepared from 1-substituted-5-nitroimidazoles having at the 2-position of the imidazole ring an hydroxyalkyl, mercaptoalkyl, alkylsulfonyloxyalkyl, alkarylsulfonyloxyalkyl, haloalkyl, halocarbonylalkyl or halothiocarbonyloxyalkyl radical. The 1-substituted-5-nitroimidazol-2-yl-alkyl carbamates are useful in the treatment of parasitic diseases. Antiparasitic compositions in which the active ingredient is a 1-substituted-imidazole-2-yl-alkyl carbamate are also provided.

CROSS REFERENCE TO RELATED APPLICATIONS

This application is a continuation-in-part of our copending application S.N. 550,932 filed May 18, 1966, now abandoned which, in turn, is a continuation-in-part of application S.N. 470,239 filed July 7, 1965 and now abandoned.

DESCRIPTION OF THE PREFERRED EMBODIMENTS

This invention relates to new chemical compounds. More particularly, it relates to novel imidazole carbamates. It is concerned further with chemical synthesis of such substances and with novel imidazole compounds useful as intermediates in such synthesis. In addition, it is concerned with antiparasitic compositions containing the imidazole carbamates of this invention as active ingredients.

One object of this invention is to provide new and useful 1-substituted-imidazole-2-yl-alkyl carbamates, N-substituted carbamates and acid addition salts thereof. It is also an object to provide 1-substituted-5-nitroimidazol-2-yl-alkyl N-substituted carbamates which have antiparasitic activity. Another object is to provide methods for making these compounds from 1-substituted-5-nitroimidazoles having at the 2-position of the imidazole ring, a hydroxyalkyl, mercaptoalkyl, alkylsulfonyloxyalkyl, alkarylsulfonyloxyalkyl, haloalkyl, halocarbonyloxyalkyl, or halothiocarbonyloxyalkyl radical.

A further object is to provide compositions useful against parasitic diseases, for example, trichomoniasis, enterohepatitis and as antihelminthic compositions against ascarids and schistosomes. Certain of them are also effective against ameobiasis and trypanosomiasis as well as chronic respiratory diseases in fowl and swine caused by PPLO organisms. Certain of the compositions of the present invention also show antibacterial activity. In these compositions, 1-substituted-5-nitroimidazol-2-yl-alkyl carbamates are present as active ingredients.

A further object is to provide novel chemical compounds which are intermediates in the synthesis of 1-substituted - 5 - nitroimidazol-2-yl-alkyl carbamates and which in some instances have antirichomonal and other antiparasitic activity. Other objects will become clear from the following detailed description of the invention.

The novel imidazole carbamates of this invention may be represented by the following structural formulae:

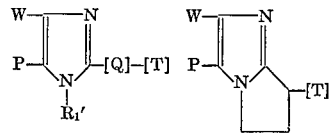

wherein $R_1'$ is $R_1$ or hydroxyalkyl and $R_1$ is alkyl, suitably loweralkyl, such as, methyl, ethyl, propyl, butyl or pentyl, or the substituted derivatives thereof. The substituent groups on the alkyl group may be aryl or substituted aryl, such as phenyl, fluorophenyl or nitrophenyl; oxo; alkenyl such as ethenyl, propenyl and butenyl and hydroxy; alkanoyloxy, suitably loweralkanoyloxy, for example, acetoxy, propionoxy, butyryloxy, or valeryloxy; benzoyloxy; alkoxy, suitably loweralkoxy, such as methoxy, propoxy, or butoxy; aralkoxy, such as phenylloweralkoxy, suitably, benzyloxy; carboxy; carboalkoxy, such as, carboloweralkoxy, preferably, carbomethoxy, carboethoxy and carbopropoxy; carbamoyl and N-substituted carbamoyl, wherein the N-substituents are alkyl, aralkyl and aryl, suitably loweralkyl, such as, methyl, propyl, butyl and pentyl, phenylloweralkyl, such as benzyl and phenyl; cyano; substituted thio, substituted sulfinyl and substituted sulfonyl, wherein the substituent groups are alkyl, aralkyl, and aryl, suitably loweralkyl, such as ethyl, propyl and butyl, phenylloweralkyl, such as benzyl or phenyl, and carbamoyloxy.

W represents nitro, cyano, phenyl or hydrogen and P represents hydrogen or nitro, provided that only one of the groups W and P is nitro at any one time.

Q is selected from the group consisting of alkylene, such as, loweralkylene suitably methylene, propylene, butylene and ethylene; alkylidene such as loweralkylidene suitably ethylidene, propylidene and butylidene; propenylene and aralkylidene suitably phenylloweralkylidene, for example phenylmethylene.

T is selected from the group consisting of carbamoyloxy, carbamoylthio, thioncarbamoyloxy, thiocarbamoylthio, pseudo-ureido, pseudo-thioureido, and the N-substituted and N,N-disubstituted derivatives thereof. The group T may be represented by the substructure

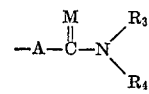

M is oxygen, sulfur, imino or alkylimino.
A is oxygen or sulfur.

The N-substituents of the group T designated as $R_3$ and $R_4$ include the following: hydrogen; alkyl, suitably loweralkyl, such as, methyl, ethyl, propyl or butyl, or substituted alkyl, wherein the substituents of the alkyl group may be: hydroxy; (halo, hydroxy) or (polyhalo, hydroxy), such as (trichloro, hydroxy), (trifluoro, hydroxy) and (tribromo, hydroxy); alkoxy, suitably loweralkoxy, such as methoxy, propoxy, or butoxy; oxo; (aryl, oxo), such as (phenyl, oxo); carboxy; carboalkoxy, suitably carboloweralkoxy such as, carbomethoxy, carboethoxy and carbopropoxy; carboaralkoxy, such as, carbophenyl-loweralkoxy, suitably carbophenylacetoxy; carbamoyl; alkanoyloxy such as, loweralkanoyloxy, suitably acetoxy, propionoxy or butyroxy; aralkanoyloxy, for example, phenylloweralkanoyloxy, such as, benzoyloxy; carbamoyl, or sulfamoyl and the N-substituted derivatives thereof wherein the N-substituents may be: N-alkyl, suitably N-loweralkyl, such as, N-methyl, N-propyl, N-pentyl, N-aryl, such as N-phenyl or N-aralkyl such as N-phenylloweralkyl, such as N-benzyl; mercapto and substtuted mercapto wherein the substituents may be: alkyl, such as, loweralkyl, for example, methyl, ethyl, and propyl and aralkyl, suitably phenylloweralkyl, such as benzyl; thioncarbamoyl; substituted thiocarbamoylthio, wherein the substituents may be: N,N-dialkyl, such as N,N-dimethyl, N,N-diethyl, N,N-dipropyl, N,N-diaralkyl, such as N,N-di(phenylloweralkyl), suitably N,N-dibenzyl; amino; or substituted amino, wherein the substituents may be: alkyl, suitably diloweralkyl, such as dimethyl, dibutyl, dipentyl or diaralkyl, such as di(phenylloweralkyl), suitably dibenzyl; heterocycloalkyl, wherein the ring contains at least one nitrogen atom, bonded to the alkyl group, suitably a 4- or 5-membered saturated heterocycloalkyl, for example, morpholino, thiamorpholino, piperidino, piperazino, 4-methyl-piperazino, imidazolidino, and pyrrolidino; phenyl, and substituted phenyl such as nitrophenyl, chlorophenyl or fluorophenyl; substituted alkylidene, wherein suitable substituents may be: alkoxy, preferably loweralkoxy, such as, methoxy, butoxy and pentoxy; aralkoxy, suitably phenylloweralkoxy such as, benzoxy and aroxy, for example, phenoxy, substituted amino, wherein the substituents may be dialkyl, such as, diloweralkyl, such as, dimethyl, dipropyl or dipentyl; diaralkyl, for example di(phenylloweralkyl), suitably dibenzyl; substituted alkenylene wherein suitable substituents may be (carboalkoxy, alkyl), such as (carboloweralkoxy, loweralkyl), suitably (carbomethoxy, methyl); N,N-dialkyl-formiminium halide wherein the alkyl groups may be loweralkyl, such as, methyl, ethyl or propyl; acyl, for example, alkanoyl, suitably lower alkanoyl, such as, formyl, acetyl, propionyl, butyryl, or valeryl; aralkanoyl, suitably phenylloweralkanoyl, such as phenylacetyl; cyanoalkanoyl, suitably cyanoloweralkanoyl, such as cyanoacetyl or cyanopropionyl; alkenoyl, suitably loweralkenoyl, such as acryloyl or crotonyl; and aroyl, such as benzoyl; hydroxy and substituted hydroxy, wherein the substituents are: acyl, such as alkanoyl, suitably lower alkanoyl, such as, formyl, acetyl, propionyl, butyryl, or valeryl, aralkanoyl, suitably phenylloweralkanoyl, such as, phenylacetyl; cyanoalkanoyl, suitably cyanoloweralkanoyl, such as cyanoacetyl or cyanopropionyl; alkenoyl, suitably loweralkenoyl, such as acryloyl or crotonyl; and aroyl, such as benzoyl; alkyl, suitably loweralkyl, for example, methyl, ethyl, butyl and pentyl; aralkyl, such as, phenylloweralkyl, suitably benzyl and aryl, for example, phenyl; carbamoyl and N-substituted carbamoyl wherein the substitutents may be: alkyl, suitably loweralkyl, for example, methyl, ethyl, butyl and pentyl; aralkyl, such as phenylloweralkyl, suitably benzyl and aryl, for example, phenyl; thiocarbamoyl and substituted thiocarbamoyl, wherein the preferred substituents are: alkyl, suitably loweralkyl, for example, methyl, ethyl, butyl and pentyl; aralkyl, such as phenylloweralkyl, suitably benzyl and aryl, for example, phenyl; heterocycloalkylcarbonyl, wherein the heterocycloalkyl ring contains at least one nitrogen atom bonded to the carbonyl group, suitably a 6- or 5-membered saturated heterocycloalkyl, for example, morpholino, thiamorpholino, piperidino, piperazino, 4-methylpiperazino and pyrrolidino; nitro; amino and substituted amino, wherein the preferred substituents are:

Carbamoyl and thiocarbamoyl; alkylidene, such as, loweralkylidene, isopropylidene, 2-butylidene, 3-pentylidene, and ethylidene; aralkylidene, for example, phenylloweralkylidene, such as benzylidene; acyl, for example, alkanoyl, suitably loweralkanoyl, such as, formyl, acetyl, propionyl, butyryl, or valeryl; aralkanoyl, suitably phenylloweralkanoyl, such as phenylbutyryl; cyanoalkanoyl, suitably cyanoloweralkanoyl, such as cyanoacetyl or cyano-propionyl; alkenoyl, suitably loweralkenoyl, such as, acryloyl or crotonoyl; and aroyl, such as benzoyl; sulfamoyl and diaminophosphoryl and the N-substituents thereof, wherein the preferred substituents are alkyl, suitably loweralkyl, such as methyl, ethyl, propyl and butyl; and aralkyl, suitably phenylloweralkyl, such as benzyl, also within the scope of the present invention are those compounds where T has the substructure

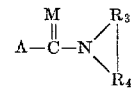

wherein A is oxygen or sulfur, M is oxygen, sulfur, imino or substituted imino and $R_3$ and $R_4$ together represent the group $—(CH_2)_2R_5—(CH_2)_2—$, where $R_5$ is oxygen, sulfur, $—CH_2—$ or $N—R_6$, and $R_6$ is hydrogen or loweralkyl, for example taken together with the N-atom to which $R_3$ and $R_4$ are attached, they represent morpholino, thiomorpholino, piperidino, 4-methylpiperazino or pyrrolino. Furthermore, within the scope of the present invention are those compounds wherein T has the substructure

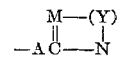

wherein A is oxygen or sulfur, M is $>N—$ and Y is alkylene suitably ethylene or propylene wherein the group

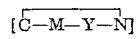

constitutes a nitrogenous heterocycloalkyl group.

Also within the purview of the invention are acid addition salts of these imidazole carbamates. The salt may be of an inorganic acid such as the hydrochloride, hydrobromide, phosphate, nitrate or sulfate, or of an organic acid, examples of which are the citrate, tartrate, adipate, methanesulfonate, p-toluenesulfonate, and the like. Non-toxic acid addition salts, i.e., those tolerated by the host at the dose levels employed, are employed when the carbamates are to be used in their salt form as antiparasitic agents.

The preferred compounds of this invention are the 1-substituted-5-nitroimidazol-2-yl-alkyl carbamates and substituted carbamates. More specifically, the preferred compounds are the imidazolylalkyl carbamates of the invention as shown in Formula I on page 2 supra, wherein W is hydrogen, P is nitro, Q is loweralkylene suitably methylene or ethylene, or loweralkylidene suitably 1-ethylidene, $R_1$ is alkyl or hydroxyalkyl such as methyl, ethyl or 2-hydroxyethyl and T is represented by the sub-group

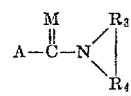

wherein A is oxygen or sulfur, M is oxygen or sulfur and $R_3$ and $R_4$ are each hydrogen, loweralkyl, hydroxy or loweralkanoyl, and $R_3$, $R_4$ and N taken together are heterocycloalkyl. These preferred embodiments will be discussed at more length than others in the description of the invention. The following explanations of processes apply to most substances embraced by the generic Formulae I and II. However, it should be understood that these processes do not constitute the preferred processes for certain N-substituted carbamates. The preferred processes for this latter class of N-substituted carbamates will be discussed below following the dicussion of the principal processes.

In accordance with the present invention, there are provided chemical syntheses of these novel imidazolylalkyl carbamates.

THE GENERAL PROCESSES (1) The isocyanate and isothiocyanate procedure

One method for making the carbamates is by the reaction of an appropriate isocyanate or isothiocyanate with a 1-substituted-2-hydroxyalkyl-5-nitroimidazole or 1-substituted-2-mercaptoalkyl-5-nitroimidazole:

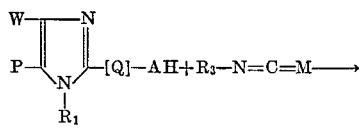

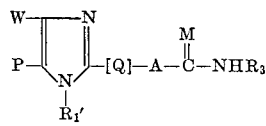

wherein W, P, Q, A, M, $R_1$, $R_1'$ and $R_3$ are as above.

In the preferred modification of this process, the significance of the substituents is as follows:

W is hydrogen;

P is nitro;

Q is loweralkylene suitably methylene or ethylene; or lower alkylidene suitably ethylidene;

$R_1$ is loweralkyl suitably methyl, ethyl or propyl or acyloxyalkyl, suitably loweralkanoyloxyalkyl, such as acetoxypropyl or valeroxyethyl, or aroyloxyalkyl such as benzoyloxyethyl or benzoyloxypropyl, $R_1'$ is $R_1$ or hydroxyalkyl such as hydroxyethyl or hydroxypropyl;

A and M each represent oxygen or sulfur;

$R_3$ represents hydrogen, alkyl, suitably loweralkyl, such as methyl, ethyl or propyl; aryl, such as phenyl; aralkyl, suitably arylloweralkyl, such as benzyl; alkoxyalkyl, suitably loweralkoxyloweralkyl, such as ethoxyethyl or ethoxypropyl; haloalkyl suitably haloloweralkyl, such as chloroethyl, bromoethyl, or trifluoropropyl; substituted sulfonyl, for example halosulfonyl, such as chlorosulfonyl or bromosulfonyl or loweralkyl or arylsulfonyl, such as methanesulfonyl or p-toluenesulfonyl; dihalophosphoryl suitably dichlorophosphoryl; and acyl suitably loweralkanoyl, such as acetyl, propionyl or butyryl, or aroyl such as benzoyl.

When it is desired to prepare the 1 - hydroxyalkyl imidazolylalkyl carbamates according to this and the other processes described herein, it is necessary to "block" this 1-substituent during the reaction involving the 2-hydroxyalkyl or 2-mercaptoalkyl radical of the imidazole, or else the free hydroxy group will react with the isocyanate or isothiocyanate. This "blocking" is conveniently accomplished by esterifying, i.e., by employing a 1-acyloxyalkyl imidazole as starting material, an ester of a loweralkanoic acid or benzoic acid for example, an ester of acetic acid, propionic acid or benzoic acid, is conveniently employed, for example, the starting material may be 1 - (2 - acetoxyethyl)-2-hydroxy-methyl-5-nitroimidazole, 1 - (2 - propionoxypropyl) - 2-mercaptomethyl-5-nitroimidazole or 1 - (2-benzoyloxyethyl)-2-(1-hydroxyethyl)-5-nitroimidazole.

This esterified radical normally survives the isocyanate reaction unchanged under the preferred process conditions, and the resulting 1-acyloxyalkylimidazole carbamate may then be hydrolyzed with base to the corresponding 1-hydroxyalkyl carbamate.

Where $R_3$ is halosulfonyl or dihalophosphoryl, the carbamate produced in accordance with this process may be readily converted to the corresponding N-sulfamoyl carbamate or N-diaminophosphoryl carbamate by reaction with ammonia suitably liquid ammonia. If desired, the corresponding N-(N' - substituted sulfamoyl)carbamates or N-(N' - substituted diaminophosphoryl)carbamates may be obtained by utilizing a suitable substituted amine in place of ammonia.

The isocyanate reaction of the above flow diagram is conveniently brought about by contacting the imidazole and substituted isocyanate (or isothiocyanate) reactants, preferably in equimolar amounts or with a slight molar excess of isocyanate (or isothiocyanate), in an inert solvent medium at a temperature of between about 20–120° C. Aromatic hydrocarbons such as benzene and toluene, or halogenated aliphatic hydrocarbons, e.g., dichloro- or tetrachloroethane are examples of suitable solvents. It is desirable to have present a minor amount of base such as a tertiary amine, e.g., pyridine or triethylamine, or even stronger bases such as alkali metal alkoxides, such as sodium methoxide or potassium ethoxide, since the reaction is base catalyzed.

Examples of imidazolylalkyl carbamates which may be obtained in this manner from the appropriate nitroimidazole are 1-methyl-5-nitroimidazol-2-ylmethyl benzoylcarbamate,
1-methyl-5-nitroimidazol-2-ylmethyl acetylcarbamate,
1-(2'-acetoxyethyl)-5-nitroimidazol-2-ylmethyl ethylcarbamate,
1-(1'-ethyl-5'-nitroimidazol-2'-yl)ethyl methylcarbamate,
1-propyl-5-nitroimidazol-2-ylmethyl 4-morpholinecarboxylate,
1-methyl-5-nitroimidazol-2-ylmethyl methylthiocarbamate and
1-(2'-acetoxypropyl)-5-nitroimidazol-2-ylmethyl phenylthioncarbamate.

The method may also be used for making carbamates where $R_3$ is hydrogen and M is oxygen, in which case the cyanic acid reactant is preferably generated in situ from an alkali metal cyanate, as by addition of acetic or trifluoroacetic acid to the reaction mixture. It might be mentioned, however, that other methods described herein are generally more satisfactory for making the unsubstituted carbamates, and further that this particular process is not suitable for preparing the unsubstituted thioncarbamates where $R_3$ in the formula is hydrogen and M is sulfur.

(ii) Alkali metal cyanate or thiocyanate/acid procedure

Certain of the 1-substituted imidazol-2-yl-alkyl carbamates and thiocarbamates of this invention may be obtained by another process which comprises the reaction of the corresponding 1-substituted-2-halomethyl (or 2-acetoxypropyl or valeroxyethyl, or aroyloxyalkyl such as metal cyanate or thiocyanate to produce a 1-substituted-2-cyanatomethyl or 2-thiocyanatomethylimidazole and treatment of said compound with a mineral acid, preferably sulfuric acid. It is preferred, however, to use this method for the preparation of thiocarbamates rather than carbamates due to the possibility of rearrangement of the cyanato intermediate to an isocyanato derivative. This problem is not of practical importance where the thiocyanato intermediate is concerned. The reaction may be schematically represented as follows:

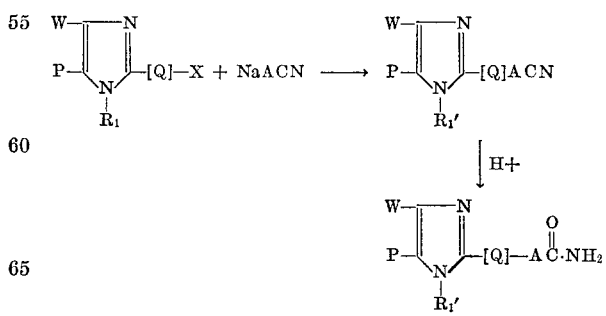

wherein W, P, $R_1$, $R_1'$ and Q are as above; and X is halo or substituted sulfonyloxy.

In the preferred modification of this process, the significance of the substituents is as follows:

W is hydrogen;

P is nitro;

Q is loweralkylene suitably methylene or ethylene; or loweralkylidene suitably ethylidene;

$R_1$ is loweralkyl suitably methyl, ethyl or propyl or acyloxyalkyl, suitably loweralkanoyloxyalkyl, such as acetoxypropyl or valeroxyethyl, or aroyloxyalkl such as benzoyloxyethyl or benzoyloxypropyl, $R_1'$ or $R_2$ or hydroxyalkyl such as hydroxyethyl or hydroxypropyl;

A and M each represent oxygen or sulfur; and

X is chloro, mesyl or tosyl, or bromo.

It is preferred to affect the reaction with thiocyanate in a solvent medium such as loweralkanol, for example, methanol or ethanol, dimethylformamide, a loweralkanoylnitrile, such as acetonitrile and the like, at a temperature of between about 15° C. and about 100° C. The immediate product is a 1-substiuted-2-thiocyano-5-nitroimidazole, for example, a 1-alkyl or 1-acyloxyloweralkyl-2-thiocyano-5-nitroimidazole, such as, a 1-methyl, 1-ethyl, or 1-acetoxyethyl-2-thiocyano-5-nitroimidazole. A similar product is obtained when there is employed, as starting material, a 2-alkylsulfonyloxymethyl or 2-arylsulfonyloxymethyl imidazole, such as, 2-methylsulfonyloxymethyl or 2-p-toluenesulfonyloxymethyl-5-nitroimidazole instead of the 2-halomethyl imidazole, such as the corresponding 2-chloro or 2-bromomethyl-5-nitroimidazole.

Conversion of the 1-substituted-2-thiocyanoalkyl or 2-cyanoalkyl-5-nitroimidazole to the thio carbamate or carbamate is conveniently accomplished by contacting it with an excess of strong acid, preferably concentrated sulfuric acid in the cold, for example, at between 0° and 15° C. The reaction is then quenched in water to precipitate the thiolcarbamate. In those cases where the 1-substituent is acyloxylalkyl, this ester is hydrolyzed to the corresponding 1-hydroxyalkyl radical during the sulfuric acid reaction. Examples of compounds prepared in accordance with this procedure include: 1-methyl-5-nitroimidazol-2-ylmethyl thiolcarbamate, 1-ethyl-5-nitroimidazol-2-ylmethyl thiolcarbamate and 1-methyl-5-nitroimidazol-2-ylethyl thiolcarbamate.

(iii) The imidazole halocarbonate process

Still another process for making the carbamates of this invention consists in reaction of the halocarbonate or halothioncarbonate ester of 1-substituted-2-hydroxyalkyl (or 2-mercaptoalkyl)-5-nitroimidazole with a primary or secondary amine. The reaction may be schematically represented as follows:

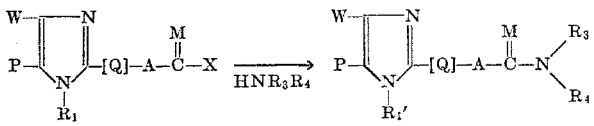

wherein W, P, Q, A, M, $R_1$, $R_1'$, $R_3$ and $R_4$ are as above, and X is halo.

In the preferred modification of this process, the significance of the substituents is as follows:

W is hydrogen;

P is nitro;

Q is loweralkylene suitably methylene or ethylene; or loweralkylidene suitably ethylidene;

$R_1$ is loweralkyl suitably methyl, ethyl or propyl or acyloxyalkyl, suitably loweralkanoyloxyalkyl, such as acetoxypropyl or valeroxyethyl, or aroyloxyalkyl such as benzoyloxyethyl or benzoyloxypropyl, $R_1'$ is $R_1$ or hydroxyalkyl such as hydroxyethyl or hydroxypropyl;

A and M each represent oxygen or sulfur;

X is chloro;

$R_3$ and $R_4$ individually represent hydrogen; alkyl, suitably loweralkyl, such as methyl, ethyl or propyl; aryl, such as phenyl; aralkyl, suitably arylloweralkyl, such as benzyl, hydroxyalkyl, suitably hydroxyloweralkyl, such as hydroxypropyl, and hydroxyethyl; alkoxyalkyl, such as ethoxyethyl or ethoxypropyl; hydroxy; amino; or $R_3$ and $R_4$ together represent the group $-(CH_2)_2R_5-(CH_2)_2-$, where $R_5$ is oxygen, sulfur, $-CH_2-$ or $N-R_6$, and $R_6$ is hydrogen or loweralkyl, for example together with the N atom to which $R_3$ and $R_4$ are attached, they represent morpholino, thiomorpholino, piperidino, piperazino, 4-methylpiperazino or pyrrolidino.

The two reactants are contacted in a suitable inert solvent medium such as dioxane, tetrahydrofuran or an aromatic hydrocarbon, such as, benzene, at a temperature in the range of about 0–75° C. An excess of amine reactant is generally employed and good results are obtained with from about 2.0–5.0 moles of amine per mole of halocarbonate ester, such as chlorocarbonate ester, at reaction temperatures of from about 10–40° C. for most amines. It might be noted that the ester reactants are frequently referred to by those in this art as the haloformate (or halothionformate) esters of the 1-substituted-2-hydroxyalkyl (or mercaptoalkyl)-5-nitroimidazole.

The molar excess of amine is desired since it is convenient and customary to use 1 mole of the amine (in addition to the mole needed for the reaction itself) as an acid binding agent to neutralize the acid formed in the reaction. The haloformate ester starting material may be charged to the reaction in the form of an acid addition salt, and it is then necessary to have another mole of amine to neutralize this salt. As previously indicated, the amine present in the reaction medium may hydrolyze a 1-acyloxyalkyl imidazole substituent to the corresponding 1-hydroxyalkyl substituent.

Amines which are suitable for use in this reaction include ammonia, methylamine, dimethylamine, aniline, benzylamine, ethanolamine, propanolamine, ethoxyethylamine, ethoxypropylamine, hydroxylamine, hydrazine and morpholine, thiamorpholine, piperidine, piperazine, 4-methylpiperazine and pyrrolidine.

When ammonia is used as the amine reactant to form carbamates where $R_3$ and $R_4$ are both hydrogen, a very large excess is generally used, and frequently liquid ammonia is employed as reaction solvent. When the process is carried out with ammonia, the reaction temperature may be from about −35° C. (refluxing liquid ammonia) to about room temperature. At the higher temperatures, it is, of course, necessary to use a pressure vessel, or to dissolve the ammonia in an organic solvent such as chloroform or a loweralkanol such as ethanol or methanol.

Examples of carbamates which may be prepared in this way from the corresponding chloroformate or chlorothionformate ester are 1-methyl-5-nitroimidazol-2-ylmethyl carbamate,
1-ethyl-5-nitroimidazol-2-ylmethyl carbamate,
1-methyl-5-nitroimidazol-2-ylmethyl p-fluorophenylcarbamate,
1-methyl-5-nitroimidazol-2-ylmethyl p-chlorophenylcarbamate,
1-propyl-5-nitroimidazol-2-ylmethyl p-nitrophenylcarbamate,
1-methyl-5-nitroimidazol-2-ylmethyl thiolcarbamate,
1-methyl-5-nitroimidazol-2-ylmethyl methylcarbamate,
1-(2-hydroxyethyl)-5-nitroimidazol-2-ylmethyl ethylcarbamate,
1-(2-hydroxyethyl)-5-nitroimidazol-2-ylmethyl carbamate,
1-methyl-5-nitroimidazol-2-ylmethyl methylethylcarbamate,
1-(1-ethyl-5-nitroimidazol-2-yl)-ethyl ethylcarbamate,
1-methyl-5-nitroimidazol-2-ylmethyl methoxyethylcarbamate, and
1-(1-methyl-5-nitroimidazol-2-yl)ethyl methylthioncarbamate.

(iv) Preparation of imidazole halocarbonate

The imidazole chlorocarbonate or chlorothioncarbonate ester used in the above process is obtained by reacting phosgene or thiophosgene at a temperature of between about −10° C. and room temperature with an imidazole of the structure

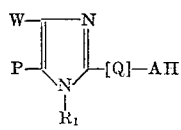

where W, P, Q, A and $R_1$ are as above. Generally the lower temperatures are used with phosgene, and higher temperatures with thiophosgene. The process is conducted in an inert organic solvent medium. Satisfactory solvents are dioxane, tetrahydrofuran and toluene, or mixtures thereof, as well as ketones and esters such as ethyl acetate. It is desirable to employ a solvent in which the imidazole reactant is essentially completely soluble. For best results, the process is conducted in the presence of an acid binding agent, normally a tertiary amine such as trialkylamine or dimethylaniline, although solvents such as tetrahydrofuran and dioxane may themselves be used as said binding agents in this reaction. The chloroformate or chlorothionformate ester may be isolated, if desired; but this is unnecessary, and it is a preferred embodiment of the invention to prepare the ester in solution and to react it without isolation with the amine.

(v) The carbamyl halide/loweralkyl carbamate processes

An additional method for preparing the imidazolylalkyl carbamates of this invention comprises reacting a 1-substituted-2-hydroxyalkyl (or 2-mercaptoalkyl)-5-nitroimidazole with the appropriate carbamyl halide or loweralkyl carbamate. This process may be schematically represented as follows:

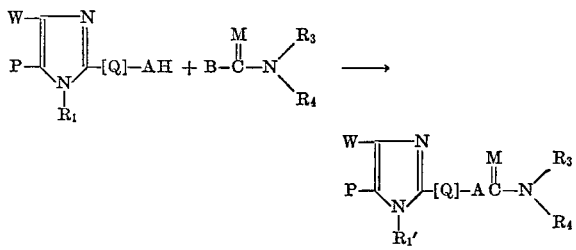

wherein W, P, $R_1$, $R_1'$, Q, A, M, $R_3$ and $R_4$ are as above, and B is halo or loweralkoxy.

In the preferred modification of this process, the significance of the substituents is as follows:

W is hydrogen;
P is nitro;
Q is loweralkylene suitably methylene or ethylene; or loweralkylidene suitably ethylidene;
$R_1$ is loweralkyl suitably methyl, ethyl or propyl or acyloxyalkyl, suitably loweralkanoyloxyalkyl, such as acetoxypropyl or valeroxyethyl, or aroyloxyalkyl such as benzoyloxyethyl or benzoyloxypropyl, $R_1'$ is $R_1$ or hydroxyalkyl such as hydroxyethyl or hydroxypropyl;
B is chloro or methoxy or ethoxy;
$R_3$ and $R_4$ individually represent hydrogen; alkyl, suitably loweralkyl, such as methyl, ethyl or propyl; aryl, such as phenyl; aralkyl, such as methyl, ethyl or propyl; aryl, such as phenyl; aralkyl, suitably arylloweralkyl, such as benzyl, hydroxyalkyl, suitably hydroxyloweralkyl, such as hydroxymethyl, and hydroxyethyl; alkoxyalkyl, such as ethoxyethyl or ethoxypropyl; or $R_3$ and $R_4$ together represent the group —$(CH_2)_2R_5$—$(CH_2)_2$—, where $R_5$ is oxygen, sulfur, —$CH_2$— or N—$R_6$, and $R_6$ is hydrogen or loweralkyl, for example, together with the N-atom to which $R_3$ and $R_4$ are attached, they represent morpholino, thiamorpholino, piperidino, piperazino, 4-methylpiperazino or pyrrolidino. As will be understood by those in the art, when B is chloro, a carbamyl chloride is reacted with the 2-substituted imidazole, and when B is loweralkoxy, the reactant is an alkyl carbamate.

In order to prepare the imidazolylalkyl thioncarbamates, i.e., where M in the above structural formula is sulfur, a thiocarbamyl chloride is employed.

In the carbamyl chloride method, the two reactants are brought together in a suitably inert solvent medium, such as benzene, toluene, tetrahydrofuran or dioxane. It is preferred to use a slight molar excess (e.g. 1–15%) of carbamyl halide, and to have an acid binding agent present in the medium since acid is produced during the reaction. When this process is employed to make unsubstituted carbamates or thioncarbamates (where $R_3$ and $R_4$ are both hydrogen), the carbamyl chloride reactant is generated into the reaction medium since it is a highly unstable compound. The disubstituted carbamyl chlorides are stable and are added directly to the reaction mixture.

When the imidazole is treated with a loweralkyl carbamate, e.g., ethyl or methyl carbamate, the two reactants are brought together in essentially equimolar amounts in the presence of a strong base, preferably an alkali metal alkoxide such as sodium ethoxide, sodium methoxide, potassium isopropoxide and the like in an inert solvent such as 1,2-dimethoxyethane. Because of the base present, an acyloxyloweralkyl radical at the 1-position of the imidazole ring will be saponified to the corresponding hydroxyloweralkyl substituent. Care should be taken not to prolong the reaction time unduly since the imidazole compound is sensitive to strong base.

Among the products which may be prepared by this process are 1-methyl-5-nitroimidazol-2-ylmethyl carbamate, 1-ethyl-5-nitroimidazol-2-ylmethyl carbamate, and 1-(2'-ethoxyethyl)-5-nitroimidazol-2-ylmethyl carbamate.

(vi) The phenyl halocarbonate method

Still another process which is very useful for preparing the novel imidazolylalkyl carbamates described herein comprises the conversion of a 1-substituted-2-hydroxyalkyl (or mercaptoalkyl) imidazole to a phenyl carbonate or phenyl thioncarbonate derivative, and subsequent treatment of said carbonate or thioncarbonate with an amine, as illustrated below:

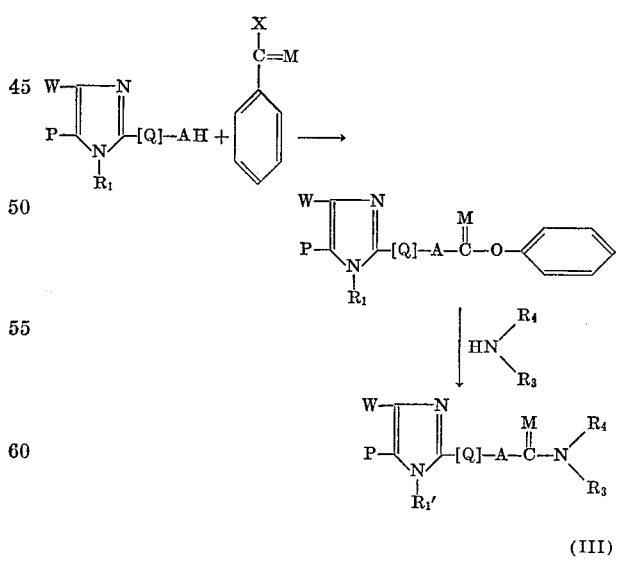

(III)

wherein W, P, Q, $R_1$, $R_1'$, $R_3$, $R_4$, A and M are as above and X is halo.

This process for making imidazolylalkyl carbamates, which process is itself not a part of this invention, but is rather an invention of our colleague George Gal, is highly satisfactory for obtaining carbamates of the above Structure III.

In the preferred modification of this process, the significance of the substituents is as follows:

W is hydrogen;

P is nitro;

Q is loweralkylene suitably methylene or ethylene; or loweralkylidene suitably 1-ethylidene;

$R_1$ is loweralkyl suitably methyl, ethyl or propyl or acyloxyalkyl, suitably loweralkanoyloxyalkyl, such as acetoxypropyl or valeroxyethyl, or aroyloxyalkyl such as benzoyloxyethyl or benzoyloxypropyl; $R_1'$ is $R_1$ or hydroxyalkyl such as hydroxyethyl or hydroxypropyl;

A and M each represent oxygen or sulfur;

$R_3$ and $R_4$ individually represent hydrogen; alkyl, suitably loweralkyl, such as methyl, ethyl or propyl; aryl, such as phenyl; aralkyl, suitably arylloweralkyl, such as benzyl; hydroxyalkyl, suitably hydroxyloweralkyl, such as hydroxyethyl; alkoxyalkyl, such as ethoxyethyl or ethoxypropyl; hydroxy; amino; or $R_3$ and $R_4$ together represent the group $-(CH_2)_2R_5-(CH_2)_2-$, where $R_5$ is oxygen, sulfur, $-CH_2-$ or $N-R_6$, and $R_6$ is hydrogen or loweralkyl, for example when taken together with the N-atom to which they are attached, they represent morpholino, thiomorpholino, piperidino, piperazino, 4-methylpiperazino or pyrrolidino.

In carrying out this last-mentioned process, a 1-loweralkyl - 2 - hydroxyalkyl (or mercaptoalkyl) - 5 - nitroimidazole such as 1-acyloxyalkyl - 2 - hydroxyalkyl (or mercaptoalkyl) - 5 - nitroimidazole such as is first reacted for example with phenoxy carbonyl chloride (phenyl chloroformate) or phenoxythiocarbonyl chloride (phenyl thionchloroformate). This reaction is conveniently brought about in an organic solvent, such as pyridine, one of the picolines, or lutidine. These bases, in addition to serving as the liquid solvent medium, also serve to bind the acid formed during the reaction. Alternatively, a non-basic solvent for the reactants such as dioxane or chloroform may be employed, and sufficient tertiary amine or alkali metal hydroxide added to bind the liberated hydrogen chloride. It is preferred to employ a slight molar excess of phenyl chloroformate reactant and to carry out the process at temperatures of from about $-5°$ C. to about $45°$ C. Preferably, the reactants are mixed at about $0°$ C. and the reaction then continued at about room temperature for the desired time. When a phenyl carbonate of a 2-hydroxymethyl or 2-mercaptomethyl is being prepared, reaction times of from about 1–5 hours are satisfactory for good results. However, longer times of up to about 30 hours may be necessary for complete reaction in the case of 2-($\alpha$-hydroxyethyl) and 2-($\alpha$-mercaptoethyl)imidazoles. The resulting imidazole phenyl carbonate, such as for instance 1-methyl-5-nitroimidazol-2-ylmethyl phenyl carbonate or 1-methyl-5-nitroimidazol-2 - ylmethyl phenyl thioncarbonate is conveniently recovered by quenching the reaction mixture in ice water, thus precipitating the desired product. These substances may be used without further purification in the next step of the process, and this is preferred in the case of the phenyl thioncarbamates which are less stable than the phenyl carbonates.

The imidazolylalkyl carbamate is then obtained by intimately contacting the imidazole phenyl carbonate or phenyl thioncarbonate with an amine in an inert organic solvent medium. For this purpose, chloroform or ethers such as dioxane, tetrahydrofuran or ethylene dimethyl ether are satisfactory. It will, of course, be understood that the particular carbamate produced will depend upon the amine reactant used. The reaction is a rapid one and is normally substantially complete in about 1–5 hours. The imidazole phenyl carbonate and the amine may be reacted in essentially equimolar amounts although it is preferred to employ an excess of the amine. Good results are obtained by using from 1.0–4 moles of amine per mole of phenyl carbonate. When the unsubstituted carbamate itself is being prepared, it is convenient and preferred to use a very large excess of liquid ammonia since the excess serves as reaction solvent and the resulting carbamate moiety is stable and not destroyed under such conditions. In preparing the unsubstituted thioncarbamate, however, it is preferable to employ about 2 moles of ammonia per mole of thioncarbonate and to carry out the reaction at about room temperature in a solvent such as chloroform or an ether. Where $R_1$ in Structure III is hydroxyalkyl, it is preferred to carry out the reaction on a 1-acyloxyalkylimidazole, for example, a 1-acetoxyalkylimidazole or a 1-benzoyloxyalkylimidazole, such as 1-(2'-acetoxyethyl) - 2 - hydroxymethyl - 5 - nitroimidazole, and followed by removal of the acyl group by base hydrolysis after completion of the reaction. It should be noted, however, that in the second stage of the process, that is to say, the reaction with the amine, the basicity of the amine is often sufficient to bring about this hydrolysis.

Representative examples of imidazolylalkyl carbamates which may be prepared by this method are: 1-methyl - 5 - nitroimidazol - 2 - ylmethyl carbamate; 1-ethyl - 5 - nitroimidazol - 2 - ylmethyl p-fluorophenylcarbamate; 1 - (2 - hydroxyethyl) - 5 - nitroimidazol-2-ylmethyl N-(2-methoxyethyl) carbamate; 1-(1-methyl-5 - nitroimidazol - 2 - yl)ethylcarbamate; 1 - methyl-5 - nitroimidazol - 2 - ylmethyl thioncarbamate; 1-propyl-5 - nitroimidazol - 2 - ylmethyl thiolcarbamate; 1-methyl-5 - nitroimidazol - 2 - ylmethyl hydroxycarbamate and 1-(2 - hydroxypropyl) - 5 - nitroimidazol - 2 - ylmethyl methylcarbamate.

(vii) Preparation of pseudo-thioureido imidazoles

The compounds of Formula I above, wherein M is imino or substituted imino are obtained by reacting a 1-substituted-2-halomethyl or sulfonylmethyl imidazole with a thiourea or substituted thiourea as shown by the following reaction scheme:

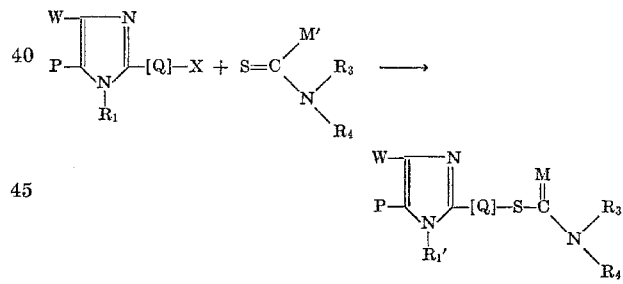

wherein W, P, $R_1$, $R_1'$, Q, S, $R_3$ and $R_4$ are as above and M is imino or substituted imino, and X is halo or substituted sulfonyloxy.

In the preferred modification of this process, the significance of the substituents is as follows:

W is hydrogen;

P is nitro;

Q is loweralkylene suitably methylene or ethylene; or loweralkylidene suitably 1-ethylidene;

$R_1$ is loweralkyl suitably methyl, ethyl or propyl or acyloxyalkyl, suitably loweralkanoyloxyalkyl, such as acetoxypropyl or valeroxyethyl, or aroyloxyalkyl such as benzoyloxyethyl or benzoyloxypropyl; $R_1'$ is $R_1$ or hydroxy alkyl such as hydroxyethyl or hydroxypropyl;

A is sulfur;

M is imino; or alkylimino, such as methyl, propyl or pentylimino;

M' is amino or alkylamino, such as methyl, propyl or pentylamino;

$R_3$ and $R_4$ individually represent hydrogen; alkyl suitably loweralkyl, such as methyl, ethyl or propyl; aryl, such as phenyl; aralkyl, suitably arylloweralkyl, such as benzyl; hydroxyalkyl, suitably hydroxyloweralkyl, such as hydroxymethyl, and hydroxyethyl; alkoxyalkyl, such as ethoxyethyl or ethoxypropyl; or $R_3$ and $R_4$ together represent the group $-(CH_2)_2R_5-(CH_2)_2-$, where $R_5$ is oxygen, sulfur, $-CH_2-$ or $N-R$, and $R_6$ is hydrogen or loweralkyl, for example taken together with the N-atom to which $R_3$ and $R_4$ are attached, they represent morpholino, thiamorpholino, piperidino, 4-methylpiperazino or pyrrolidino; and X is chloro, methylsulfonyl or p-toluenesulfonyl.

The reaction is carried out on an organic solvent medium, preferably a loweralkanol, suitably ethanol or methanol. It is preferred to use essentially equimolar quantities of the two reactants, or a slight molar excess of the 2-haloalkyl or 2-sulfonyloxyalkyl imidazole reactants. Acid is formed in the reaction, and the products are normally recovered as the hydrochloride or sulfonate acid addition salts. Included among the compounds prepared in accordance with this process are: S-(1-methyl-5 - nitroimidazol - 2 - ylmethyl) - pseudo - thiourea; S-1-(1' - methyl - 5' - nitroimidazol - 2' - yl)ethyl - pseudo-thiourea; S - (1 - acetoxyethyl - 5 - nitro - imidazol - 2-ylmethyl) - pseudo - thiourea; and S - (1 - methyl - 5-nitroimidazol-2-ylmethyl)-pseudo-dimethylthiourea.

(II) The specific processes

The following processes are directed to the preparation of carbamates having particular substituents attached to the nitrogen of the carbamate group. Although these processes are directed to the formation of the compounds having these particular substituents, it should be understood that they are not specifically limited thereto.

(i) 5-nitroimidazol-2-ylkyl allophanates 5-nitroimidazol-2-ylalkyl allophanates may be produced by reaction of a 5-nitroimidazol-2-yl alkanol or thioalkanol with excess cyanic acid. In the preferred procedure, the 5-nitroimidazole, suitably a 1-$R_1$-5-nitroimidazol-2-yl methanol, wherein $R_1$ has the value shown in col. 2 but having a significance other than hydroxyalkyl, suitably 1 - methyl - 5 - nitroimidazol - 2 - yl methanol, is dissolved in an oxygenated organic solvent, suitably an ether, for example 1,2-dimethoxy ethane, cooled to Dry Ice temperature, that is to between —75° C. and —50° C. and 2-moles of cyanic acid added thereto. It is a critical feature of this process that there be at least 2 moles of cyanic acid per mole of nitroimidazole. The reaction vessel is tightly sealed, allowed to warm to from about —5° C. to about 0° C. and allowed to stand from about 36 to about 60 hours. The product is then isolated. In the preferred procedure, the reaction mixture is filtered and the solid residue extracted with water, suitably hot water, having a temperature of from about 85° C. to 100° C. The hot extract is immediately filtered and the desired product obtained as a crystalline precipitate from the aqueous filtrate.

Included among the compounds which may be produced in accordance with this procedure are 1-methyl-5-nitroimidazol - 2 - ylmethyl allophanate, 1 - (1' - ethyl-5' - nitroimidazol - 2' - yl)ethyl allophanate, 1-[1-(acetoxyethyl) - 5' - nitroimidazol - 2' - yl]ethyl allophanate and 1-(acetoxyethyl)-5-nitroimidazol-2-ylmethyl thioallophanate.

Where it is desired to produce the 1-(hydroxyalkyl)-5-nitroimidazol-2-ylalkyl allophanates, the corresponding 1-acyloxy allophanate is produced in accordance with the above procedure and subsequently subjected to base hydrolysis in the usual manner.

(ii) 5-nitroimidazol-2-ylalkyl N-(2',2',2',-trihalo-1'-hydroxyethoxy)carbamates

5 - nitroimidazol - 2 - ylalkyl N - (2',2',2' - trihalo-1'-hydroxyethoxy)carbamates may be obtained by reacting the corresponding 5-nitroimidazol-2-ylalkyl N-hydroxycarbamate with a trihalo substituted acetaldehyde. In the preferred procedure, the 5-nitroimidazole, suitably a 1-$R_1$-5-nitro-imidazol-2-ylmethyl N-hydroxycarbamate, wherein $R_1$ is as shown in col. 2, but having a significance other than hydroxyalkyl, for example, 1-methyl-5-nitro-imidazol-2-yl-methyl N-hydroxycarbamate is mixed with the haloacetaldehyde, for example, chloralhydrate or bromalhydrate in approximately equimolar proportions and heated under reflux in the presence of a drying agent, for example, anhydrous magnesium sulfate for from about 6 to about 12 hours. In the preferred method of isolation, the reaction mixture is filtered and the product recovered from the filtrate. Among the compounds which may be produced in accordance with this procedure are: 1-methyl-5 - nitroimidazol - 2 - ylmethyl N-(2',2',2'-trichloro-1'-hydroxyethoxy)carbamate; 1 - ethyl - 5-nitroimidazol-2-yl-methyl N-(2',2',2'-trichloro-1'-hydroxyethoxy)carbamate; 1-acetoxyethyl-5-nitroimidazol-2-ylmethyl N-(2',2',2'-trichloro - 1' - hydroxyethoxy)carbamate; and 1-methyl-5-nitroimidazol-2-ylmethyl N-(2',2',2'-trifluoro-1'-hydroxyethoxy)carbamate.

Where it is desired to obtain a compound of this class having a 1-hydroxyalkyl substituent, the reaction is carried out using the corresponding 1-acyloxy hydroxycarbamate and subjecting the thus produced N-(2',2',2'-trihalo-1'-hydroxyethoxy)carbamate to base hydrolysis.

(iii) 5-nitroimidazol-2-ylalkyl N-hydroxymethylcarbamate 5-nitroimidazol-2-ylalkyl N-hydroxymethylcarbamates may be obtained by reacting the corresponding 5-nitro-imidazol-2-ylalkyl carbamate with formaldehyde. In the preferred modification of the process, the 5-nitroimidazole carbamate, suitably a 1-$R_1$-5-nitroimidazol-2-ylmethyl-carbamate, wherein $R_1$ is as shown in col. 2 but having a significance other than hydroxyalkyl or carboxyalkyl, is dissolved in an inert solvent, dimethyl sulfoxide being particularly suitable, and heated in a sealed vessel with an excess of paraformaldehyde, 2 moles excess being preferred, at from 70–150° C. for from 18 to 30 hours. In one method of isolation, the solvent is evaporated from the reaction mixture, the residue dissolved in a suitable water miscible solvent, such as, dimethylformamide and water added. The product separates as a crystalline precipitate and may be isolated by filtration.

Included among the compounds which may be produced in accordance with this procedure are: 1-methyl-5-nitro-imidazol-2-ylmethyl N-hydroxymethylcarbamate; 1-(1'-methyl - 5' - nitroimidazol-2'-ylethyl) N-hydroxymethyl-carbamate; 2-(1'-methyl-5'-nitroimidazol-2'-yl)ethyl N-hydroxymethylcarbamate; and 1-ethyl-5-nitroimidazol-2-ylmethyl N-hydroxymethylcarbamate.

(iv) 5-nitroimidazol-2-ylalkyl N-alkoxyalkylcarbamates 5-nitroimidazol-2-ylalkyl N-alkoxyalkylcarbamates may be produced by reacting the corresponding 5-nitro-imidazol-2-ylalkyl N-hydroxyalkyl carbamate with an alkanol in the presence of an acid. In the preferred procedure, the N-hydroxymethylcarbamate, suitably a 1-$R_1$-5-nitroimidazol - 2 - ylmethyl-N-hydroxycarbamate, wherein $R_1$ is as shown in col. 2, but having a significance other than hydroxyalkyl or carboxyalkyl, for example, 1-methyl - 5 - nitroimidazol-2-ylmethyl N-hydroxymethyl-carbamate, is mixed with the alkanol, for example, ethanol or methanol, in the presence of a catalytic amount of strong acid, hydrochloric acid or p-toluene sulfonic acid being preferred, and allowed to stir for 12 to 24 hours, at between 15° C. and 30° C. The product may be isolated by extraction of the reaction mixture with a suitable solvent such as, chloroform and working up in the usual manner.

Included among the products which may be obtained by means of this procedure are: 1-methyl-5-nitroimidazol-2-ylmethyl N-ethoxymethylcarbamate; 1-methyl-5-nitro-imidazol-2-ylmethyl N-propoxymethylcarbamate; 1-(1'-methyl - 5' - nitroimidazol-2'-yl)ethyl N-methoxymethyl-carbamate; and 1 - ethyl - 5-nitroimidazol-2-ylmethyl N-ethoxymethylcarbamate.

(v) 5-nitroimidazol-2-ylalkyl N-alkoxycarbamates 5-nitroimidazol-2-ylalkyl N-alkoxycarbamates may be prepared by reacting the corresponding 5-nitroimidazole N-hydroxycarbamate with a diazo hydrocarbon. In the preferred procedure, the 5-nitroimidazole N-hydroxycarbamate, suitably a 1-$R_1$-5-nitroimidazol-2-ylmethyl-N-hydroxycarbamate, wherein $R_1$ is as shown in col. 2 but having a significance other than hydroxyalkyl or carboxyalkyl, for example, 1-methyl-5-nitroimidazol-2-ylmethyl N-hydroxycarbamate is dissolved in an alkanol, for example, methanol or ethanol and treated with an excess of diazo hydrocarbon, suitably in solution, for example, an ethereal solution of diazomethane, diazoethane or diazophenylmethane. The product may be isolated in the form of an acid salt. In one suitable method of isolation, the reaction mixture is filtered, the residue chromatographed on silica gel and the residue, after evaporation of the eluate, treated with one equivalent of a solution of acid, suitably p-toluenesulfonic acid in methylethylketone.

Included among the products which may be obtained by this procedure are: 1-methyl-5-nitroimidazol-2-ylmethyl N-methoxycarbamate; 1-methyl-5-nitroimidazol-2-ylmethyl N-methyl-N-methoxycarbamate; 1 - ethyl - 5-nitroimidazol-2-ylmethyl N-ethoxycarbamate; and 1-(2'-acetoxyethyl)-5-nitroimidazol-2-ylmethyl N-phenylmethoxycarbamate.

(vi) Acylation of 5-nitroimidazol-2-ylalkyl carbamates, N - hydroxycarbamates and N - alkylhydroxycarbamates 5 - nitroimidazol - 2-ylalkyl carbamates, N-hydroxycarbamates and N-alkylhydroxycarbamates may be acylated in the usual manner. In the preferred procedure, the compound to be acylated, for example a 1 - $R_1$-5-nitroimidazol-2-ylmethyl carbamate wherein $R_1$ is as shown in col. 2 provided however that $R_1$ has a value other than hydroxyalkyl or carbamoylalkyl, is reacted with an acylating agent such as an alkanoyl anhydride, suitably a loweralkanoyl anhydride, such as acetic anhydride, proionic anhydride anhydride or valeric anhydride; an alkanoyl halide, such as acetyl chloride or propionyl chloride; an aroyl halide, such as benzoyl halide; an alkenoyl halide suitably a loweralkenoyl halide, such as acryloyl chloride or crotonyl chloride or a cyano alkanoic acid in the presence of a dehydrating agent, for example, cyano acetic acid in the presence of acetic anhydride.

The product of the acylation reaction may be isolated by any of the usual procedures.

(vii) 5-nitroimidazol-2-ylalkyl and 4',4'-substituted allophanates

5 - nitroimidazol-2-ylalkyl and 4',4'-substituted allophanates may be prepared by reacting a 5-nitroimidazole carbamate with a carbamyl chloride. In the preferred procedure, a 1-$R_1$-5-nitroimidazol-2-ylalkyl carbamate wherein $R_1$ is as shown in col. 2, but wherein $R_1$ has a value other than hydroxy or carbamoyl and further including compounds such as 1-$R_1$-5-nitroimidazol-2-ylalkyl carbamates, suitably 1-methyl-5-nitroimidazol-2-ylmethyl carbamate; 1 - $R_1$-5-nitroimidazol-2-ylalkyl N-alkylcarbamates, such as 1 - (1'-methyl-5'-nitroimidazol-2' - yl)ethyl N-methyl carbamate; 1-(1'-acetoxyethyl-5'-nitroimidazol - 2'-yl)ethyl N-methylcarbamate; or 2-(1'-ethyl-5'-nitroimidazol-2'-yl) ethyl N-propylcarbamate is dissolved in a base, suitably an organic base such as pyridine, lutidine or collidine, and the mixture cooled to a range of between −5° C. and +5° C. and the carbamyl chloride introduced. This introduction may be achieved by passing the carbamyl chloride into the reaction mixture in gaseous form, for example where carbamyl chloride itself is used; or by dropwise addition of a substituted carbamyl chloride, for example dimethyl carbamyl chloride in the liquid form. The reaction proceeds at a temperature of between 5° C. and 30° C. in from 2 to 24 hours. The product may then be isolated; suitably, the isolation is carried out by concentration with the reaction mixture under reduced pressure followed by extraction with a suitable solvent, for example, a water immiscible solvent such as ethyl acetate and work up in the usual manner.

Included among the products which may be obtained by this method are: 1-(1'-methyl-5'-nitroimidazol-2'-yl) ethyl 4' - methylallophanate, 1-(1'-acetoxyethyl-5'-nitroimidazol-2'-yl)ethyl 4'-methylallophanate and 1-(1'-ethyl-5'-nitroimidazol-2'-yl)ethyl 4'-propylallophanate. Where the carbamyl chloride is a substituent carbamyl chloride, for example dimethyl carbamyl chloride, there are obtained compounds such as 1-(1'-methyl-5'-nitroimidazol-2'-yl)ethyl-1',4',4'-trimethylallophanate, and 1-(1'-ethyl-5' - nitroimidazol-2'-yl)ethyl 1'-methyl-4',4'-dimethylallophanate.

Where the desired compound has a hydroxyalkyl substituent at the 1-position, the reaction is carried out with the corresponding 1-acyloxyalkyl compound which is subsequently subjected to base hydrolysis in the usual manner.

(viii) 5-nitroimidazol-2-ylalkyl 3'-trioallophanates and 4',4'-substituted 3'-thioallophanates 5-nitroimidazol-2-ylalkyl 3-thioallophanates and 4',4'-substituted 3'-thioallophanates are produced by reaction of a 5 - nitroimidazol-2-ylalkyl haloformate with anhydrous alkali metal thiocyanate followed by treatment with an amine. In a preferred modification of the process, a 5-nitroimidazol-2-ylalkyl chloroformate, for example a 1-$R_1$ - 5-nitroimidazol-2-ylmethyl chloroformate, wherein $R_1$ is as shown in col. 2, provided that $R_1$ has a value other than hydroxyalkyl, suitably 1-methyl-5-nitroimidazol-2-ylmethyl-chloroformate, and the alkali metal thiocyanate is taken up in a reaction inert organic solvent such as benzene and stirred at moderately elevated temperatures preferably from about 20° C. to about 55° C. for a period of about 3 to about 6 days. This mixture is then treated with an excess of the desired amine, for example, anhydrous gaseous ammonia to yield the unsubstituted 3'-thionallophanate, or a substituted amine, such as an alkylamine, such as ethylamine, to yield the corresponding 4' - alkyl-3'-thionallophanate or a disubstituted amine, for example, dibenzylamine to yield the corresponding 4',4'-disubstituted-3'-thionallophanate, such as 1 - methyl-5-nitroimidazol-2-yl-methyl 4',4'-dibenzyl-3'-thionallophanate.

Included among the compounds which may be produced by this method are: 1-methyl-5-nitroimidazol-2-ylmethyl 3'-thionallophanate, and 1-ethyl-5-nitroimidazol-2-ylmethyl 4'-butyl-3'-thionallophanate.

Where it is desired to obtain a compound of this group having a 1-hydroxyalkyl substituent, the reaction is suitably carried out on the corresponding 1 - acyloxyalkyl chloroformate, which is then subjected to base hydrolysis in the usual manner to yield the desired 1-hydroxyalkyl compound. It should be borne in mind, however, that the basicity of the ammonia or the amine added in the course of the present reaction may be sufficient to affect this hydrolysis.

(ix) 5-nitroimdazol-1-ylalkyl N - (N'-substituted dithiocarbamoylmethyl)carbamates 5 - nitroimidazol - 1 - ylalkyl N-(N'-substituted dithiocarbamoylmethyl)carbamates may be produced by the reaction of a 5-nitroimidazol-2-ylalkyl carbamate with a substituted amine, formaldehyde and carbon disulfide. In the preferred modification of the procedure, a substituted amine, for example dimethylamine and formaldehyde, both in aqueous solution, suitably in solutions containing between 30 and 50% of each of the reagents, are added to a solution of the 5-nitroimidazol-2-ylalkyl carbamate, such as a 1-$R_1$-5-nitroimidazol-2-ylmethyl carbamate wherein $R_1$ is as shown in col. 2, provided that $R_1$ has a value other than hydroxyalkyl, carbamoyloxyalkyl, carbamoylalkyl or oxoalkyl, suitably 1-methyl-5-nitroimidazol-2-ylmethyl carbamate in a water miscible organic solvent suitably dimethylformamide To this mixture is added an excess of carbon disulfide and the reaction mixture agitated, suitably for from 18 to 30 hours at a temperature of between about 10 and 30° C. The product is then isolated, suitably by the addition of an excess of water and separation of the product as a precipitate. Among the products which may be obtained by this procedure are: 1 - methyl - 5 - nitroimidazol-2-ylmethy N - (dimethyldithiocarbamoylmethyl)carbamate, 1 - ethyl - 5 - nitroimidazol - 2 - ylmethyl N-(diethyldithiocarbamoylmethyl)carbamate and 1 - (1'-acetoxyethyl - 5' - nitroimidazol - 2' - yl)ethyl N - (dibenzyldithiocarbamoylmethyl)carbamate.

(x) 5 - nitroimidazol - 2 - ylalkyl N - (disubstituted aminomethyl)carbamates

5 - nitroimidazol - 2 - ylalkyl N - (disubstituted aminomethyl)carbamates may be produced by the reaction of a 5 - nitroimidazol - 2 - ylalkyl carbamate with a disubstituted amine together with formaldehyde. In the preferred modification of the procedure, the 1 - $R_1$ - 5 - nitroimidazol-2-ylalkyl carbamates, for example, 1-methyl-5-nitro-imidazol-2-ylmethyl carbamate together with a disubstituted amine including nitrogenous heterocyclo alkanes, for example, a dialkylamine, such as dimethylamine, dipropylamine, or dipentylamine and alkylarylamine for example N - methylaniline, a diarylamine such as diphenylamine or a diaralkylamine, such as dibenzylamine or a secondary cyclic amine, for example, morpholine, thiamorpholine, pyrrolidine, or N-methylpiperazine and paraformaldehyde, suitably in equimolar amounts, are taken up in a water miscible inert organic solvent, suitably dimethylformamide and heated in a sealed vessel at a temperature of from about 80° to about 150° C. for a period of from about 12 to about 30 hours. In a suitable method of isolation, the reaction solvent is removed, preferably under reduced pressure, and the residue dissolved in a polar solvent, suitably a ketonic solvent, such as methyl ethyl ketone and an acid in the same solvent, suitably p-toluene sulfonic acid is added thereto and the product isolated as the acid salt.

Included among the compounds which may be prepared in accordance with this procedure are: 1-methyl-5-nitroimidazol - 2 - ylmethyl N - (N',N' - dimethylaminomethyl)carbamate, 1 - ethyl - 5 - nitroimidazol - 2-ylmethyl N - (N',N' - dipropylaminomethyl)carbamate, 1 - acetoxyethyl - 5 - nitroimidazol - 2 - ylmethyl N-(N'-methyl-N'-phenylaminomethyl)carbamate, 1 - (1'-methyl-5' - nitroimidazol-2'-yl)ethyl N - (N',N'-diphenylaminomethyl)carbamate, 2 - (1' - methyl - 5' - nitroimidazol-2'-yl)ethyl N - (morpholin - 4 - ylmethyl)carbamate, 1-propyl - 5 - nitroimidazol - 2 - ylmethyl N - (4 - methylpiperazin - 1 - ylmethyl)carbamate, and 1 - (1' - hydroxyethyl - 5' - nitroimidazol - 2' - yl)ethyl N-pyrrolidin-1-ylmethyl)carbamate.

(xi) 5 - nitroimidazol - 2 - ylalkyl N - (carboalkoxyalkylidene)carbamates

5 - nitroimidazol - 2 - ylalkyl N - (carboalkoxyalkylidene)carbamates may be prepared by reacting a 5-nitroimidazol - 2 - ylalkyl carbamate with a β-keto ester in the presence of an acid. In the preferred procedure, a 5-nitro-imidazol - 2 - ylalkyl carbamate, for example, a 1 - $R_1$ - 5 - nitroimidazol - 2 - ylalkyl carbamate, wherein $R_1$ is as shown in col. 2 provided that $R_1$ is other than carbamoylalkyl, such as, 1 - methyl - 5 - nitroimidazol - 2 - ylmethyl carbamate, is heated with a β-keto ester, such as ethylacetoacetate or ethyl 3 - oxo-pentanoate in the presence of a catalytic amount of an anhydrous acid suitably an organic acid, such as, p-toluene sulfonic acid, at a temperature of from about 60° C. to about 100° C. for a period of from about 3 hours to about 24 hours. The product may be isolated by any suitable method, for example, the solvent may be removed by evaporation under reduced pressure, the residue washed thoroughly with ether, filtered and the ether removed under reduced pressure to yield a residue which may then be recrystallized, suitably from ether to yield the desired product. Included among the compounds which may be produced in accordance with this procedure are 1-methyl-5-nitroimidazol-2-ylmethyl N - [1'-carboethoxy-(prop - 2' - ylidene)]carbamate, 1 - ethyl - 5 - nitroimidazol - 2 - ylmethyl N - [1' - carboethoxy-(pent-2'-ylidene)]carbamate, and 1 - (1' - ethyl - 5' - nitroimidazol-2' - yl)ethyl N - [1'' - carboethoxy-(pent-2''-ylidene)] carbamate.

(xii) 5-nitroimidazol-2-ylalkyl N-alkoxymethylene carbamates

5 - nitroimidazol - 2 - ylalkyl N-alkoxymethylene carbamates may be produced by reacting a 5-nitroimidazol-2-ylalkyl carbamate with a trisubstituted orthoformate in the presence of a Lewis acid. In the preferred procedure, a 5-nitroimidazol-2-ylalkyl carbamate, such as a 1-$R_1$-5-nitroimidazol-2-ylmethyl-N-hydroxycarbamate, wherein $R_1$ is as shown on page 2 above, but having a significance other than hydroxy alkyl or carboxy alkyl, suitably 1-methyl-5-nitroimidazol-2-ylmethyl carbamate, a Lewis acid, preferably boron trifluoride etherate, and a trisubstituted orthoformate, for example a trialkyl orthoformate, such as triethyl orthoformate, are heated together at a temperature of from about 60° to about 100° C. for from about 12 to about 18 hours. The product is then isolated. In a suitable method of isolation, the excess trisubstituted orthoformate is removed under reduced pressure, the residue taken up in a suitable water miscible organic solvent, for example chloroform, and washed with a mild base, suitably aqueous sodium bicarbonate; the product is then isolated from the chloroform solution. Included among the compounds which may be produced in accordance with the above procedure are: 1-methyl-5-nitroimidazol-2-ylmethyl N-ethoxymethylene carbamate, 1-ethyl-5-nitroimidazol-2-ylmethyl N-propyloxymethylene carbamate, and 1-[1'(2'' - hydroxyethyl) - 5' - nitroimidazol-2'-ylethyl] N-benzyloxymethylene carbamate.

(xiii) 5-nitroimidazol-2-ylalkyl N-amino and substituted aminomethylene carbamates 5 - nitroimidazol - 2 - ylalkyl N-amino and substituted aminomethylene carbamates may be produced by reacting a 5-nitroimidazol-2-ylalkyl alkoxymethylene carbamate with an amine. In the preferred procedure, a 5-nitroimidazol-2-ylalkyl N-alkoxymethylene carbamate, such as is produced in accordance with the previous subsection, is heated together with an amine, suitably a substituted amine, such as ethylamine, diethylamine, or dibenzylamine, in a moderately high boiling reaction inert organic solvent, suitably an ether such as 1,2-dimethoxy ethane, at a temperature of between 50° and 150° C. for from about 1 hour to about 3 hours. In a suitable method of isolation, the product is isolated as the acid salt by the addition of a suitable anhydrous acid, for example, p-toluene sulfonic acid, to the cooled reaction mixture.

Included among the compounds which may be produced in accordance with this procedure are: 1-methyl-5-nitroimidazol-2-ylmethyl N - (dimethylaminomethylene)carbamate, 1 - ethyl - 5 - nitroimidazol - 2 - ylmethyl N-(dibutylaminomethylene)carbamate, and 1-(1'-propyl-5'-nitroimidazol-2'-yl)ethyl N - (dibenzylaminomethylene) carbamate.

(xiv) N'-(5-nitroimidazol-2-ylalkoxycarbonyl)$N^2,N^2$-dialkylformamidinium salts N'-(5-nitroimidazol-2-ylalkoxycarbonyl) $N^2,N^2$-dialkylformamidinium halides may be prepared by reacting a 5-nitroimidazol-2-ylalkyl carbamate with a dialkylformamide in the presence of a thionyl halide. In the preferred procedure, a 5-nitroimidazol-2-ylalkyl carbamate, suitably a 1-$R_1$ - 5 - nitroimidazol - 2 - ylmethyl carbamate, wherein $R_1$ is as shown on page 2 above provided that $R_1$ is other than hydroxyalkyl, carboxyalkyl, or carbamoylalkyl, is dissolved in an excess of dialkylformamide, suitably dimethylformamide and a small excess of a thionyl halide, such as thionyl chloride is added thereto. The mixture is allowed to stand at a temperature of from about 15° C. to about 30° C. for from about 12 to about 24 hours. In the preferred method of isolation, the product is obtained as a crystalline precipitate and is separated from the reaction mixture for filtration.

Among the compounds which may be produced in accordance with this procedure are N'-(1-methyl-5-nitroimidazol-2-ylmethoxycarbonyl) $N^2,N^2$ - dimethylformamidinium chloride hydrochloride, N' - (1 - methyl-5-nitroimidazol-2-ylmethoxycarbonyl) $N^2,N^2$ - dimethylformamidinium bromide hydrobromide, N' - (1 - ethyl - 5 - nitroimidazol- - 2 - ylmethoxycarbonyl) $N^2,N^2$ - dimethylformamidinium chloride hydrochloride, and N' - (1-acetoxyethyl - 5 - nitroimidazol - 2 - ylmethoxycarbonyl) $N^2,N^2$-dimethylformamidinium chloride hydrochloride.

(xv) 5-nitroimidazol-2-ylalkyl N-formylcarbomates

5 - nitroimidazol - 2 - ylalkyl N - formylcarbamates may be produced by reacting an N'-5-nitroimidazol-2-ylalkoxycarbonyl $N^2,N^2$-dialkylformamidinium halide hydrohalide in a mild alkaline hydrolyzing agent. In the preferred modification of the procedure, an N'(1-$R_1$-5-nitroimidazol - 2-ylmethoxycarbonyl) $N^2,N^2$-dialkylformamidinium halide hydrohalide, as produced in accordance with the aforementioned procedure, is dissolved in a mild aqueous base, a solution of sodium bicarbonate in water being preferred, and the solution allowed to stand at a temperature of 15° to 30° C. for from about 12 to about 24 hours. The product may be isolated as the residue by filtration.

It should be noted that 1-hydroxyalkyl or 1-carboxyalkyl compounds of this class cannot be prepared by this method, although the corresponding acyloxy derivatives, that is to say, 1-acyloxyalkyl and 1-carboxyacyl analogs may be obtained. It should be noted that an attempted hydrolysis of the acyl groups would simultaneously remove the formyl substitutent on the carbamyl group.

(xvi) 5-nitroimidazol-2-ylalkyl N-nitrocarbamates 5-nitroimidazol - 2 - ylalkyl N-nitrocarbamates may be produced by reaction of a 5-nitroimidazol-2-ylalkyl carbamate with nitric acid. In the preferred modification of the procedure, the 5-nitroimidazol-2-ylalkyl carbamate, suitably a 1-$R_1$-5-nitroimidazol-2-ylmethyl carbamate, wherein $R_1$ is as shown on page 2 above, suitably 1-methyl-5-nitroimidazol-2-ylmethyl carbamate, is dissolved in an alkanoic anhydride, such as acetic anhydride and treated with an equimolar amount of 95% nitric acid. After standing at a temperature of from about 15° to about 30° C. for a period of from about 15 minutes to 2 hours, the reaction is quenched, suitably by pouring the reaction mixture into an aqueous solution. The product may then be isolated, suitably by extraction of the aqueous mixture with a suitable water immiscible organic solvent and work up in the usual manner.

A suitable form in which the product may be obtained is as the ammonium salts. This may be obtained by saturating the previously dried extract of the reaction mixture in the aforementioned organic solvent with ammonia gas and separating the precipitate thus produced as a residue by filtration.

Among the compounds which may be obtained by this procedure are: 1 - methyl-5-nitroimidazol-2-ylmethyl N-nitrocarbamate, 1 - methyl-5-nitroimidazol-2-ylmethyl N-methyl-N-nitrocarbamate, and 1 - ethyl-5-nitroimidazol-2-ylmethyl N-nitrocarbamate.

(xvii) 5-nitroimidazol-2-ylalkyl $N^2$-alkylidenecarbazates 5-nitroimidazol-2-ylalkyl $N^2$-alkylidenecarbazates may be produced by reacting a 5 - nitroimidazol - 2 - ylalkyl carbazate with a carbonyl compound. In the preferred modification of the procedure, a 1-$R_1$-5-nitroimidazol-2-ylmethyl carbazate wherein $R_1$ is as shown on page 2 above, such as 1-methyl-5-nitroimidazol-2-ylmethyl carbazate, is allowed to react (with or without a solvent) with an excess of carbonyl compound suitably an aldehyde or ketone, for example benzaldehyde, acetone, methylethylketone or acetophenone, and heated under reflux, for example, at a temperature of between 40° C. and 120° C. for a period of from 5 to 30 minutes. The product is then isolated, suitably the solvent is removed under reduced pressure and the product recrystallized from the residue. It should be noted that compounds wherein $R_1$ is oxoalkyl cannot be produced by this method.

Included among the compounds which may be produced in accordance with this procedure are:

1-methyl-5-nitroimidazol-2-ylmethyl $N^2$-butylidenecarbazate,
1-ethyl-5-nitroimidazol-2-ylmethyl $N^2$-benzylidenecarbazate, and
1-(1'-(2''-hydroxyethyl)-5'-nitroimidazol-2'-yl)ethyl $N^2$-isopropylidenecarbazate.

(xviii) 5-nitroimidazol-2-ylalkyl N-acyl-N-acyloxycarbamates

5 - nitroimidazol-2-ylalkyl N-acyl-N-acyloxycarbamates may be produced by reacting a 5-nitroimidazol-2-ylalkyl N-hydroxycarbamate with an excess of an acyl anhydride in the presence of a base catalyst. In a further modification of the process, a 1-$R_1$-5-nitroimidazol-2-ylalkyl N-hydroxycarbamate, wherein $R_1$ is as shown on page 2 above, but having a value other than hydroxyalkyl or carboxyalkyl, such as 1-methyl-5-nitroimidazol-2-ylmethyl N-hydroxycarbamate is heated together with a weak base, suitably potassium acetate or sodium carbonate, and respectively an alkanoic anhydride or aralkanoic anhydride, for example, acetic anhydride, propionic anhydride or benzoic anhydride, at a temperature of from about 70° C. to about 100° C. for a period of from about 1 to about 5 hours. The product may then be isolated. Suitably, the isolation is carried out by removing the volatile components from the reaction mixture at reduced pressure and extracting the residue with a mixture of water and a water immiscible organic solvent, suitably chloroform. The product is then isolated and the chloroform extracted in the usual manner.

Included among the compounds which may be produced by the above procedure are:

1-methyl-5-nitroimidazol-2-ylmethyl N-acetyl-N-acetoxycarbamate,
1-ethyl-5-nitroimidazol-2-ylmethyl N-butyryl-N-butyroxycarbamate,
1-(1'-ethyl-5'-nitroimidazol-2-yl)ethyl N-benzoyl-N-benzloxycarbamate, and
2-(1'-ethyl-5'-nitroimidazol-2'-yl)ethyl N-phenylacetyl-N-phenylacetoxycarbamate.

(xix) 1-methyl-5-nitroimidazol-2-ylmethyl N-diaminophosphoryl and N-aminosulfonyl carbamates 1 - methyl-5-nitroimidazol-2-ylmethyl N-diaminophosphoryl and N-aminosulfonyl carbamates may be prepared by reacting a 2-hydroxymethyl or 2-mercaptomethyl-5-nitroimidazole with a dihalophosphoryl or halosulfonylisocyanate followed by reaction with a suitable amine. In the preferred procedure, a 1-$R_1$-2-hydroxymethyl-5-nitroimidazole wherein $R_1$ is as shown on page 2 above, provided that $R_1$ is other than hydroxyalkyl, for example, 1-methyl-2-hydroxymethyl-5-nitroimidazole, is taken up in a reaction inert organic solvent, for example a hydrocarbon solvent such as benzene or an ether such as tetrahydrofuran or 1,2-dimethoxyethane, suitably, but not critically, in the presence of a trace of an organic base, such as pyridine and heated with dichlorophosphorylisocyanate or chlorosulfonylisocyanate under reflux for from about 30 minutes to about 2 hours. The solvent is then removed under reduced pressure and the product taken up in a suitable solvent, for example tetrahydrofuran, and treated with the desired amine, for example gaseous ammonia, an alkylamine such as methylamine or butylamine, an arylamine such as aniline or an aralkylamine such as benzylamine or a secondary amine such as morpholine. The mixture is allowed to stand for from 1 to 4 hours at from 10° C. to 30° C., filtered, and the solvent removed from the filtrate under reduced pressure. The product is then isolated. In a suitable procedure, the residue from the filtration is dissolved in water and any insoluble material is combined with the residue from the evaporation of the solvent and the combined fractions recrystallized suitably from a loweralkanol such ethanol to yield the desired 1-methyl-5-nitroimidazol-2-ylmethyl N-substituted diaminophosphoryl or N-substituted aminophosphoryl carbamate.

(xx) 3-nitro-5,6-dihydroimidazo-[1,2-α]pyrrol-7-yl-carbamates 3-nitro - 5,6 - dihydroimidazo-[1,2-α]pyrrol-7-yl carbamates may be prepared in the following manner:

3-nitro - 7 -oxo-5,6-dihydroimidazo-[1,2-α]pyrrole is reduced to the corresponding 7-hydroxy compound and then converted into the corresponding 7-yl carbamate by means of any of the general procedures for the formation of carbamates disclosed in the present application, preferably method (v), wherein the hydroxy compound is reacted with a phenylhaloformate and subsequently treated with an amine. In the preferred modification of this procedure, 3-nitro-7-oxo-5,6-dihydroimidazo - [1,2-α]pyrrole is taken up in a lower alkanol such as ethanol, and treated with a reducing agent, suitably an organo metallic reducing agent, sodium borohydride being especially suitable, and the reaction mixture is allowed to stand at a temperature of from about 10° C. to about 25° C. for a period of from about 4 to about 8 hours. The product is then isolated. In the preferred method, a small amount of a volatile acid suitably an organic acid, such as a lower alkanoic acid, suitably acetic acid, is added to decompose the excess borohydride. The reaction mixture is concentrated to small volume under reduced pressure and an excess of water added slowly. The 3-nitro-7-oxo - 5,6 - dihydroimidazo-[1,2-α]pyrrole separates as a precipitate and is isolated by filtration.

The dried 3-nitro - 7 - hydroxy - 5,6 - dihydroimidazo-[1,2-α]pyrrole is taken up in an organic base, suitably pyridine, lutidine or collidine and treated with a phenylhaloformate, suitably phenylchloroformate, and the reaction allowed to proceed and the product isolated as set forth in Section I–v. above. The product, 3-nitro-5,6-dihydroimidazo-[1,2-α]pyrrol-7-yl phenyl carbonate is then taken up in a suitable inert organic solvent, a halo hydrocarbon such as chloroform being especially suitable. Where it is desired to produce the corresponding carbamate itself, the solution is added to an approximately equal volume of liquid ammonia, maintained at a temperature of from about −35° C. to about −75° C. The reaction mixture is then worked up in the usual manner and the product isolated.

Where it is desirable to obtain an N-substituted carbamate, the solution of the 3 - nitro-5,6-dihydroimidazo-[1,2-α]pyrrol-7-yl-phenyl carbonate in chloroform, is reacted with a substituted amine as set forth in the various procedures for the preparation of these compounds hereinabove.

Among the products which may be produced in accordance with this procedure are 3-nitro-5,6-dihydroimidazo-[1,2-α]pyrrol-7-yl carbamate and the N-substituted derivatives thereof.

The 1-substituted-2-imidazolylalkyl carbamates of Formulas I and II above have antiprotozoal activity, and are particularly active against the causative organisms of the protozoal parasitic diseases trichomoniasis and enterohepatitis. Certain of them are also effective against amoebiasis and trypanosomiasis, as well as against the PPLO organisms and schistosomes. It will, of course, be understood that the compounds different in their degree of efficacy against these various organisms.

Trichomoniasis is a protozoan disease caused by parasites of the genus Trichomonas. The compounds of the invention are effective against the particularly troublesome form of trichomoniasis known as *T. vaginalis vaginitis*, caused by infestation of the vagina with *T. varginalis*. In treating this disease, the imidazolylalkyl carbamates may be administered either orally or topically. For oral administration unit dosage, forms such as tablets or capsules are normally employed which may contain from about 50 to about 500 mg. of active ingredient. These are prepared by techniques known in the art, and contain the usual diluents, granulating agents, extenders and/or lubricating agents known to be satisfactory for the compounding of tablets and capsules. It is preferred to administer the compounds of the invention orally at a dose level of from about 25–1,000 mg./day, in either single or divided doses with divided doses being used more frequently than a single daily dose. An example of a suitable compressed tablet is the following:

| Component: | Mg. per tablet |
|---|---|
| 1-methyl - 5 - nitroimidazol-2-ylmethyl carbamate | 250 |
| Dicalcium phosphate | 100 |
| Lactose | 75 |
| Starch | 50 |
| Guar gum | 12 |
| Magnesium stearate | 2–3 |

If desired, tablets may be sugar coated or enteric coated by standard techniques. Alternatively, the antitrichomonal agent may be formulated in capsule form using fillers such as lactose, starch or kaolin. A typical capsule would contain 250 mg. of, for instance, 1-methyl-5-nitroimidazol-2-ylmethyl methylcarbamate, 2–3 g. of magnesium stearate and about 75 mg. of lactose in a No. 0 size capsule. Tablets and capsules containing smaller quantities of active ingredient may be made by reducing proportionately the amounts of excipients and diluents illustrated above. Alternatively, the carbamates may be administered orally in liquid pharmaceutical vehicles such as solutions, emulsions, syrups or suspensions containing the diluents, flavoring agents and preservatives customarily employed in the pharmaceutical art.

For topical application, vaginal creams or suppositories containing the active ingredient may be used. To illustrate, a cream is prepared by mixing sufficient quantities of hydrophilic ointment and water, containing from about 5–10% by weight of carbamate, in sufficient quantities to produce a cream having the desired consistency.

Representative examples of carbamates of this invention that are highly active and thus particularly useful for treating trichomoniasis are:

1-methyl-5-nitroimidazol-2-ylmethyl carbamate,
1-methyl-5-nitroimidazol-2-ylmethylmethylcarbamate,
1-methyl-5-nitroimidazol-2-ylmethyl-4-morpholine-carboxylate,
1-methyl-5-nitroimidazol-2-ylmethyl thiolcarbamate,
1-methyl-5-nitroimidazol-2-ylmethyl methylthioncarbamate,
1-methyl-5-nitroimidazol-2-ylmethyl thioncarbamate,
1-(1'-methyl-5'-nitroimidazol-2'-yl)ethyl carbamate,
1-(1'-methyl-5'-nitroimidazol-2'-yl)ethyl hydroxycarbamate,
1-methyl-5-nitroimidazol-2-ylmethyl hydroxycarbamate,
1-ethyl-5-nitroimidazol-2-ylmethyl carbamate, and
1-ethyl-5-nitroimidazol-2-ylmethyl hydroxycarbamate.

These represent preferred anti-trichomonal agents of the invention, although the other imidazolylalkyl carbamates of the invention are of value against this disease.

Enterohepatitis is a disease occurring primarily in turkeys and is caused by the protozoan parasite *Histomonas meleagridis*. It is also known as turkey blackhead disease. The imidazolylalkyl carbamates of this invention are useful in the prevention and treatment of this disease and for this purpose are administered to turkeys mixed with an element of turkey sustenance, i.e. in the feed or drinking water. Although the optimum dose level will depend on the particular compound employed and the severity of the infection, good control of enterohepatitis is obtained by orally administering to the turkeys a feed containing from about 0.003% to about 0.1% by weight of carbamate. When the material is administered via the drinking water, somewhat higher levels may be employed, especially for therapeutic use. For instance, the drinking water may contain up to about 0.2% by weight of the active ingredient with good results. Those substances previously mentioned as preferred anti-trichomonal agents are also among those preferred in combating turkey blackhead.

As previously stated, the imidazolylalkyl carbamate described herein may also be employed against trypanosomiasis and amoebiasis. In addition, certain of them, and particularly 1 - methyl-5-nitroimidazol-2-ylmethyl carbamate, 1-methyl-5-nitroimidazol-2-ylmethyl hydroxycarbamate and 1-ethyl-5-nitroimidazol-2-ylmethyl carbamate, possess activity against the pleuro-pneumonia like organisms which have come to be known as PPLO organisms.

The imidazolylalkyl carbamates are effective against PPLO organisms when the compound is administered to fowl or swine in feed containing from about 0.003% to about 0.1% by weight of carbamate. The preferred dosage level, however, is between from about 0.003% to 0.08% by weight.

Certain of the substituted imidazoles which are employed as intermediates in making those nek imidazolylalkyl carbamates also possess useful anti-parasitic activity. Of particular interest in this regard are the l-loweralkylthiocyanoalkyl-5-nitroimidazoles, and expecially 1-methyl - 2 - thiocyanomethyl-5-nitroimidazole. The compounds have anti-trichomonal activity and may be employed against trichomoniasis in the same manner and within the same dose levels as described previously for the imidazolylalkyl carbamates.

The following examples are given for the purpose of illustration and not by way of limitation.

EXAMPLE 1

1-methyl-5-nitroimidazol-2-yl-methyl chloroformate 3.12 g. 1-methyl-2-hydroxymethyl-5-nitroimidazole is dissolved in a mixture of 4.3 ml. of dimethylaniline and 20 ml. of dioxane. This solution is then added dropwise to 30 ml. of phosgene. The resulting suspension is stirred for two hours at 0.5° C., and then for two hours at room temperature. The solvent is then removed by blowing dry nitrogen through the suspension for two hours. The oil remaining at the end of this time consists predominantly of 1-methyl-5-nitroimidazol-2-ylmethyl chloroformate.

In accordance with the above procedure, but starting with 1-methyl-2-mercaptomethyl - 5 - nitroimidazole, in place of 1-methyl - 2 - hydroxymethyl-5-nitroimidazole, there is obtained 1 - methyl-5-nitroimidazol-2-yl-methyl chlorothioformate.

In accordance with the above procedure and starting with either of the aforementioned nitroimidazoles but using thiophosgene in place of phosgene, there is obtained 1 - methyl-5-nitroimidazol-2-yl-methyl chlorothioformate and 1-methyl-5-nitroimidazol-2-yl-methyl chlorodithioformate.

EXAMPLE 2

1-methyl-5-nitroimidazol-2-ylmethyl carbamate 0.05 g. of 1-methyl-5-nitroimidazol-2-ylmethyl phenyl carbonate is dissolved slowly in 50 ml. of liquid ammonia. After solution is complete, the ammonia is permitted to evaporate and the residue washed with ethanol and recrystallized from methanol to yield 1-methyl-5-nitroimidazol-2-ylmethyl carbamate; M.P. 166–170° C.

In accordance with the above procedure, but starting with 1-(1-methyl-5-nitroimidazol-2-yl)-ethyl phenyl carbonate, 2 - (1-methyl-5-nitroimidazol-2-yl)ethyl phenyl carbonate and 3-(1-methyl-5-nitroimidazol-2-yl)-prop-2-en-1-yl phenyl carbonate in place of 1-methyl-5-nitroimidazol-2-yl-methyl phenyl carbonate there is obtained the corresponding 1-(1-methyl-5-nitroimidazol-2-yl)ethyl carbamate, 2-(1-methyl - 5 - nitroimidazol-2-yl)ethyl carbamate, and 3 - (1-methyl-5-nitroimidazol-2-yl)prop-2-enyl carbamate.

EXAMPLE 3

1-methyl-5-nitroimidazol-2-ylmethyl carbamate 3.12 g. of 1-methyl-2-hydroxymethyl-5-nitroimidazole is dissolved in 100 ml. of methylene dichloride and cooled to 0° C. 2.64 g. of sodium cyanate and 4.5 g. of trifluoroacetic acid are added. The flask is stoppered tightly and the mixture stirred for 24 hours at 0° C. 200 ml. of methylene chloride is then added and the mixture washed with saturated aqueous potassium bicarbonate solution. The methylene chloride solution is concentrated to dryness in vacuo to give a residue of 1-methyl-5-nitro-2-imidazolylmethyl carbamate. This solid is recrystallized from a minimum volume of ethyl acetate to give substantially pure 1 - methyl - 5-nitroimidazol-2-ylmethyl carbamate; M.P. 166–170° C.

EXAMPLE 4

1-methyl-5-nitroimidazol-2-ylmethyl thiolcarbamate 1.35 g. of 1-methyl-2-chloromethyl-5-nitroimidazole is dissolved in 25 ml. of dry ethanol at room temperature, and 1.11 g. of potassium thiocyanate is added to this solution. The resulting mixture is refluxed for two hours and then allowed to stand at room temperature for about 12 hours. It is warmed to about 75° C. on a steam bath and the solid material removed by filtration. The filtrate is diluted with an equal volume of water and the resulting solution chilled and scratched to induce crystallization. The solid which forms is removed by filtration, washed with ice-water and dried. It is 1-methyl-2-thiocyanomethyl-5-nitroimidazole; M.P. 87–88° C. This product is crystallized from a minimum volume of benzene containing a trace of hexane to give yellow crystals of 1-methyl-2-thiocyanomethyl-5-nitroimidazole; M.P. 87.5–88° C.

5 g. of 1-methyl-2-thiocyanomethyl-5-nitroimidazole is added portionwise over a period of 15 minutes to 25 ml. of cold concentrated sulfuric acid. The resulting solution is held at 0° C. for about 14 hours and then poured onto an excess of crushed ice. The solution is adjusted to pH 6 with saturated potassium bicarbonate solution. The solid material is removed by filtration and washed with ice-water. The solid is extracted with about 10 ml. of ethyl acetate and the ethyl acetate solution dried over sodium sulfate and then concentrated essentially to dryness. A small volume of hexane is added to the residue and the solid 1-methyl-5-nitro-2-imidazolylmethyl thiolcarbamate removed by filtration. There are obtained in this way 4.34 g. of 1-methyl-5-nitroimidazol-2-ylmethyl thiolcarbamate; M.P. 138–140° C.

EXAMPLE 5

1-methyl-5-nitroimidazol-2-ylmethyl carbamate 1-methyl-5-nitroimidazol-2-ylmethyl chloroformate as obtained in accordance with Example 1 is cooled to 0° C. and 25 ml. of liquid ammonia added thereto. The resulting mixture is stirred for 10 minutes in the cold and then an additional 25 ml. of liquid ammonia is added. The mixture is then allowed to warm to room temperature and stirred until the excess ammonia evaporates. The residue thus obtained is dissolved in 100 ml. of water and the aqueous solution extracted with three 100 ml. portions of ethyl acetate. The ethyl acetate extracts are combined, back-washed with 25 ml. of water and then dried over sodium sulfate. The ethyl acetate is then concentrated to dryness in vacuo to give a residue consisting of 1-methyl-5-nitro-imidazol-2-ylmethyl carbamate. The product is recrystallized from ethyl acetate and then from water to give substantially pure material; M.P. 172–173° C.

In accordance with the above procedure but starting with 1-methyl - 5 - nitroimidazol-2-ylmethyl chlorothiolformate, 1-methyl - 5 - nitroimidazol-2-ylmethyl chlorothion-formate, 1-methyl - 5 - nitroimidazol-2-ylmethyl chlorodithio-formate in place of 1-methyl-5-nitroimidazol-2-ylmethyl chloroformate, there is obtained the corresponding 1-methyl-5-nitroimidazol-2-ylmethyl thiolcarbamate, 1-methyl-5-nitroimidazol - 2 - ylmethyl thioncarbamate, and 1-methyl-5-nitroimidazol-2-ylmethyl dithiocarbamate.

EXAMPLE 6

1-methyl-5-nitroimidazol-2-ylmethyl carbamate 3.1 g., (0.02 mole) of (1-methyl-2-hydroxymethyl)-5-nitroimidazole is dissolved in 100 ml. of benzene and 25 ml. of pyridine. 1.9 g., (0.022 mole) of gaseous carbamyl chloride is introduced into the stirred solution. The solution is allowed to stand at 15° C. for 8 hours and then concentrated under reduced pressure. The residue is taken up in ethyl acetate, washed with ice-water, and the ethyl acetate extract dried over sodium sulfate. On evaporation of the solvent under reduced pressure, the residue is recrystallized from acetone or ethyl acetate to yield 1-methyl-5-nitroimidazol-2-ylmethyl carbamate; M.P. 166–170° C.

In accordance with the above procedure but using dimethylcarbamyl chloride or diethylcarbamyl chloride and adding these reagents in liquid rather than gaseous form to the reaction mixture in place of using carbamyl chloride, there is obtained the corresponding 1-methyl-5-nitroimidazol - 2 - ylmethyl N,N-dimethylcarbamate and 1-methyl-5-nitroimidazol-2-ylmethyl N,N-diethylcarbamate.

In accordance with the above procedure but using thiocarbamoyl chloride, dimethylthiocarbamoyl chloride, and diethylcarbamoyl chloride, in place of carbamoyl chloride, there is obtained 1-methyl - 5 - nitroimidazol-2-ylmethyl thioncarbamate, 1-methyl-5-nitroimidazol - 2 - ylmethyl N,N-dimethylthioncarbamate, and 1-methyl - 5 - nitroimidazol-2-ylmethyl N,N-diethylthioncarbamate.

EXAMPLE 7

1-methyl-5-nitroimidazol-2-ylmethyl thiolcarbamate 3.5 g., (.02 mole) of 1-methyl-2-mercapto methyl-5-nitroimidazole is dissolved in 100 ml. of benzene and 25 ml. of pyridine under nitrogen. 1.9 g., (0.022 mole) of gaseous carbamoyl chloride is introduced into the stirred solution. The solution is allowed to stand at 15° C. for 8 hours and then concentrated under reduced pressure. The residue is taken up in ethyl acetate, washed with ice-water and the ethyl acetate extract dried over sodium sulfate. On evaporation of the solvent under reduced pressure, the residue is recrystallized from acetone or ethyl acetate to yield 1-methyl-5-nitroimidazol-2-ylmethyl thiolcarbamate; M.P. 138–140° C.

In accordance with the above procedure but using dimethylcarbamyl chloride or diethylcarbamyl chloride and adding these reagents in liquid rather than gaseous form to the reaction mixture in place of carbamoyl chloride, there is obtained the corresponding 1-methyl-5-nitroimidazol - 2 - ylmethyl N,N-dimethylthiolcarbamate and 1-methyl - 5 - nitroimidazol-2-ylmethyl N,N-diethylthiolcarbamate.

In accordance with the above procedure but using thiocarbamoyl chloride and dimethylthiocarbamoyl chloride and diethylcarbamoyl chloride, in place of carbomoyl chloride, there is obtained 1-methyl-5-nitroimidazol-2-ylmethyl dithiocarbamate, 1 - methyl-5-nitroimidazol-2-ylmethyl N,N-dimethyldithiocarbamate, and 1-methyl-5-nitroimidazol-2-ylmethyl N,N-diethyldithiocarbamate.

EXAMPLE 8

1-methyl-5-nitroimidazol-2-ylmethyl carbamate 1.57 g. (0.01 mole) of 1-methyl-2-hydroxymethyl-5-nitroimidazole, 0.1 g. sodium ethoxide, 10 g. of ethyl carbamate, and 20 ml. of benzene are heated under reflux for 2 hours. The solvent is removed under reduced pressure and the residue stirred with 10 ml. of water. The mixture is extracted with ethyl acetate. The ethyl acetate fraction is dried over sodium sulfate and evaporated to give crude 1-methyl-5-nitroimidazol-2-ylmethyl carbamate.

In accordance with the above procedure but starting with 1-methyl-2-mercaptomethyl - 5 - nitroimidazole, in place of 1-methyl-2-hydroxy methyl-5-nitroimidazole and using ethyl carbamate, there is obtained the corresponding 1-methyl-5-nitroimidazol-2-ylmethyl thiolcarbamate.

EXAMPLE 9

1-methyl-5-nitroimidazol-2-ylmethyl methylcarbamate 6 g. of 1-methyl-2-hydroxymethyl-5-nitroimidazole and 3.5 ml. of methyl isocyanate are added to 200 ml. of benzene containing 0.5 ml. of pyridine. The resulting mixture is refluxed until complete solution is obtained. The solvent is then removed by evaporation under reduced pressure. The partially crystalline material thus obtained is recrystallized from 12 ml. of water to give 1.14 g. of 1-methyl-5-nitroimidazol-2-ylmethyl methylcarbamate; M.P. 99–101° C.

In accordance with the above procedure, but starting with 1-methyl-2-mercaptomethyl - 5 - nitroimidazole, in place of 1-methyl-2-hydroxymethyl - 5 - nitroimidazole, there is obtained the corresponding 1-methyl-5-nitroimidazol-2-yl-methyl thiolcarbamate.

EXAMPLE 10

1-methyl-5-nitroimidazol-2-ylmethyl methylthioncarbamate 0.5 g. of 1-methyl-2-hydroxymethyl-5-nitroimidazole and 0.28 g. of methyl isothiocyanate are added to 20 ml. of benzene containing 0.54 ml. of triethylamine. The resulting mixture is refluxed for 23 hours. It is then concentrated almost to dryness in vacuo and the solid material removed by filtration. This product is 1-methyl-5-nitroimidazol-2-ylmethyl methylthioncarbamate; M.P. 133.5–135° C. It is recrystallized from water to give substantially pure material; M.P. 135.5–136° C.

In accordance with the above procedure, but starting with 1-methyl-2-mercaptomethyl - 5 - nitroimidazole, in place of 1-methyl-2-hydroxymethyl - 5 - nitroimidazole, there is obtained the corresponding 1-methyl-5-nitroimidazol-2-ylmethyl dithiocarbamate.

EXAMPLE 11

2-(1-methyl-5-nitroimidazol-2-ylmethyl) pseudourea hydrofluoroborate

A mixture of 3.14 g., (0.02 mole) of 1-methyl-2-hydroxymethyl-5-nitroimidazole, 2.6 ml. of boron trifluoride diethylether, 50 ml. of 1,2-dimethoxyethane, and 1.0 g. of cyanamide is allowed to stand at 0° C. for 3 days. Anhydrous hydrogen fluoride (0.02 mole) in about 10 ml. of benzene is added. After the addition of another 40 ml. of benzene, the product 2-(1-methyl-5-nitroimidazol-2-ylmethyl) pseudourea hydrofluoroborate is obtained by filtration.

EXAMPLE 12

2-(1-methyl-5-nitroimidazol-2-ylmethyl)-1,3-diethylpseudourea hydrochloride

A mixture of 3.14 g., (0.02 mole) of 1-methyl-2-hydroxymethyl-5-nitroimidazole, 2.0 g., (0.02 mole) of diethylcarbodiimide and 100 ml. of 1,2-dimethoxyethane is allowed to stand at room temperature for 2 days. The addition of gaseous hydrogen chloride (0.7 g.), followed by 50 ml. of hexane results in the crystallization of product. After filtration, and washing with diethyl ether, 2-(1 - methyl-5-nitroimidazol-2-ylmethyl) - 1,3 - diethylpseudourea hydrochloride is obtained.

EXAMPLE 13

S-(1-methyl-5-nitroimidazol-2-ylmethyl) pseudothiourea hydrochloride 0.25 g. (.0016 mole) of 1-methyl-2-chloromethyl-5-nitroimidazole and 0.106 g., (.0014 mole) of thiourea are added to 2 ml. of dry ethanol and the resulting mixture refluxed for 17 hours. At the end of this time, the mixture is cooled to about 15° C. and the solid material removed by filtration. The solid product is washed with a few ml. of alcohol and ether, and air-dried. Recrystallization is accomplished from a mixture of 4–5 ml. of ethanol and 2–3 ml. of methanol. The solution is filtered hot, then concentrated to a volume of about 6 ml. and chilled. The S-(1-methyl-5-nitroimidazol-2-ylmethyl)isothiouronium chloride is filtered, washed with alcohol and then ether, and dried to give substantially pure material; M.P. 200° C.

In accordance with the above procedure but starting with 1-methyl-2-chloromethyl-5-nitroimidazole, 1-methyl-2-(1'-chloroethyl) - 5 - nitroimidazole, 1-acetoxyethyl-2-chloromethyl-5-nitroimidazole, in place of 1-methyl-2-chloromethyl-5-nitroimidazole, there is obtained the corresponding S-(1-methyl-5-nitroimidazol - 2 - ylmethyl)-pseudothiourea, S-1'-[1'-methyl - 5' - nitroimidazol-2'-yl]-ethyl pseudo-thiourea, and S-(1-acetoxyethyl-5-nitroimidazol-2-ylmethyl)-pseudo-thiourea.

Similarly, but using dimethylthiourea in place of thiourea, there is obtained the corresponding S-(1-methyl-5-nitroimidazol-2-ylmethyl)-pseudo-dimethylthiourea.

EXAMPLE 14

2-(1-methyl-5-nitroimidazol-2-ylmethyl-thio)-2-imidazoline 0.175 g. (0.001 mole) of 1-methyl-2-chloromethyl-5-nitroimidazole and 0.102 g. (0.001 mole) of imidazolidine-2-thione are dissolved in 5 ml. of ethanol and heated under reflux for 30 minutes, after which time a crystalline precipitate is produced. The mixture is heated under reflux for a further 2 hours, cooled and filtered to yield 2-(1-methyl - 5 - nitroimidazol - 2 - ylmethyl-thio)-2-imidazoline; M.P. 220–226° C. (dec.).

EXAMPLE 15

1-n-butyl-5-nitroimidazol-2-ylmethyl carbamate

A mixture of 16.9 g. (0.1 mole) of 1-n-butyl-5-nitroimidazole, 15 g. (0.5 mole) of paraformaldehyde and 150 ml. of dimethylsulfoxide is heated in a sealed tube overnight at 110–150° C. The dimethylsulfoxide is removed completely at reduced pressure, and the residue is dissolved in water and extracted with chloroform. The chloroform extract is dried and concentrated. The residue is dissolved in ethyl acetate, and the solution is charged on a column of alumina. Elution with ethyl acetate and evaporation of the solvent yields 1-n-butyl-2-hydroxymethyl-5-nitroimidazole.

A solution of 2.0 g. (0.01 mole) of 1-n-butyl-2-hydroxymethyl-5-nitroimidazole in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 1-n-butyl-5-nitroimidazol-2-ylmethyl phenyl carbonate is separated by filtration.

A solution of 640 mg. (0.002 mole) of 1-n-butyl-5-nitroimidazol-2-ylmethyl phenyl carbonate in 10 ml. of chloroform, cooled in an ice-bath, is saturated with dry ammonia. The mixture is allowed to stand for 1 day at 5° C. 1-n-butyl-5-nitroimidazol-2-ylmethyl carbamate is obtained after evaporating the solvent and washing the residue with water.

In accordance with the above procedure, but starting with 1-methyl-5-nitroimidazole, 1-ethyl-5-nitroimidazole and 1-propyl-5-nitroimidazole, in place of 1-n-butyl-5-nitroimidazole, there is obtained the corresponding 1-methyl - 5 - nitroimidazol - 2 - ylmethyl carbamate, 1-ethyl-5-nitroimidazol-2-ylmethyl carbamate, and 1-propyl-5-nitroimidazol-2-ylmethyl carbamate.

EXAMPLE 16

1-benzyl-5-nitroimidazol-2-ylmethyl carbamate

A mixture of 20.3 g. (0.1 mole) of 1-benzyl-5-nitroimidazole, 15 g. (0.5 mole) of paraformaldehyde and 150 ml. of dimethylsulfoxide is heated in a sealed tube overnight at 110–150° C. The dimethylsulfoxide is removed completely at reduced pressure, and the residue is dissolved in water and extracted with chloroform. The chloroform extract is dried and concentrated. The residue is dissolved in ethyl acetate, and the solution is charged on a column of alumina. Elution with ethyl acetate and evaporation of the solvent yields 1-benzyl-2-hydroxymethyl-5-nitroimidazole.

A solution of 2.3 g. (0.01 mole) of 1-benzyl-2-hydroxymethyl-5-nitroimidazole in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 1-benzyl-5-nitroimidazol-2-ylmethyl phenyl carbonate is separated by filtration.

A solution of 706 mg. (0.002 mole) of 1-benzyl-5-nitroimidazol-2-ylmethyl phenyl carbonate in 10 ml. of chloroform, cooled in an ice-bath, is saturated with dry ammonia. The mixture is allowed to stand for 1 day at 5° C. 1-benzyl-5-nitroimidazol - 2 - ylmethyl carbamate is obtained crystalline after evaporating the solvent and washing the residue with water.

EXAMPLE 17

1-allyl-5-nitroimidazol-2-ylmethyl carbamate

A mixture of 15.3 g. (0.1 mole) of 1-allyl-5-nitroimidazole, 15 g. (0.5 mole) of paraformaldehyde and 150 ml. of dimethylsulfoxide is heated in a sealed tube overnight at 110–150° C. The dimethylsulfoxide is removed completely at reduced pressure, and the residue is dissolved in water and extracted with chloroform. The chloroform extract is dried and concentrated. The residue is dissolved in ethyl acetate, and the solution is charged on a column of alumina. Elution with ethyl acetate and evaporation of the solvent yields 1-allyl-2-hydroxymethyl-5-nitroimidazole.

A solution of 1.83 g. (0.01 mole) of 1-allyl-2-hydroxymethyl-5-nitroimidazole in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 1-allyl-5-nitroimidazol-2-ylmethyl phenyl carbonate is separated by filtration.

A solution of 606 mg. (0.002 mole) of 1-allyl-5-nitroimidazol-2-ylmethyl phenyl carbonate in 10 ml. of chloroform, cooled in an ice-bath, is saturated with dry ammonia. The mixture is allowed to stand for 1 day at 5° C. 1-allyl-5-nitroimidazol-2-ylmethyl carbamate is obtained crystalline after evaporating the solvent and washing the residue with water.

EXAMPLE 18

1-phenyl-5-nitroimidazol-2-ylmethylcarbamate

A mixture of 18.9 g. (0.1 mole) of 1-phenyl-5-nitroimidazole, 15 g. (0.5 mole) of paraformaldehyde and 150 ml. of dimethylsulfoxide is heated in a sealed tube overnight at 110–150° C. The dimethylsulfoxide is removed completely at reduced pressure, and the residue is dissolved in water and extracted with chloroform. The chloroform extract is dried and concentrated. The residue is dissolved in ethyl acetate, and the solution is charged on a column of alumina. Elution with ethyl acetate and evaporation of the solvent yields 1-phenyl-2-hydroxymethyl-5-nitroimidazole.

A solution of 2.19 g. (0.01 mole) of 1-phenyl-2-hydroxymethyl-5-nitroimidazole in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 1-phenyl-5-nitroimidazol-2-ylmethyl phenyl carbonate is separated by filtration.

A solution of .678 mg. (0.002 mole) of 1-phenyl-5-nitroimidazol-2-ylmethyl phenyl carbonate in 10 ml. of chloroform, cooled in an ice-bath, is saturated with dry ammonia. The mixture is allowed to stand for 1 day at 5° C. 1-phenyl-5-nitroimidazol-2-ylmethyl carbamate is obtained crystalline after evaporating the solvent and washing the residue with water.

EXAMPLE 19

1-p-nitro phenyl-5-nitroimidazol-2-ylmethyl carbamate

A mixture of 23.4 g. (0.1 mole) of 1-p-nitro phenyl-5-nitroimidazole, 15 g. (0.5 mole) of paraformaldehyde and 150 ml. of dimethylsulfoxide is heated in a sealed tube overnight at 110–150° C. The dimethylsulfoxide is removed completely at reduced pressure, and the residue is dissolved in water and extracted with chloroform. The chloroform extract is dried and concentrated. The residue is dissolved in ethyl acetate, and the solution is charged on a column of alumina. Elution with ethyl acetate and evaporation of the solvent yields 1-p-nitro phenyl-2-hydroxymethyl-5-nitroimidazole.

A solution of 2.64 g. (0.01 mole) of 1-p-nitro phenyl-2-hydroxymethyl-5-nitroimidazole in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 1-p-nitro phenyl-5-nitroimidazol-2-ylmethyl phenyl carbonate is separated by filtration.

A solution of .768 mg. (0.002 mole) of 1-p-nitro phenyl-5-nitroimidazol-2-ylmethyl phenylcarbonate in 10 ml. of chloroform, cooled in an ice-bath, is saturated with dry ammonia. The mixture is allowed to stand for 1 day at 5° C. 1-p-nitro phenyl-5-nitroimidazole-2-ylmethylcarbamate is obtained crystalline after evaporating the solvent and washing the residue with water.

EXAMPLE 20

1 - (2' - acetoxyethyl) - 5 - nitroimidazol - 2 - ylmethyl carbamate and 1-(2'-hydroxyethyl)-5-nitroimidazol-2-ylmethyl carbamate A mixture of 24.25 g. of 1-(2'-acetoxyethyl)-5-nitroimidazole, 15 g. (0.5 mole) of paraformaldehyde and 1.50 ml. of dimethylsulfoxide is heated in a sealed tube overnight at 110–150° C. The dimethylsulfoxide is removed completely at reduced pressure, and the residue is dissolved in ethyl acetate, and the solution is charged on a column of alumina. Elution with ethyl acetate and evaporation of the solvent yields 1-(2'-acetoxyethyl)-2-hydroxymethyl-5-nitroimidazole; M.P. 138–145° C.

A solution of 1.4 g. of 1-(2'-acetoxyethyl)-2-hydroxymethyl-5-nitroimidazole in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 1-(2'-acetoxyethyl)-5-nitroimidazol-2-ylmethyl phenyl carbonate, M.P. 93–95° C., is separated by filtration.

1.5 g. of 1-(2'-acetoxyethyl)-5-nitroimidazol-2-ylmethyl phenyl carbonate is dissolved slowly in 50 ml. of liquid ammonia. After solution is complete, the ammonia is permitted to evaporate and the residue washed with ethanol and recrystallized to yield 1-(2'-acetoxyethyl)-5-nitroimidazol-2-ylmethyl carbamate; M.P. 160–162° C.

6 g. of 1-(2'-acetoxyethyl)-5-nitroimidazol-2-ylmethyl carbamate is dissolved in 100 ml. of ethanol and the solution saturated with ammonia. The mixture is allowed to stand for 12 hours at 15° C. and the solvent removed by evaporation under reduced pressure. The residue is washed with methanol to yield 1-(2'-hydroxyethyl)-5-nitroimidazol-2-ylmethyl carbamate; M.P. 150–152° C.

EXAMPLE 21

1-(2'-hydroxypropyl)-5-nitroimidazol-2-ylmethyl carbamate

A mixture of 21.3 g. (0.1 mole) of 1-(2'-acetoxypropyl)-5-nitroimidazole, 15 g. (0.5 mole) of paraformaldehyde and 150 ml. of dimethylsulfoxide is heated in a sealed tube overnight at 110–150° C. The dimethylsulfoxide is removed completely at reduced pressure, and the residue is dissolved in water and extracted with chloroform. The chloroform extract is dried and concentrated. The residue is dissolved in ethyl acetate, and the solution is charged on a column of alumina. Elution with ethyl acetate and evaporation of the solvent yield 1-(2'-acetoxypropyl-2-hydroxymethyl-5-nitroimidazole; M.P. 150–155° C.

A solution of 2.43 g. (0.01 mole) of 1-(2'-acetoxypropyl)-2-hydroxymethyl-5-nitroimidazole in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 1-(2'-acetoxypropyl-5-nitroimidazol-2-ylmethyl phenyl carbonate is separated by filtration.

A solution of 726 mg. (0.002 mole) of 1-(2'-acetoxypropyl)-5-nitroimidazol-2-ylmethyl phenyl carbonate in 10 ml. of chloroform, cooled in an ice-bath, is saturated with dry ammonia. It is allowed to stand for 5 days at 5° C. 1-(2'-acetoxypropyl)-5-nitroimidazol-2-yl-methyl carbamate is obtained crystalline, M.P. 106–108° C., after evaporating the solvent and washing the residue with water.

The 1 - (2'-acetoxypropyl)-5-nitroimidazol-2-ylmethyl carbamate produced as above is redissolved in methanol and the solution saturated with anhydrous ammonia. The mixture is allowed to stand for 2 days at 15° C. and concentrated under reduced pressure. The residue is recrystallized from ethyl acetate, ethyl alcohol or a mixture of the two, to yield 1-(2'-hydroxypropyl)-5-nitroimidazol-2-ylmethyl carbamate.

In accordance with the above procedure, but starting with 1-(2'-acetoxybutyl)-5-nitroimidazole, 1-(2-acetoxypentyl)-5-nitroimidazole, 1-(3'-acetoxybutyl)-5-nitro imidazole, 1-(3'-acetoxypentyl)-5-nitroimidazole and 1-(3'-acetoxypropyl)-5-nitroimidazole, in place of 1-(2'-acetoxypropyl)-5-nitroimidazole, there is obtained the corresponding 1-(2'-hydroxybutyl)-5-nitroimidazol-2-ylmethyl carbamate, 1 - (2' - hydroxypentyl)-5-nitroimidazol-2-ylmethyl carbamate, 1-(3'-hydroxybutyl)-5-nitroimidazol-2-ylmethyl carbamate, 1-(3'-hydroxypentyl)-5-nitroimidazol-2-yl-methyl carbamate and 1-(3'-hydroxypropyl)-5-nitroimidazol-2-ylmethyl carbamate, and the corresponding 1-(acetoxyalkyl)-5-nitroimidazol-2-lymethyl carbamate analogs thereof.

In accordance with the above procedure, but using the propionoxy, butyroxy or valeroxy analogs of any of the aforementioned 1-hydroxyalkyl-5-nitroimidazoles as starting materials in place of 1-acetoxyalkyl-5-nitroimidazoles utilized above, there are obtained the corresponding 1-alkanoyloxyalkyl-5-nitroimidazol - 2 - ylmethyl carbamates and 1-hydroxyalkyl-5-nitroimidazol-2-ylmethyl carbamates.

EXAMPLE 22

1-(2'-oxopropyl)-5-nitroimidazol-2-ylmethyl carbamate 20.5 g. (0.1 mole) of 1-(2-oxopropyl)-5-nitroimidazole hydrochloride is dissolved in 100 ml. 1,2-ethylenedithiol and dry gaseous hydrogen chloride passed through the solution for 30 minutes. The excess dithioglycol is removed by evaporation under high vacuum. The residue treated with aqueous sodium bicarbonate, taken up in ethyl acetate, dried over sodium sulfate and the solvent removed by evaporation under reduced pressure to yield 1-(2'-methyl-1',3'-dithiolan-2'-ylmethyl)-5-nitroimidazole. The dithiolane is dissolved in 125 ml. of dimethyl sulfoxide and treated with 0.5 mole of paraformaldehyde in a sealed tube at 120° C. for 24 hours. Excess paraformaldehyde is removed by centrifugation and the dimethyl sulfoxide is removed by high vacuum concentration. The residue is dissolved in acetone and centrifuged to remove insoluble paraformaldehyde. After concentration, the residue is dissolved in ethyl acetate, thoroughly washed with water, dried and treated with dry hydrogen chloride to give a precipitate of 1-(2'-methyl-1',3'-dithiolan-2'-ylmethyl)-5-nitroimidazol-2-ylmethanol hydrochloride which is separated by filtration. The thus produced 5-nitromidazol-2-ylmethylanol derivative is dissolved in 100 ml. of dry pyridine and treated with 12.5 g. (0.08 mole) of phenyl chloroformate at ice-bath temperature. After 4 hours at room temperature, the mixture is concentrated to dryness, taken up in water, neutralized with sodium bicarbonate and extracted into ethyl acetate. After thorough washing with water, the solution is dried and concentrated. The product is triturated with ether and filtered to yield 1-(2'-methyl-1',3'-dithiolan-2'-ylmethyl)-5-nitroimidazol-2 - ylmethyl phenyl carbonate. The product (5.0 g.) is treated with dry liquid ammonia (25 ml.) at −33° C. for 2 hours. After removal of the liquid ammonia, the residue is warmed on a steam-bath for one hour with 100 ml. 1 N aqueous hydrochloric acid to hydrolyze the dithiolane. The mixture is concentrated to dryness to yield the hydrochloride of 1-(2'-oxopropyl)-5-nitroimidazol - 2 - ylmethyl carbamate. The product may be further purified by recrystallization from acetone.

Treatment with aqueous sodium bicarbonate followed by extraction with ethyl acetate and removal of the solvent yields the free base.

In accordance with the above procedure, but starting with 1-(2'-oxobutyl)-5-nitroimidazole,
1-(2'-oxopentyl)-5-nitroimidazole,
1-(3'-oxobutyl-5-nitroimidazole, and
1-(3'-oxopentyl)-5-nitroimidazole, in place of 1-(2'-oxopropyl)-5-nitroimidazole, there is obtained the corresponding 1-(2'-oxobutyl)-5-nitroimidazol-2-ylmethyl carbamate,
1-(2'-oxopentyl)-5-nitroimidazol-2-ylmethyl carbamate,
1-(3'-oxobutyl)-5-nitroimidazol-2-ylmethyl carbamate, and
1-(3'-oxopentyl)-5-nitroimidazol-2-ylmethyl carbamate.

EXAMPLE 23

1-(2'-ethoxyethyl)-5-nitroimidazol-2-ylmethyl carbamate

A mixture of 9.2 g. (0.05 mole) of 1-(2'-ethoxyethyl)-5-nitromidiazole, 15 g. (0.5 mole) of paraformaldehyde and 150 ml. of dimethylsulfoxide is heated in a sealed tube overnight at 110–150° C. The dimethylsulfoxide is removed completely at reduced pressure, and the residue is dissolved in water and extracted with chloroform. The chloroform extract is dried and concentrated. The residue is dissolved in ethyl acetate, and the solution is charged on a column of alumina. Elution with ethyl acetate and evaporation of the solvent yields 1-(2'-ethoxyethyl)-2-hydroxymethyl-5-nitroimidazole.

A solution of 1.99 g. (0.01 mole) of 1-(2'-ethoxyethyl)-2-hydroxymethyl-5-nitroimidazole in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 1-(2'-ethoxyethyl)-5-nitroimidazol-2-ylmethyl phenyl carbonate is separated by filtration.

3.19 g. of 1-(2'-ethoxyethyl)-5-nitroimidazol-2-ylmethyl phenyl carbonate is dissolved slowly in 50 ml. of liquid ammonia. After solution is complete, the ammonia is permitted to evaporate. The residue is washed with ethanol and recrystallized from methanol to yield 1-(2'-ethoxyethyl-5-nitroimidazol-2-ylmethyl carbamate.

In accordance with the above procedure, but starting with 1-(2'-methoxyethyl)-5-nitroimidazole,
1-(2'-propoxyethyl)-5-nitroimidazole,
1-(2'-butoxyethyl)-5-nitroimidazole,
1-(2'-benzyloxyethyl)-5-nitroimidazole,
1-(2'-ethoxypropyl)-5-nitroimidazole,
1-(2'-ethoxybutyl)-5-nitroimidazole, and
1-(2'-ethoxypentyl)-5-nitroimidazole, in place of 1-(2'-ethoxyethyl)-5-nitroimidazole, there is obtained the corresponding 1-(2'-methoxyethyl)-5-nitroimidazol-2-ylmethyl carbamate,
1-(2'-propoxyethyl)-5-nitroimidazol-2-ylmethyl carbamate,
1-(2'-butoxyethyl)-5-nitroimidazol-2-ylmethyl carbamate,
1-(2'-benzoyloxyethyl)-5-nitroimidazol-2-ylmethyl carbamate,
1-(2'-ethoxypropyl)-5-nitroimidazol-2-ylmethyl carbamate,
1-(2'-ethoxybutyl)-5-nitroimidazol-2-ylmethyl carbamate, and
1-(2'-ethoxypentyl)-5-nitroimidazole-2-ylmethyl carbamate.

EXAMPLE 24

Ethyl 2-carbamoyloxymethyl-5-nitroimidazol-1-ylacetate

A mixture of 0.1 mole of ethyl-5-nitroimidazol-1-ylacetate, 15 g. (0.5 mole) of paraformaldehyde and 150 ml. of dimethylsulfoxide is heated in a sealed tube overnight at 110–150° C. The dimethylsulfoxide is removed completely at reduced pressure, and the residue is dissolved in water and extracted with chloroform. The chloroform extract is dried and concentrated. The residue is dissolved in ethyl acetate, and the solution is charged on a column of alumina. Elution with ethyl acetate and evaporation of the solvent yields ethyl 2-hydroxymethyl-5-nitroimidazol-1-ylacetate.

A solution of 0.01 mole of ethyl 2-hydroxymethyl-5-nitroimidazol-1-ylacetate in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of ethyl 2-phenoxycarbonyloxymethyl-5-nitroimidazol-1-ylacetate, M.P. 106–108° C., is separated by filtration.

2.0 g. of ethyl 2-phenoxycarbonyloxymethyl-5-nitroimidazol-1-ylacetate is dissolved slowly in 20 ml. of liquid ammonia. After solution is complete, the ammonia is permitted to evaporate and the residue washed with ethanol and recrystallized from methanol to yield ethyl 2-carbamoyloxymethyl-5-nitroimidazol-1-ylacetate.

In accordance with the above procedure but starting with methyl-5-nitroimidazol-1-yl acetate,
propyl-5-nitroimidazol-1-yl acetate,
butyl-5-nitroimidazol-1-yl acetate,
ethyl-5-nitroimidazol-1-yl propionate,
methyl-5-nitroimidazol-1-yl propionate,
propyl-5-nitroimidazol-1-yl propionate, and
butyl-5-nitroimidabol-1-yl propionate, in place of ethyl-5-nitroimidazol-1-yl acetate, there is obtained the corresponding methyl-2-carbamoylmethyl-5-nitroimidazol-1-yd acetate,
propyl-2-carbamoylmethyl-5-nitroimidazol-1-yl acetate,
butyl-2-carbamoylmethyl-5-nitroimidazol-1-yl acetate,
ethyl-2-carbamoylmethyl-5-nitroimidazol-1-yl propionate,
methyl-2-carbamoylmethyl-5-nitroimidazol-1-yl propionate,
propyl-2-carbamoylmethyl-5-nitroimidazol-1-yl propionate, and
butyl-2-carbamoylmethyl-5-nitroimidazol-1-yl propionate.

EXAMPLE 25

2-carbamoyloxymethyl-5-nitroimidazol-1-ylacetamide

Ethyl 2 - carbamoyloxymethyl - 5 - nitroimidazol - 1 - ylacetate, as obtained from the procedure set forth in Example 24, is dissolved in 10 ml. of methanol saturated with gaseous ammonia at 0° C., sealed in a tube and heated at 60° C. for 2 hours. The reaction mixture is concentrated under reduced pressure and the residue recrystallized from ethyl acetate to yield 2-carbamoyloxymethyl-5-nitroimidazol-1-ylacetamide; M.P. 221–223° C.

In accordance with the above procedure, but starting with any of the alkyl 2-carbamoyloxymethyl-5-nitroimidazol-1-ylalkanoates produced in accordance with the previous example, there are obtained the corresponding 2-carbamoyloxymethyl-5-nitroimidazol-1-ylacetamide or 2-carbamoyloxymethyl-5-nitroimidazol-1-ylpropionamide.

EXAMPLE 26

1-(2'-carbamoyloxyethyl)-5-nitroimidazol-2-ylmethyl carbamate

A mixture of 0.1 mole of 1-(2'-hydroxyethyl)-5-nitroimidazole, 5 g. (0.015 mole) of paraformaldehyde and 150 ml. of dimethylsulfoxide is heated in a sealed tube overnight at 110–150° C. The dimethylsulfoxide is removed completely at reduced pressure, and the residue is dissolved in water and extracted with chloroform. The chloroform extract is dried and concentrated. The residue is dissolved in ethyl acetate, and the solution is charged on a column of alumina. Elution with ethyl acetate and evaporation of the solvent yields 1-(2'-hydroxyethyl)-2-hydroxymethyl-5-nitroimidazole.

A solution of 1.3 g. of 1-(2'-hydroxyethyl)-2-hydroxymethyl-5-nitroimidazole in 25 ml. of dry pyridine is stirred at 0° C. and 2.2 g. of phenyl chloroformate is slowly added. The reaction mixture is stirred for 3–4 hours at room temperature and is poured into about 200 ml. of water. The mixture is extracted with ethyl acetate, the extract dried over sodium sulfate, filtered and the solvent removed under reduced pressure. The residue 1-(2'-hydroxyethyl)-5-nitroimidazol-2-ylmethyl phenyl carbonate is dissolved in 10 ml. of chloroform and the solution added to 50 ml. of dry liquid ammonia. The ammonia is allowed to evaporate and the residue recrystallized from ethyl acetate to yield 1-(2'-carbamoyloxyethyl)-5-nitroimidazol-2-ylmethyl carbamate; M.P. 174–175° C.

EXAMPLE 27

N,N-diethyl 2-carbamoyloxymethyl-5-nitroimidazol-1-yl-acetamide

A mixture of 22.6 g. (0.1 mole) of N,N-diethyl-5-nitroimidazol-1-ylacetamide, 15 g. (0.5 mole) of paraformaldehyde and 150 ml. of dimethylsulfoxide is heated in a sealed tube overnight at 110–150° C. The dimethylsulfoxide is removed completely at reduced pressure, and the residue is dissolved in water and extracted with chloroform. The chloroform extract is dried and concentrated. The residue is dissolved in ethyl acetate, and the solution is charged on a column of alumina. Elution with ethyl acetate and evaporation of the solvent yields N,N-diethyl 2-hydroxymethyl-5-nitroimidazol-1-ylacetamide.

A solution of 2.56 g. (0.01 mole) of N,N-diethyl 2-hydroxymethyl-5-nitroimidazol-1-ylacetamide in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 1-(N',N'-diethylcarbamoylmethyl)-5-nitroimidazol-2-ylmethyl phenyl carbonate is filtered.

2.0 g. of 1-(N',N'-diethylcarbamoylmethyl)-5-nitroimidazol-2-ylmethyl phenyl carbonate is dissolved in 50 ml. of liquid ammonia. After solution is complete, the ammonia is permitted to evaporate and the residue washed with ethanol and recrystallized from methanol to yield N,N-diethyl 2-carbamoylmethyl-5-nitroimidazol-1-ylacetamide.

In accordance with the above procedure, but starting with N,N - dibenzyl - 5 - nitroimidazol - 1 - ylacetamide, N,N - dimethyl - 5 - nitroimidazol - 1 - ylacetamide, or N,N - dipropyl - 5 - nitroimidazol - 1 - ylacetamide, there is obtained the corresponding N,N-dibenzyl 2-carbamoyloxymethyl - 5 - nitroimidazol - 1 - ylacetamide, N,N-dimethyl 2 - carbamoyloxymethyl - 5 - nitroimidazol-1-ylacetamide, and N,N-dipropyl 2-carbamoyloxymethyl-5-nitroimidazol-1-ylacetamide.

EXAMPLE 28

2-carbamoyloxymethyl-5-nitroimidazol-1-ylacetonitrile

A mixture of 15.2 g. (0.1 mole) of 5-nitroimidazol-1-ylacetonitrile, 15 g. (0.5 mole) of paraformaldehyde and 150 ml. of dimethylsulfoxide is heated in a sealed tube overnight at 110–150° C. The dimethylsulfoxide is removed completely at reduced pressure, and the residue is dissolved in water and extracted with chloroform. The chloroform extract is dried and concentrated. The residue is dissolved in ethyl acetate, and the solution is charged on a column of alumina. Elution with ethyl acetate and evaporation of the solvent yields 2-hydroxymethyl-5-nitroimidazol-1-ylacetonitrile.

A solution of 1.82 g. (0.01 mole) of 2-hydroxymethyl-5 - nitroimidazol - 1 - ylacetonitrile in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 1-cyanomethyl-5-nitroimidazol-2-ylmethyl phenyl carbonate is separated by filtration.

To 3.0 g. of 1-cyanomethyl - 5 - nitroimidazol - 2 - ylmethyl phenyl carbonate dissolved in 50 ml. of chloroform is added 50 cc. of chloroform containing 0.4 g. of anhydrous ammonia. The solution is allowed to stand overnight at room temperature and then evaporated to dryness. The residue is washed with water and recrystallized from methanol to yield 2 - carbamoyloxymethyl-5-nitroimidazol-1-ylacetonitrile.

In accordance with the above procedure, but starting with 3 - (5' - nitroimidazol - 1' - yl)propionitrile in place of 5 - nitroimidazol - 1 - ylacetonitrile, there is obtained the corresponding 3 - (2' - carbamoyloxymethyl - 5'-nitroimidazol-1'-yl)propionitrile.

EXAMPLE 29

1-(2'-N-morpholinoethyl)-5-nitroimidazol-2-ylmethylcarbamate

A mixture of 21.4 g. (0.1 mole) of 1-(2'-N-morpholinoethyl) - 5 - nitroimidazole, 15 g. (0.5 mole) of paraformaldehyde and 150 ml. of dimethylsulfoxide is heated in a sealed tube overnight at 110–150° C. The dimethylsulfoxide is removed completely at reduced pressure, and the residue is dissolved in water and extracted with chloroform. The chloroform extract is dried and concentrated. The residue is dissolved in ethyl acetate, and the solution is charged on a column of alumina. Elution with ethyl acetate and evaporation of the solvent yields 1-(2'-N-morpholinoethyl)-5-nitroimidazol-2-ylmethanol.

A solution of 2.44 g. (0.01 mole) of 1 - (2' - N - morpholinoethyl) - 5 - nitroimidazol - 2 - ylmethanol in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 1-(2'-N-morpholinoethyl) - 5 - nitroimidazol - 2 - ylmethyl phenyl carbonate is separated by filtration.

0.05 mole of 1 - (2' - morpholinoethyl )- 5 - nitroimidazol - 2 - ylmethyl phenyl carbonate is dissolved slowly in 50 ml. of liquid ammonia. After solution is complete, the ammonia is permitted to evaporate and the residue washed with ethanol and recrystallized from methanol to yield 1 - (2' - N - morpholinoethyl) - 5 - nitroimidazol-2-ylmethyl carbamate.

In accordance with the above procedure, but starting with 1 - (2' - N - pyrrolidinoethyl) - 5 - nitroimidazole, 1 - (2' - N - piperidinoethyl) - 5 - nitroimidazole, 1-(2'-N,N - dimethylaminoethyl) - 5 - nitroimidazole, 1-(2'-N,N - diethylaminoethyl) - 5 - nitroimidazole, in place of 1 - (2' - morpholinoethyl) - 5 - nitroimidazole, there is obtained the corresponding 1 - (2' - N - pyrrolidinoethyl) - 5 - nitroimidazol - 2 - ylmethyl carbamate, 1-(2'-N,N - piperidinoethyl) - 5 - nitroimidazol - 2 - ylmethyl carbamate, 1 - (2' - N,N - dimethylaminoethyl) - 5 - nitroimidazol - 2 - ylmethyl carbamate, and 1 - (2' - N,N-diethylaminoethyl) - 5 - nitroimidazol - 2 - ylmethyl carbamate.

EXAMPLE 30

1-(2'-ethylthioethyl)-5-nitroimidazol-2-ylmethyl N-methylcarbamate

A mixture of 1.08 g. (0.005 mole) of 1 - (2' - ethylthioethyl) - 5 - nitroimidazole, 0.5 g. (0.015 mole) of paraformaldehyde and 5 ml. of dimethylsulfoxide is heated in a sealed tube overnight at 120° C. The dimethylsulfoxide is removed completely at reduced pressure, and the residue is slurried in water and extracted with chloroform. The chloroform extract is dried and concentrated. The residue is dissolved in ethyl acetate, and the solution is charged on a column of alumina. Elution with ethyl acetate and evaporation of the solvent yields 1-(2'-ethylthioethyl)-2-hydroxymethyl-5-nitroimidazole.

A mixture of 246 mg. (0.001 mole) of 1-(2'-ethylthioethyl - 2 - hydroxymethyl - 5 - nitroimidazole, 68 mg. (0.0012 mole) of methyl isocyanate, and 120 mg. (0.0012 mole) of triethylamine in 20 ml. of 1,2-dimethoxyethane is refluxed overnight. The solvent is concentrated to a small volume, a little hexane added, and the solid that separates is removed by filtration. The 1 - (2' - ethylthioethyl) - 5 - nitroimidazol - 2 - ylmethyl N-methylcarbamate is recrystallized from a mixture of alcohol and water.

In accordance with the above procedure, but starting with 1-(3'-ethylthiopropyl)-5-nitroimidazole,
1-(4'-ethylthiobutyl)-5-nitroimidazole,
1-(2'-methylthioethyl)-5-nitroimidazole,
1-(2'-propylthioethyl)-5-nitroimidazole,
1-(2'-phenylthioethyl)-5-nitroimidazole, and
1-(2'-benzylthioethyl)-5-nitroimidazole, in place of 1-(2'-ethylthioethyl)-5-nitroimidazole, there is obtained the corresponding 1-(3'-ethylthiopropyl)-5-nitroimidazol-2-ylmethyl N-methylcarbamate,
1-(4'-ethylthiobutyl)-5-nitroimidazol-2-ylmethyl-N-methylcarbamate,
1-(2'-methylthioethyl)-5-nitroimidazol-2-ylmethyl N-methylcarbamate,
1-(2'-propylthioethyl)-5-nitroimidazol-2-ylmethyl N-methylcarbamate,
1-(2'-phenylthioethyl)-5-nitroimidazol-2-ylmethyl N-methylcarbamate, and
1-(2'-benzylthioethyl)-5-nitroimidazol-2-ylmethyl N-methylcarbamate.

EXAMPLE 31

1-(2'-ethylsulfinylethyl)-5-nitroimidazol-2-ylmethyl N-methylcarbamate

A mixture of 1.08 g. (0.005 mole) of 1-(2'-ethylsulfinylethyl)-5-nitroimidazole, .5 g. (0.015 mole) of paraformaldehyde and 5 ml. of dimethylsulfoxide is heated in a sealed tube overnight at 120° C. The dimethylsulfoxide is removed completely at reduced pressure, and the residue is dissolved in water and extracted with chloroform. The chloroform extract is dried and concentrated. The residue is dissolved in ethyl acetate, and the solution is charged on a column of alumina. Elution with ethyl acetate and evaporation of the solvent yields 1 - (2' - ethylsulfinylethyl)-5-nitroimidazol-2-ylmethanol.

A mixture of 246 mg. (0.001 mole) of 1-(2'-ethylsulfinylethyl) - 5 - nitroimidazol - 2 - ylmethanol, 68 mg. (0.0012 mole) of methyl isocyanate, and 120 mg. (0.0012 mole) of triethylamine in 20 ml. of 1,2 - dimethoxyethane is refluxed overnight. The solvent is concentrated to a small volume, a little hexane is added, and the material that separates is removed by filtration. The 1-(2'-ethylsulfinylethyl)-5-nitroimidazol - 2 - ylmethyl N-methylcarbamate is recrystallized from a mixture of alcohol and water.

In accordance with the above procedure, but starting with 1-(3'-ethylsulfinylpropyl)-5-nitroimidazole,
1-(4'-ethylsulfinylbutyl)-5-nitroimidazole,
1-(2'-methylsulfinylethyl)-5-nitroimidazole,
1-(2'-propylsulfinylethyl)-5-nitroimidazole,
1-(2'-phenylsulfinylethyl)-5-nitroimidazole, and
1-(2'-benzylsulfinylethyl)-5-nitroimidazole, in place of 1-(2'-ethylsulfinylethyl)-5-nitroimidazole, there is obtained the corresponding 1-(3'-ethylsulfinylpropyl)-5-nitroimidazol-2-ylmethyl N-methylcarbamate,
1-(4'-ethylsulfinylbutyl)-5-nitroimidazol-2-ylmethyl N-methylcarbamate,
1-(2'-methylsulfinylethyl)-5-nitroimidazol-2-ylmethyl N-methylcarbamate,
1-(2'-propylsulfinylethyl)-5-nitroimidazol-2-ylmethyl N-methylcarbamate,
1-(2'-phenylsulfinylethyl)-5-nitroimidazol-2-ylmethyl N-methylcarbamate, and
1-(2'-benzylsulfinylethyl)-5-nitroimidazol-2-ylmethyl N-methylcarbamate.

EXAMPLE 32

1-(2'-ethylsulfonylethyl)-5-nitroimidazol-2-ylmethyl N-methylcarbamate

A mixture of 1.08 g. (0.005 mole) of 1-(2'-ethylsulfonylethyl)-5-nitroimidazole, .5 g. (0.015 mole) of paraformaldehyde and 5 ml. of dimethylsulfoxide is heated in a sealed tube overnight at 120° C. The dimethylsulfoxide is removed completely at reduced pressure, and the residue is dissolved in water and extracted with chloroform. The chloroform extract is dried and concentrated. The residue is dissolved in ethyl acetate, and the solution is charged on a column of alumina. Elution with ethyl acetate and evaporation of the solvent yields 1-(2'-ethylsulfonylethyl)-5-nitroimidazol-2-ylmethanol.

A mixture of 246 mg. (0.001 mole) of 1-(2'-ethylsulfonylethyl)-5-nitroimidazol - 2 - ylmethanol, 68 mg. (0.0012 mole) of methyl isocyanate, and 120 mg. (0.0012 mole) of triethylamine in 20 ml. of 1,2-dimethoxyethane is refluxed overnight. The solvent is concentrated to a small volume, a little hexane added, and the material that separates is removed by filtration. The 1-(2'-ethylsulfonylethyl) - 5 - nitroimidazol - 2 - ylmethyl N-methylcarbamate is recrystallized from a mixture of alcohol and water.

In accordance with the above procedure, but starting with 1-(3'-ethylsulfonylpropyl)-5-nitroimidazole,
1-(4'-ethylsulfonylbutyl)-5-nitroimidazole,
1-(2'-methylsulfonylethyl)-5-nitroimidazole,
1-(2'-propylsulfonylethyl)-5-nitroimidazole,
1-(2'-phenylsulfonylethyl)-5-nitroimidazole, and
1-(2'-benzylsulfonylethyl)-5-nitroimidazole, in place of 1-(2'-ethylsulfonylethyl)-5-nitroimidazole, there is obtained the corresponding 1-(3'-ethylsulfonylpropyl)-5-nitroimidazol-2-ylmethyl N-methylcarbamate,
1-(4'-ethylsulfonylbutyl)-5-nitroimidazol-2-ylmethyl N-methylcarbamate,
1-(2'-methylsulfonylethyl)-5-nitroimidazol-2-ylmethyl N-methylcarbamate,
1-(2'-propylsulfonylethyl)-5-nitroimidazol-2-ylmethyl N-methylcarbamate,
1-(2'-phenylsulfonylethyl)-5-nitroimidazol-2-ylmethyl N-methylcarbamate, and
1-(2'-benzylsulfonylethyl)-5-nitroimidazol-2-ylmethyl N-methylcarbamate.

EXAMPLE 33

1-(1'-methyl-5'-nitroimidazol-2'-yl)ethyl carbamate

A solution of 0.01 mole of 1-methyl-2-(1'-hydroxyethyl)-5-nitroimidazole in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 1-(1'-methyl-5'-nitroimidazol-2'-yl) ethyl phenyl carbonate is separated by filtration.

A solution of 0.005 mole of 1-(1'-methyl-5'-nitroimidazol - 2'-yl)ethyl phenyl carbonate in 10 ml. of chloroform is cooled in an ice-bath, and is saturated with dry ammonia. It is allowed to stand for 5 days at 5° C. 1-(1'-methyl - 5'-nitroimidazol-2'-yl) ethyl carbamate, M.P. 156.5–160° C., is obtained as a crystalline precipitate.

EXAMPLE 34

2-(1'-methyl-5'-nitroimidazol-2'-yl)ethyl carbamate

A solution of 0.01 mole of 1-methyl-2'-hydroxy-ethyl)-5-nitroimidazole in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 2-(1'-methyl-5'-nitroimidazol-2'-yl)ethyl phenyl carbonate is separated by filtration.

A solution of 0.005 mole of 2 - (1'-methyl-5'-nitroimidazol-2'-yl)ethyl phenyl carbonate in 10 ml. of chloroform is cooled in an ice-bath, and is saturated with dry ammonia. It is allowed to stand for 5 days at 5° C. 2-(1'-methyl-5'-nitroimidazol-2'-yl)ethyl carbamate is obtained as a crystalline precipitate; M.P. 165–166° C.

EXAMPLE 35

3-(1'-methyl-5'-nitroimidazol-2'-yl)prop-2-en-1-yl carbamate

A solution of 0.01 mole of 1 - methyl-2-(3'-hydroxyprop - 2'-enyl)-5-nitroimidazole in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 3-(1'-methyl-5'-nitroimidazol-2'-yl)prop-2-en-1-yl phenyl carbonate is separated by filtration.

A solution of 0.005 mole of 3 - (1'-methyl-5'-nitroimidazol-2'-yl)prop-2-en-1-yl phenyl carbonate in 10 ml. of chloroform is cooled in an ice-bath, and is saturated with dry ammonia. It is allowed to stand for 5 days at 5° C. 3-(1'-methyl-5'-nitroimidazol-2'-yl)prop-2-en-1-yl carbamate is obtained as a crystalline precipitate; M.P. 173–175° C.

EXAMPLE 36

1-methyl-5-nitroimidazol-2-ylmethyl N-methylcarbamate 2.77 g., (0.01 mole) of 1-methyl-5-nitroimidazol-2-ylmethyl phenylcarbonate is dissolved in 20 ml. of chloroform and 0.93 g. (0.03 mole) of methylamine in 20 ml. of chloroform is added at room temperature under a Dry Ice-cold-finger. The mixture is stirred for 7 hours. The solvent is evaporated and the residue slurried with 15 ml. of water. The solid product is removed by filtration. Recrystallization from water yields 1-methyl-5-nitroimidazol-2-ylmethyl N-methylcarbamate; M.P. 99–101° C.

In accordance with the above procedure, but using ethylamine, propylamine, butylamine, pentylamine and hexylamine in place of methylamine, and using the liquid amines directly rather than in chloroform solution, there is obtained the corresponding 1-methyl-5-nitroimidazol-2-ylmethyl N-ethylcarbamate,
1-methyl-5-nitroimidazol-2-ylmethyl N-propylcarbamate,
1-methyl-5-nitroimidazol-2-ylmethyl N-butylcarbamate,
1-methyl-5-nitroimidazol-2-ylmethyl N-pentylcarbamate and
1-methyl-5-nitroimidazol-2-ylmethyl N-hexylcarbamate,

EXAMPLE 37

1-methyl-5-nitroimidazol-2-ylmethyl N,N-dimethylcarbamate 7.8 g. of dimethylamine is added to a solution of 1-methyl - 5-nitroimidazol-2-ylmethyl chloroformate (prepared from 11.0 g. of 1-methyl-2-hydroxymethyl-5-nitroimidazole as described in Example 1). The temperature of the reaction mixture rises to about 24° C. The mixture is stirred with cooling for one hour and then evaporated to dryness under reduced pressure. 100 ml. of water and 800 ml. of ethyl acetate are added to the residue. The ethyl acetate layer is separated and the aqueous layer extracted with two 200 ml. portions of ethyl acetate. The ethyl acetate extracts are combined and evaporated to dryness. On addition of 10 ml. of ethyl acetate to the residue, 1-methyl - 5 - nitroimidazol-2-ylmethyl N,N-dimethylcarbamate crystallizes and is recovered by filtration to give 5.3 g.; M.P. 91–94° C. Recrystallization from a benzenehexane mixture yields substantially pure material; M.P. 92–94° C.

In accordance with the above procedure, but using diethylamine, dipropylamine and diphenylamine, in place of dimethylamine, there is obtained the corresponding 1-methyl-5-nitroimidazol-2-ylmethyl N,N-diethylcarbamate, 1 - methyl - 5-nitroimidazol-2-ylmethyl N,N-dipropylcarbamate, 1-methyl-5-nitroimidazol-2-ylmethyl N,N-diphenylcarbamate.

EXAMPLE 38

1-methyl-5-nitroimidazol-2-ylmethyl 4-morpholine-carboxylate

A cold solution of the chloroformate ester of 1-methyl-2-hydroxymethyl-5-nitroimidazole is prepared as in Example 1 (using 11.0 g. of 1-methyl-2-hydroxymethyl-5-nitroimidazole). To this solution there is added rapidly with stirring 15.6 g. of morpholine. The temperature rises from 0° C. to 15° C. The reaction mixture is cooled in an ice-bath and stirred for one hour. The tetrahydrofuran is evaporated under reduced pressure and the gummy residue extracted with a mixture of 100 ml. of water and 1 liter of ethyl acetate. The ethyl acetate layer is separated, back-washed with 100 ml. of water and then evaporated to dryness. The resulting residue is dissolved in a minimum volume of benzene. The benzene solution is concentrated to a volume of about 20 ml. An equal volume of diethyl ether is added to the benzene. 1-methyl-5-nitroimidazol-2-ylmethyl 4-morpholinecarboxylate precipitates. There is obtained 7.3 g. of crude product which is recrystallized three times from benzene to give substantially pure material; M.P. 108–110° C.

In accordance with the above procedure, but starting with pyrrolidine, piperidine, N-methyl piperazine, and thiamorpholine, in place of morpholine, there is obtained the corresponding 1-methyl - 5 - nitroimidazol-2-ylmethyl 1 - pyrrolidinecarboxylate, 1-methyl-5-nitroimidazol-2-ylmethyl 1-piperidinecarboxylate, 1-methyl - 5 - nitroimidazol - 2 - ylmethyl $N^1$-methyl-N4-piperazinecarboxylate, and 1-methyl - 5 - nitroimidazol-2-ylmethyl-4-thiamorpholinecarboxylate.

EXAMPLE 39

1-methyl-5-nitroimidazol-2-ylmethyl N-chloroethylcarbamate

A cold solution of the chloroformate ester of 1-methyl-2-hydrxoymethyl-5-nitroimidazole is prepared as in Example 1 using 11.0 g. of 1-methyl-2-hydroxymethyl-5-nitroimidazole. To this solution is added 14.4 g. of 2-chloroethylamine. The mixture is stirred with cooling for one hour and then evaporated to dryness under reduced pressure. 100 ml. water and 800 ml. of ethyl acetate are added to the residue. The ethyl acetate layer is separated and the aqueous layer extracted with two 200 ml. portions of ethyl acetate. The ethyl acetate extracts are combined and evaporated to dryness. On addition of ethyl acetate and to the residue, 1-methyl-5-nitroimidazol-2-ylmethyl N-2'-chloroethylcarbamate crystallizes.

In accordance with the above procedure, but starting with 2-bromoethylamine, 2,2,2-trifluoroethylamine, 2-fluoroethylamine, 3-chloropropylamine, and 3-bromopropylamine, in place of 2-chloroethylamine, there is obtained the corresponding 1-methyl-5-nitroimidazol-2-ylmethyl N-2'-bromoethylcarbamate,
1-methyl-5-nitroimidazol-2-ylmethyl N-2',2',2'-trifluoroethylcarbamate,
1-methyl-5-nitroimidazol-2-ylmethyl N-2'-fluoroethylcarbamate,
1-methyl-5-nitroimidazol-2-ylmethyl N-3'-chloropropylcarbamate and
1-methyl-5-nitroimidazol-2-ylmethyl N-3'-bromopropylcarbamate.

EXAMPLE 40

1-methyl-5-nitroimidazol-2-ylmethyl hydroxymethylcarbamate

A mixture of 2.0 g. (0.01 mole) 1-methyl-5-nirtoimidazol-2-ylmethylcarbamate, 0.6 g. (0.02 mole) of paraformaldehyde and 6 ml. of dimethyl sulfoxide is heated at 100° C. in a sealed tube for 24 hours. Evaporation of the solvent leaves a viscous residue which is dissolved in 3 ml. of dimethyl formamide. After the addition of 5 ml. of water and standing for 24 hours, a crystalline precipitate is obtained which is separated by filtration, air dried, and recrystallized from ethyl acetate to yield 1-methyl-5-nitroimidazol-2-ylmethyl N-hydroxymethylcarbamate.

EXAMPLE 41

1-methyl-5-nitroimidazol-2-ylmethyl 2',2',2'-trichloro-1'-hydroxyethylcarbamate 1.7 g., (0.011 mole) of 2',2',2',-trichloro-1'-hydroxyethylisocyanate is dissolved in 50 ml. of dioxane and a solution of 1.57 g. (0.01 mole) of 1-methyl-2-hydroxymethyl-5-nitroimidazole in 200 ml. of dioxane is added. The mixture is left to stand for 48 hours at 15° C. The solution is concentrated to 25 ml. and the crystalline residue removed by filtration. The residue is recrystallized from ethyl acetate to yield 1-methyl-5-nitroimidazol-2-ylmethyl 2',2',2'-trichloro-1'-hydroxyethylacarbamate.

EXAMPLE 42

1-methyl-5-nitroimidazol-2-ylmethyl N-(2',2',2'-trichloro-1'-hydroxyethoxy)carbamate A mixture of 2.16 g. (0.01 mole) of 1-methyl-5-nitroimidazol-2-ylmethyl N-hydroxycarbamate, 1.81 g. (0.011 mole) chloral hydrate and 2.00 g. of anhydrous magnesium sulfate are heated at reflux for 8 hours. The reaction mixture after cooling is filtered and the filtrate evaporated to dryness to yield 1-methyl-5-nitroimidazol-2-ylmethyl N-(2',2',2'-trichloro-1'-hydroxyethoxycarbamate.

In accordance with the above procedure, but starting with bromal hydrate or trifluoro acetaldehyde hydrate, in place of chloro hydrate, there is obtained the corresponding 1-methyl - 5 - nitroimidazol-2-ylmethyl N-(2',2',2'-tribromo-1'-hydroxyethoxy)carbamate, and 1 - methyl - 5-nitroimidazol-2-ylmethyl N-(2',2',2'-trifluoro-1' - hydroxyethoxy)carbamate.

EXAMPLE 43

1-methyl-5-nitroimidazol-2-ylmethyl N-2'-hydroxy ethylcarbamate 1.22 g. of ethanolamine is added at 15° C. to a solution of 2.93 g. of 1-methyl - 5 - nitroimidazol-2-ylmethyl phenylcarbonate in 10 ml. of chloroform. The mixture is stirred for 7 hours and at the end of this time, the solid product is removed by filtration. Recrystallized from ethyl acetate gives 1-methyl - 5 - nitroimidazol-2-ylmethyl N - 2' - hydroxyethyl carbamate; M.P. 132–135° C.

In accordance with the above procedure, but starting with propanolamine, butanolamine, in place of ethanolamine, there is obtained the corresponding 1-methyl-5-nitroimidazol-2-ylmethyl N - 3' - hydroxypropylcarbamate, and 1 - methyl - 5 - nitroimidazol - 2 - ylmethyl N-hydroxybutylcarbamate.

EXAMPLE 44

1-methyl-5-nitroimidazol-2-ylmethyl ethoxymethylcarbamate

A mixture of 1.15 g. (.005 mole) of 1-methyl-5-nitroimidazol - 2 - ylmethyl hydroxymethylcarbamate, .05 g. of p-toluenesulfonic acid and 20 ml. of ethanol is allowed to stir overnight at room temperature. After evaporation, the residue is dissolved in 50 ml. of chloroform and the chloroform solution washed with dilute sodium bicarbonate solution. The chloroform solution, after drying over sodium sulfate, is evaporated to dryness. The residue is recrystallized from ethyl acetate to yield 1-methyl-5-nitroimidazol-2-ylmethyl N-ethoxymethylcarbamate.

In accordance with the above procedure, but using n-propanol, n-butanol or n-pentanol in place of ethanol, there is obtained the corresponding 1-methyl - 5 - nitroimidazol - 2 - ylmethyl N - propoxymethylcarbamate, 1-methyl - 5 - nitroimidazol - 2 - ylmethyl N-butoxymethylcarbamate, and 1-methyl - 5 - nitroimidazol-2-ylmethyl N-pentoxymethylcarbamate.

EXAMPLE 45

1-methyl-5-nitroimidazol-2-ylmethyl N-ethoxyethylcarbamate 1.78 g., (0.02 mole) of 2-ethoxyethylamine is added at 15° C. to a solution of 2.93 g. of 1-methyl-5-nitroimidazol - 2 - ylmethyl phenylcarbonate in 10 ml. of chloroform. The mixture is stirred for 7 hours and at the end of this time, the solution is evaporated to dryness. The residue is slurried with water and the solid product after filtration, is recrystallized from ethanol-water to give 1-methyl - 5 - nitroimidazol - 2 - ylmethyl N-ethoxyethylcarbamate.

In accordance with the above procedure, but starting with 3-ethoxypropylamine, 4 - ethoxybutylamine, 5-ethoxypentylamine, and 6-ethoxyhexylamine, in place of 2-ethoxyethylamine, there is obtained the corresponding 1 - methyl - 5 - nitroimidazol - 2 - ylmethyl N-3-ethoxypropylcarbamate, 1-methyl - 5 - nitroimidazol-2-ylmethyl N - 4 - ethoxybutylcarbamate, 1 - methyl - 5 - nitroimidazol - 2 - ylmethyl N - 5 - ethoxypentylcarbamate, and 1 - methyl - 5 - nitroimidazol - 2 - ylmethyl N-6-ethoxyhexylcarbamate.

EXAMPLE 46

1-methyl-5-nitroimidazol-2-ylmethyl N-2-oxopropylcarbamate

To a solution of .05 mole of 1 - methyl - 5 - nitroimidazol - 2 - ylmethyl chloroformate in 50 ml. of tetrahydrofuran (anhydrous) at 0° C. is added .15 mole of triethylamine. To this solution is added dropwise, .05 mole of aminoacetone hydrochloride in 100 ml. of dry tetrahydrofuran. After stirring for 4 hours at 15° C., the triethylamine hydrochloride is removed by filtration and the filtrate is concentrated under reduced pressure. The residue is recrystallized from ethyl acetate-benzene to yield 1 - methyl - 5 - nitroimidazol - 2 - ylmethyl N-2-oxopropylcarbamate.

In accordance with the above procedure, but starting with 1 - amino - 2 - oxobutane hydrochloride, 1-amino - 2 - oxopentane hydrochloride and 1 - amino-2-oxo - 2 - phenylethane in place of aminoacetone, there is obtained the corresponding 1 - methyl - 5 - nitroimidazol - 2 - ylmethyl N - (2' - oxobutyl)carbamate, 1 - methyl - 5 - nitroimidazol - 2 - ylmethyl N-(2'-oxopentyl)carbamate, and 1 - methyl - 5 - nitroimidazol-2-ylmethyl N-(2'-oxo-2'-phenylethyl)carbamate.

EXAMPLE 47

N-(1-methyl-5-nitroimidazol-2-ylmethoxycarbonyl) glycine

To a cold tetrahydrofuran solution (100 ml.) of 1-methyl - 5 - nitroimidazol - 2 - ylmethyl chloroformate (prepared as described in Example 1 from 3.12 g. of 1 - methyl - 2 - hydroxymethyl - 5 - nitroimidazole) is added 1.50 (0.02 mole) of glycine. Triethylamine (1.0 g., 0.01 mole) is added and the mixture stirred for 24 hours with cooling in an ice-bath. It is then evaporated under reduced pressure to a gummy residue. This residue is washed with 20 ml. of water, the water is removed and about 100 ml. of ethyl acetate added to the remaining residue. The ethyl acetate addition causes crystallization of N-(1-methyl - 5 - nitromidazol-2-ylmethoxycarbonyl) glycine which is separated by filtration, dried, and recrystallized from ethyl acetate.

In accordance with the above procedure, but starting with α - alanine, β - alanine, serine and γ - amino butyric acid in place of glycine, there is obtained the corresponding N - (1 - methyl - 5 - nitroimidazol - 2 - ylmethoxycarbonyl) - α - alanine, N-(1-methyl - 5 - nitroimidazol-2 - ylmethoxycarbonyl) - β - alanine, N - (1 - methyl-5-nitroimidazol - 2 - ylmethoxycarbonyl-serine, and N-(1-methyl - 5 - nitroimidazol - 2 - ylmethoxycarbonyl)-γ-aminobutyric acid.

EXAMPLE 48

1-methyl-5-nitroimidazol-2-ylmethyl N-carbethoxymethylcarbamate 13.8 g., (0.05 mole) of 1 - methyl - 5 - nitroimidazol-2 - ylmethyl phenylcarbonate is dissolved in 100 ml. ethanol containing .05 mole of glycine ethyl ester. To this solution is added 10 g. (0.05 mole) of triethylamine. After standing for 24 hours, at 15° C. the solution is concentrated under reduced pressure. The residue is dissolved in ethyl acetate and the solution washed with water, dried and the solvent removed under reduced pressure. The residue is recrystallized from ethyl acetate/ether to yield 1-methyl - 5 - nitroimidazol - 2 - ylmethyl N-carbethoxymethylcarbamate.

In accordance with the above procedure, but starting with glycine propyl ester, glycine butyl ester, α-alanine methyl ester, α-alanine pentyl ester, and β-alanine ethyl ester, in place of glycine ethyl ester, there is obtained the corresponding 1-methyl-5-nitroimidazol-2-ylmethyl N-carbopropoxymethylcarbamate, 1 - methyl-5-nitroimidazol-2-ylmethyl N-carbobutoxymethylcarbamate, 1-methyl-5-nitroimidazol-2-ylmethyl N-1-carbomethoxyethylcarbamate, 1 - methyl-5-nitroimidazol-2-ylmethyl N-1-carbopentoxyethylcarbamate, and 1-methyl-5-nitroimidazol-2-ylmethyl N-2-carbethoxyethylcarbamate.

EXAMPLE 49

1-methyl-5-nitroimidazol-2-ylmethyl N-carbamoylmethylcarbamate 13.8 g. (0.05 mole) of 1-methyl-5-nitroimidazol-2-ylmethyl phenylcarbonate is dissolved in 100 ml. ethanol containing .05 mole of glycine amide. To this solution is added 10 g. (0.05 mole) of triethylamine. After standing for 24 hours, at 15° C. the solution is concentrated under reduced pressure. The residue is dissolved in ethyl acetate, washed with water, dried and the solvent removed under reduced pressure. The residue is recrystallized from ethyl acetate/ether to yield 1-methyl-5-nitroimidazol-2-ylmethyl N-carbamoylmethylcarbamate.

In accordance with the above procedure, but starting with α-alanine amide and β-alanine amide, in place of glycine amide, there is obtained the corresponding 1-methyl - 5-nitroimidazol-2-ylmethyl N-1-carbamoylethylcarbamate and 1-methyl-5-nitroimidazol-2-ylmethyl N-2-carbamoylethylcarbamate.

EXAMPLE 50

1-methyl-5-nitroimidazol-2-ylmethyl N-carbamoylmethyl-N-ethylcarbamate 13.8 g. (0.05 mole) of 1-methyl-5-nitroimidazol-2-ylmethyl phenylcarbonate is dissolved in 100 ml. ethanol containing .05 mole of glycine N-ethylamide. To this solution is added 10 g. (0.05 mole) of triethylamine. After standing for 24 hours, at 15° C. the solution is concentrated under reduced pressure. The residue is dissolved in ethyl acetate, washed with water, dried and the solvent removed under reduced pressure. The residue is recrystallized from ethyl acetate/ether to yield 1-methyl-5-nitroimidazol-2-ylmethyl N-carbamoylmethyl N-ethylcarbamate.

In accordance with the above procedure, but starting with glycine N-propylamide, glycine N-butylamine, glycine N-phenylamide, or glycine N-benzylamide, in place of ethyl glycine amide, there is obtained the corresponding 1-methyl-5-nitroimidazol-2-ylmethyl N-carbamoylmethyl N-propylcarbamate, 1-methyl-5-nitroimidazol-2-ylmethyl N-carbamoylmethyl N-butylcarbamate, 1-methyl-5-nitroimidazol-2-ylmethyl N-carbamoylmethyl N-phenylcarbamate, 1-methyl-5-nitroimidazol-2-ylmethyl N-carbamoylmethyl N-benzylcarbamate.

EXAMPLE 51

1-methyl-5-nitroimidazol-2-ylmethyl N-formyloxymethylcarbamate

A mixture of 2.3 g. (0.01 mole) of 1-methyl-5-nitroimidazol - 2 - ylmethyl N-hydroxymethylcarbamate and 90% formic acid (10 ml.) is heated on a steam-bath for 2 hours. After evaporation to dryness the residue is slurried with saturated aqueous sodium bicarbonate solution, and filtered. The product is 1-methyl-5-nitroimidazol-2-ylmethyl N-formyloxymethylcarbamate.

EXAMPLE 52

1-methyl-5-nitroimidazol-2-ylmethyl N-acetoxymethylcarbamate 0.05 mole of 1-methyl-5-nitroimidazol-2-ylmethyl N-hydroxymethylcarbamate is dissolved in 25 ml. of pyridine and 0.055 mole of acetyl chloride introduced dropwise into the stirred solution. After 30 minutes stiring, the solution is allowed to stand at 15° C. for 4 hours. The solvent is removed under reduced pressure. The residue is extracted with ethyl acetate, washed with water, dried, and the solvent removed under reduced pressure. The residue is recrystallized from acetone or ethyl acetate to yield 1-methyl-5-nitroimidazol-2-ylmethyl N-acetoxymethylcarbamate.

In accordance with the above procedure, but starting with propionyl chloride, butyryl chloride, valeryl chloride, or benzoyl chloride, in place of acetyl chloride, there is obtained the corresponding 1-methyl-5-nitroimidazol-2-ylmethyl N-propionoxymethylcarbamate, 1-methyl-5-nitroimidazol-2-ylmethyl N-butyroxymethylcarbamate, 1-methyl - 5 - nitroimidazol-2-ylmethyl N-valeroxymethylcarbamate and 1-methyl-5-nitroimidazol-2-ylmethyl N-benzoyloxymethylcarbamate.

EXAMPLE 53

1-methyl-5-nitroimidazol-2-ylmethyl N-carbamoyloxymethylcarbamate 0.05 mole of 1-methyl-5-nitroimidazol-2-ylmethyl N-hydroxymethylcarbamate is dissolved in 25 ml. of pyridine and the mixture is cooled in an ice-salt bath while .055 mole of gaseous carbamyl chloride is introduced into the stirred solution. The solution is allowed to stand at 15° C. for 24 hours. It is then concentrated and the product extracted with ethyl acetate. The ethyl acetate solution is washed with ice water, dried, and concentrated. Recrystallization from ethyl acetate or acetone yields 1-methyl - 5 - nitroimidazol - 2 - ylmethyl N-carbamoyloxymethylcarbamate.

In accordance with the above procedure, but starting with 1-methyl-5-nitroimidazol - 2 - ylmethyl N-hydroxyethylcarbamate, 1-methyl-5-nitroimidazol-2-ylmethyl N-hydroxypropylcarbamate, or 1-methyl-5-nitroimidazol-2-ylmethyl N-hydroxybutylcarbamate, in place of 1-methyl-5-nitroimidazol - 2-ylmethyl N-hydroxymethylcarbamate, there is obtained the corresponding 1-methyl-5-nitroimidazol-2-ylmethyl N-carbamoyethylcarbamate, 1-methyl-5-nitroimidazol - 2 - ylmethyl N-carbamoyloxypropylcarbamate, and 1-methyl-5-nitroimidazol-2-ylmethyl N-carbamoyloxybutylcarbamate.

EXAMPLE 54

1-methyl-5-nitroimidazol-2-ylmethyl N-(dimethylcarbamoyloxymethyl)carbamate 0.05 mole of 1-methyl-5-nitroimidazol-2-ylmethyl N-hydroxymethylcarbamate is dissolved in 25 ml. of pyridine and the mixture is cooled in an ice-salt bath while .055 mole of dimethyl carbamoyl chloride is introduced into the stirred solution. The solution is allowed to stand at 15° C. for 24 hours. It is then concentrated and the product extracted with ethyl acetate. The ethyl acetate solution is washed with water, dried and concentrated. Recrystallization from ethyl acetate or acetone yields 1-methyl-5-nitroimidazol-2-ylmethyl N-(dimethylcarbamoyloxymethyl)carbamate.

In accordance with the above procedure, but starting with 1-methyl-5-nitroimidazol-2-ylmethyl N-hydroxyethylcarbamate, 1-methyl-5-nitroimidazol-2-ylmethyl N-hydroxy-propylcarbamate, or 1-methyl-5-nitroimidazol-2-ylmethyl N-hydroxybutylcarbamate, in place of 1-methyl-5-nitroimidazol-2-ylmethyl N - hydroxymethylcarbamate, there is obtained the corresponding 1-methyl-5-nitroimidazol - 2 - ylmethyl N-(dimethylcarbamoyloxyethyl)carbamate, 1-methyl-5-nitroimidazol - 2 - ylmethyl N-(dimethylcarbamoyloxypropyl)carbamate and 1-methyl-5-nitroimidazol-2-ylmethyl N - (dimethylcarbamoyloxybutyl)carbamate.

EXAMPLE 55

1-methyl-5-nitroimidazol-2-ylmethyl N-2'-sulfonamidoethylcarbamate

.05 mole of 1-methyl-5-nitroimidazol-2-ylmethyl phenylcarbonate is dissolved in ethanol containing .05 mole of 2-aminoethylsulfonamide and 0.05 mole triethylamine. After 24 hours at 15° C., the solution is evaporated. Trituration with water causes the crystallization of 1-methyl-5-nitroimidazol-2 - ylmethyl N - 2' - sulfonamideethylcarbamate.

In accordance with the above procedure, but using 3-aminopropylsulfonamide, 4-aminobutylsulfonamide and 5-aminopentylsulfonamide, in place of 2-aminoethylsulfonamide, there is obtained the corresponding 1-methyl-5-nitroimidazol-2-ylmethyl N - 3' - sulfonamidopropylcarbamate, 1-methyl-5-nitroimidazol - 2 - ylmethyl N-4'-sulfonamidobutylcarbamate, and 1-methyl-5-nitroimidazol-2-ylmethyl N-5'-sulfonamidopentylcarbamate.

EXAMPLE 56

1-methyl-5-nitroimidazol-2-ylmethyl N-2'-(N',N'-diethylsulfonamido)ethylcarbamate .05 mole of 1-methyl-5-nitroimidazol-2-ylmethyl phenylcarbonate is dissolved in ethanol containing .05 mole of 2-aminoethylsulfonic acid diethylamide, and 0.05 mole triethylamine. After 24 hours at 15° C., the solution is evaporated. Trituration with water causes the crystallization of 1-methyl-5-nitroimidazol - 2 - ylmethyl 2'-(N',N'-diethylsulfonamido)ethylcarbamate.

In accordance with the above procedure, but starting with 2-aminoethylsulfonic acid dipropylamide, 2-aminoethylsulfonic acid diphenylamide, or 2-aminoethylsulfonic acid dibenzylamide, in place of 2-aminoethylsulfonic acid diethylamide, there is obtained the corresponding 1-methyl - 5 - nitroimidazol - 2 - ylmethyl 2'-(N',N'-dipropylsulfonamido)-ethylcarbamate, 1 - methyl - 5 - nitroimidazol - 2 - ylmethyl 2'-(N',N'-diphenylsulfonamido)-ethylcarbamate, and 1-methyl-5-nitroimidazol-2-ylmethyl 2'-(N',N' - dibenzylsulfonamido)ethylcarbamate.

EXAMPLE 57

1-methyl-5-nitroimidazol-2-ylmethyl N-mercaptoethylcarbamate 1.54 g., (002 mole) of 2-mercaptoethylamine is added at 15° C. to a solution of 2.77 g. of 1-methyl-5-nitroimidazol-2-ylmethyl phenylcarbonate in 10 ml. of chloroform. The mixture is stirred for 7 hours and at the end of this time, the solid product is removed by filtration. Recrystallization from ethanol gives 1-methyl-5-nitroimidazol-2-ylmethyl N-2'-mercaptoethylcarbamate.

In accordance with the above procedure, but starting with 3-mercaptopropylamine and 4-mercaptobutylamine, in place of 2-mercaptoethylamine, there is obtained the corresponding 1-methyl-5-nitroimidazol - 2 - ylmethyl N-3'-mercaptopropylcarbamate and 1 - methyl-5-nitroimidazol-2-ylmethyl N-4'-mercaptobutylcarbamate.

EXAMPLE 58

1-methyl-5-nitroimidazol-2-ylmethyl N-ethylthioethyl-carbamate 2.12 g., (0.02 mole) of ethylthioethylamine is added at 15° C. to a solution of 2.77 g. of 1-methyl-5-nitroimidazol-2-ylmethyl phenylcarbonate in 10 ml. of chloroform. The mixture is stirred for 7 hours and then evaporated to dryness. The residue is triturated with ether and the solid product is removed by filtration. Recrystallization from ethanol gives 1-methyl-5-nitroimidazol-2-ylmethyl N-2'-ethylthioethylcarbamate.

In accordance with the above procedure, but starting with 2-methylthioethylamine, 2-propylthioethylamine, 2-butylthioethylamine, or 2-benzylthioethylamine, in place of 2-ethylthioethylamine, there is obtained the corresponding 1 - methyl - 5 - nitroimidazol-2-ylmethyl N-2'-methylthioethylcarbamate, 1-methyl-5-nitroimidazol - 2 - ylmethyl N-2'-propylthioethylcarbamate, 1 - methyl - 5 - nitroimidazol-2-ylmethyl N-2'-butylthioethylcarbamate, and 1-methyl-5-nitroimidazol - 2 - ylmethyl N-2'-benzylthioethylcarbamate.

EXAMPLE 59

1-methyl-5-nitroimidazol-2-ylmethyl N-thioncarbamoyl-methylcarbamate 13.8 g., (0.05 mole) of 1-methyl-5-nitroimidazol-2-ylmethyl phenylcarbonate is dissolved in 100 ml. ethanol containing glycinethioamide (4.5 g., 0.05 mole), and 5.1 g. (0.05 mole) of triethylamine. After standing for 24 hours at 15° C. the solution is concentrated under reduced pressure. The residue is dissolved in ethyl acetate, washed with water, dried. The solvent is removed under reduced pressure and the residue is recrystallized from ethyl acetate/ether to yield 1-methyl-5-nitroimidazol-2-ylmethyl N-thioncarbamoylmethylcarbamate.

In accordance with the above procedure but starting with α-alaninethioamide, or β-alaninethioamide, in place of glycinethioamide, there is obtained the corresponding 1-methyl-5-nitroimidazol - 2 - ylmethyl N - 1' - thioncarbamoylethylcarbamate and 1-methyl-5-nitroimidazol-2-ylmethyl N-2'-thioncarbamoylethylcarbamate.

EXAMPLE 60

1-methyl-5-nitroimidazol-2-ylmethyl N-(N'-ethylthio-carbamoylmethyl)carbamate 13.8 g. (0.05 mole) of 1-methyl-5-nitroimidazol-2-ylmethyl phenylcarbonate is dissolved in 100 ml. ethanol-containing .05 mole of N-ethyl glycinethioamide. To this solution is added 5.1 g. (0.05 mole) of triethylamine. After standing for 24 hours, at 15° C. the solution is concentrated under reduced pressure. The residue is dissolved in ethyl acetate, washed with water, dried. The solvent is removed under reduced pressure. The residue is elurried with water and ethyl acetate. The ethyl acetate extract is evaporated and the residue recrystallized from ethyl acetate/ether to yield 1-methyl-5-nitroimidazol-2-ylmethyl N-(N'-ethylthiocarbamoylmethyl)carbamate.

In accordance with the above procedure, but starting with N-propyl glycinethioamine, N-butyl glycinethioamide, N-phenyl glycinethioamide, or N-benzyl glycinethioamide, in place of N-ethyl glycinethioamide, there is obtained the corresponding 1-methyl-5-nitroimidazol-2-ylmethyl N-(N'-propylthio-carbamoylmethyl)carbamate,
1-methyl-5-nitroimidazol-2-ylmethyl N-(N'-butylthio-carbamoylmethyl)carbamate,
1-methyl-5-nitroimidazol-2-ylmethyl N-(N'-phenylthio-carbamoylmethyl)carbamate, and
1-methyl-5-nitroimidazol-2-ylmethyl N-(N'-benzylthio-carbamoylmethyl)carbamate.

EXAMPLE 61

1-methyl-5-nitroimidazol-2-ylmethyl N-(N'-dimethyl-dithiocarbamoylmethyl)carbamate 1.1 ml. of 40% aqueous dimethylamine and 37% aqueous formaldehyde (1.0 ml.) is added to a solution of 2.0 g. (0.01 mole) of 1-methyl - 5 - nitroimidazol-2-ylmethyl carbamate in 5 ml. of dimethylformamide. To the mixture is added carbon disulfide (1.0 g.). The reaction mixture is stirred for 24 hours at 15° C. Water (10 ml.) is added and the mixture stirred an additional 2 hours. The precipitate is removed by filtration and washed with water to yield 1-methyl-5-nitroimidazol-2-ylmethyl N-(N'-dimethyldithiocarbamoylmethyl)carbamate.

In accordance with the above procedure, but starting with diethylamine, dipropylamine, dibutylamine, diphenylamine, and dibenzylamine, in place of dimethylamine, there is obtained, the corresponding 1-methyl-5-nitroimidazol-2-ylmethyl N-(N'-diethyldithio-carbamoylmethyl)carbamate,
1-methyl-5-nitroimidazol-2-ylmethyl N-(N'-dipropyldi-thiocarbamoylmethyl)carbamate,
1-methyl-5-nitroimidazol-2-yl methyl N-(N-dibutyldi-thiocarbamoylmethyl)carbamate,
1-methyl-5-nitroimidazol-2-ylmethyl N-(N'-diphenyldi-thiocarbamoylmethyl)carbamate, and
1-methyl-5-nitroimidazol-2-ylmethyl N-(N'-dibenzyldi-thiocarbamoylmethyl)carbamate.

EXAMPLE 62

1-methyl-5-nitroimidazol-2-ylmethyl N-(aminoethyl) carbamate 15.5 g. (0.02 mole) of 1-methyl-5-nitroimidazol-2-methyl phenylcarbonate is dissolved in 70 ml. of chloroform and 0.06 mole of ethylene diamine is added. The mixture is heated under reflux for 5 hours, cooled and allowed to stand for 18 hours. 170 ml. of chloroform is added and the mixture extracted with saturated aqueous potassium bicarbonate solution. The chloroform extract is washed with water and the solvent removed under reduced pressure. A portion (0.1 g.) of the residual brown oil is dissolved in methyl ethyl ketone. A solution of 8.53 g. of p-toluenesulfonic acid in 80 ml. of methylethyl ketone is prepared. An excess of the p-toluenesulfonic acid solution (i.e. more than 2 moles per mole of concentrate derivative) is added and the mixture allowed to cool. The solution is evaporated to dryness, 5 ml. of methylethyl ketone added. After standing at 0° C. the di-p-toluene-sulfonic acid salt of 1-methyl-5-nitroimidazol-2-ylmethyl N-(aminoethyl)carbamate is obtained.
with water and ethyl acetate. The ethyl acetate extract is evaporated and the residue recrystallized from ethyl acetate/ether to yield 1-methyl-5-nitroimidazol-2-ylmethyl N-(N'-ethylthiocarbamoylmethyl)carbamate.

EXAMPLE 63

1-methyl-5-nitroimidazol-2-ylmethyl N-(N',N'-diethyl-aminoethyl)carbamate 15.5 g. (0.02 mole) of 1-methyl-5-nitroimidazol-2-methyl phenylcarbonate is dissolved in 70 ml. of chloroform and 2.68 g. (.023 mole) of diethylaminoethylamine is added. The mixture is heated under reflux for 5 hours, cooled and allowed to stand for 18 hours. Chloroform (170 ml.) is added and the mixture extracted with saturated aqueous potassium bicarbonate solution. The chloroform extract washed with water and the solvent removed under reduced pressure. A portion (0.1 g.) of the residual brown oil is dissolved in methylethyl ketone. A solution of 8.53 g. of p-toluenesulfonic acid in 80 ml. of methylethyl ketone is prepared. An excess of the p-toluenesulfonic acid solution (i.e. more than 2 moles per mole of carbonate derivative) and the mixture allowed to cool. The solution is evaporated to dryness, 5 ml. of methylethyl ketone added. After standing at 0° C. the di-p-toluenesulfonic acid salt of 1-methyl-5-nitroimidazol-2-ylmethyl N-(N',N'-diethylaminoethyl)carbamate, M.P. 101–103° C., is obtained.

In accordance with the above procedure, but starting with 3-dimethylaminopropylamine and dibenzylaminoethylamine, in place of diethylaminoethylamine, there is obtained the corresponding 1-methyl-5-nitroimidazol-2-ylmethyl-N-(3',N'-dimethylaminopropyl)carbamate, and 1-methyl-5-nitroimidazol-2-ylmethyl N - (N', - dibenzylaminoethyl)carbamate.

EXAMPLE 64

1-methyl-5-nitroimidazol-2-ylmethyl N-(morpholin-4'-ylmethyl)carbamate 12.0 g., (0.01 mole) of 1-methyl-5-nitroimidazol-2-ylmethyl carbamate, 0.3 g. (0.01 mole) of paraformaldehyde, and 0.86 g. (0.01 mole) of morpholine in 6 ml. of dimethyl formamide is heated at 100° C. in a sealed tube for 24 hours. After evaporation of the solvent under reduced pressure, the residue is dissolved in 20 ml. of methylethyl ketone. A solution of 3.4 g. of p-toluenesulfonic acid in 20 ml. of methylethyl ketone is added to yield a precipitate of the di-p-toluenesulfonic acid salt of 1-methyl-5-nitroimidazol - 2 - ylmethyl N-(morpholin-4'-ylmethyl)carbamate.

In accordance with the above procedure, but starting with N-methylpiperazine, pyrrolidine and thiamorpholine, in place of morpholine, there is obtained the corresponding di-p-toluenesulfonic acid salt of 1-methyl-5-nitroimidazol-2-ylmethyl N - (4 - methylpiperazine - 1 - ylmethyl) carbamate, 1-methyl - 5-nitroimidazol-2-ylmethyl N-(pyrrolilin-1-ylmethyl) carbamate, and 1-methyl-5-nitroimidazol - 2 - ylmethyl N - (thiamorpholine-4'-ylmethyl)carbamate.

EXAMPLE 65

1-methyl-5-nitroimidazol-2-ylmethyl phenylcarbamate

To a solution of 1-methyl-2-hydroxymethyl-5-nitroimidazole chloroformate prepared as in Example 1 (from 11.1 g. of 1 - methyl - 2 - hydromethyl-5-nitroimidazole) there is added 16.3 g. (0.175 mole) of aniline. The temperature of the mixture rises from 0° C. to about 16° C. The mixture is stirred for 90 minutes with cooling in an ice-bath. It is then evaporated under reduced pressure to a gummy residue. This residue is washed with 100 ml. of water, the water is removed and about 100 ml. of ethyl acetate added to the remaining residue. The ethyl acetate addition causes crystallization of 1-methyl-5-nitroimidazol-2-ylmethyl phenylcarbamate. The crystalline product is removed by filtration and dried to give 12.3 g.; M.P. 136–142° C. Recrystallization from methylene chloride and then from ethyl acetate affords substantially pure 1-methyl - 5 - nitroimidazol-2-ylmethyl phenylcarbamate; M.P. 145.5–148° C.

In accordance with the above procedure, but starting with p-fluoroaniline, p-chloroaniline and p-nitroaniline, in place of aniline, there is obtained the corresponding 1-methyl - 5 - nitroimidazol-2-ylmethyl p-fluorophenylcarbamate, 1-methyl-5-nitroimidazol - 2 - ylmethyl p-chlorophenylcarbamate, and 1-methyl - 5 - nitroimidazol-2-ylmethyl p-nitrophenylcarbamate.

EXAMPLE 66

1-methyl-5-nitroimidazol-2-ylmethyl methylphenylcarbamate

A solution of chloroformate ester of 1-methyl-2-hydroxymethyl-5-nitroimidazole is prepared as in Example 1 (from 11.1 g. of 1-methyl-2-hydroxymethyl-5-nitroimidazole) 18.7 g. of N-methylaniline is added to this solution, and the resulting mixture stirred, with ice cooling, for one hour. The mixture is evaporated to dryness in vacuo to a gum which is extracted with 200 ml. of water and 600 ml. of ethyl acetate. The ethyl acetate extracts are separated and evaporated to dryness. The residue is crystallized from a benzene-hexane mixture to give 3.7 g. of 1-methyl-5-nitroimidazol-2-ylmethyl methylphenylcarbamate; M.P. 93–95° C. Recrystallization from 50 ml. of a 1:1 benzene-hexane mixture affords substantially pure material; M.P. 94.5–98° C.

In accordance with the above procedure, but starting with prop-2-en-1-ylamine, but 2-en-1-ylamine, but-3-en-1-ylamine, pent-2-en-1-ylamine and pent-3-en-1-ylamine, in place of N-methylaniline, there is obtained the corresponding 1-methyl-5-nitroimidazol-2-ylmethyl N-(2-propenyl) carbamate,
1-methyl-5-nitroimidazol-2-ylmethyl N-(2-butenyl) carbamate,
1-methyl-5-nitroimidazol-2-ylmethyl N-(3-butenyl) carbamate,
1-methyl-5-nitroimidazol-2-ylmethyl N-(2-pentenyl) carbamate, and
1-methyl-5-nitroimidazole-2-ylmethyl N-(3-pentenyl) carbamate.

EXAMPLE 67

1-methyl-5-nitroimidazol-2-ylmethyl N-ethoxymethylenecarbamate 2.0 g., (0.01 mole) of 1-methyl-5-nitroimidazol-2-ylmethyl carbamate, 1.33 ml. (0.01 mole) of boron fluoride etherate and 25 ml. of triethylorthoformate is heated on a steam bath overnight. The excess triethylorthoformate is removed under vacuum. To the oily residue is added 100 ml. of chloroform and 10 ml. saturated sodium bicarbonate solution. The chloroform solution is separated, washed with 2× 10 ml. of water, and dried over anhydrous sodium sulfate. Evaporation of the chloroform solution gives 1-methyl-5-nitroimidazol - 2 - ylmethyl N-ethoxymethylenecarbamate.

In accordance with the above procedure, but starting with trimethylorthoformate, tripropylorthoformate, tribenzylorthoformate, and triphenylorthoformate, in place of triethylorthoformate, there is obtained the corresponding 1-methyl-5-nitroimidazol-2-ylmethyl N-methoxymethylenecarbamate, 1-methyl-5-nitroimidazol - 2 - ylmethyl N-propoxymethylenecarbamate, 1-methyl - 5 - nitroimidazol - 2 - ylmethyl N-benzyloxymethylenecarbamate, and 1-methyl - 5 - nitroimidazol - 2 - ylmethyl N-phenyloxymethylenecarbamate.

EXAMPLE 68

1-methyl-5-nitroimidazol-2-ylmethyl N-(diethylaminomethylene)carbamate

A mixture of 2.56 g. (0.01 mole) of 1-methyl-5-nitroidazol-2-ylmethyl ethoxymethylenecarbamate, and 0.73 g. (0.01 mole) of diethylamine in 25 ml. of 1,2-dimethoxyethane is refluxed for 2 hours. After cooling, the addition of 3.44 g. (0.02 mole) of p-toluenesulfonic acid results in the separation of the di-p-toluenesulfonate salt of 1-methyl-5-nitroimidazol - 2 - ylmethyl N-(diethylaminomethylene)carbamate.

In accordance with the above procedure, but starting with dimethylamine, dibutylamine, dipropylamine, dibenzylamine, and diphenylamine, in place of diethylamine, there is obtained the corresponding 1-methyl-5-nitroimidazol-2-ylmethyl N-dimethylaminomethylenecarbamate,
1-methyl-5-nitroimidazol-2-ylmethyl N-dibutylaminomethylenecarbamate,
1-methyl-5-nitroimidazol-2-ylmethyl N-dipropylaminomethylenecarbamate,
1-methyl-5-nitroimidazol-2-ylmethyl N-dibenzylaminomethylenecarbamate, and
1-methyl-5-nitroimidazol-2-ylmethyl N-diphenylaminomethylenecarbamate.

EXAMPLE 69

1-methyl-5-nitroimidazol-2-ylmethyl N-(1'-carbethoxyprop-2-ylidine)carbamate 4.0 g. (0.02 mole) of 1-methyl-5-nitroimidazol-2-ylmethyl carbamate, 150 ml. of ethyl acetoacetate and 0.02 g. of p-toluenesulfonic acid (anhydrous) are heated on a steam bath for 4 days. The solvent is removed by evaporation under reduced pressure. The residue is slurried with 1,000 ml. of ether and the mixture filtered. The ether extract is evaporated to dryness under reduced pressure. The residue, in 300 ml. of ether, is refluxed with activated charcoal for 30 minutes. The mixture is filtered and the filtrate concentrated to about 100 ml. The ether solution is cooled to −40° C. and a crystalline precipitate of 1 - methyl - 5 - nitroimidazol-2-ylmethyl N-(1'-carbethoxyprop-2-ylidene)carbamate, M.P. 117–120° C., is obtained.

In accordance with the above procedure, but starting with methyl acetoacetate or benzyl acetoacetate, in place of ethyl acetoacetate, there is obtained the corresponding 1 - methyl - 5 - nitroimidazol-2-ylmethyl N-(1'-carbomethoxy-prop-2-ylidene)carbamate or 1-methyl-5-nitroimidazol-2-ylmethyl N-(1'-benzoyloxycarbonylprop-2-ylidene)carbamate.

EXAMPLE 70

N-(1-methyl-5-nitroimidazol-2-ylmethyloxycarbonyl)-N',N'-dimethylformamidinium chloride hydrochloride 0.2 g. (0.001 mole) of 1-methyl-5-nitroimidazol-2-ylmethyl carbamate is dissolved in 2 ml. of dimethylformamide and 0.1 ml. of thionyl chloride added. The mixture is allowed to stand for 18 hours. Removal of the crystalline precipitate by filtration followed by washing with ether yields N-(1-methyl-5-nitroimidazol-2-ylmethyloxycarbonyl N',N'-dimethylformamidinium chloride hydrochloride; M.P. 147–151° C. (dec.).

EXAMPLE 71

1-methyl-5-nitroimidazol-2-ylmethyl formylcarbamate 3.28 g. (0.01 mole) of N-(1-methyl-5-nitroimidazol-2-ylmethoxycarbonyl) N',N'-dimethylformamidinium chloride hydrochloride is dissolved in 20 ml. of water containing .84 g. of sodium bicarbonate. The solution is allowed to stand overnight. The product is 1-methyl-5-nitroimidazol-2-ylmethyl formylcarbamate. The same compound is obtained on heating on a steam bath 1-methyl-5-nitroimidazol-2-ylmethyl carbamate in an excess of 90% formic acid overnight.

EXAMPLE 72

1-methyl-5-nitroimidazol-2-ylmethyl N-acetylcarbamate 2 g. of 1-methyl-5-nitroimidazol-2-ylmethyl carbamate is added to a mixture of 40 ml. of acetic anhydride and 4 drops of concentrated sulfuric acid. The solution is heated for 18 hours on a steam bath. The solvent is removed under reduced pressure and the residue triturated with petroleum ether and the mixture filtered. The residue is taken up in hot benzene, the mixture filtered and the filtrate concentrated under reduced pressure to a small volume. After standing at 5° C. for 12 hours, 1-methyl-5-nitroimidazol-2-ylmethyl N-acetylcarbamate, M.P. 140–142° C., is obtained on filtration.

In accordance with the above procedure, but using propionic anhydride, butyric anhydride, or chloroacetic anhydride, in place of acetic anhydride there is obtained the corresponding 1 - methyl-5-nitroimidazol-2-ylmethyl N-propionylcarbamate, 1-methyl - 5 - nitroimidazol-2-ylmethyl N-butyrylcarbamate, and 1-methyl-5-nitroimidazol-2-ylmethyl N-chloroacetylcarbamate.

EXAMPLE 73

1-methyl-5-nitroimidazol-2-ylmethyl acetylcarbamate 5.9 g. of 1-methyl-2-hydroxymethyl-5-nitroimidazole and about 0.5 ml. of pyridine are added to a solution of acetyl isocyanate prepared by refluxing a solution of 15.9 g. oxalyl chloride, and 5.9 g. of acetamide in 300 ml. of 1,2-dichloroethane for 16 hours and the mixture refluxed for 80 minutes. The solvent is then removed by concentration in vacuo to give an oil which crystallizes on standing. The crystals are slurried with 50 ml. of benzene and then recovered by filtration. Washing with a mixture of 50 ml. of benzene and 85 ml. of ether leaves crude 1-methyl-5-nitroimidazol-2-ylmethyl acetylcarbamate; M.P. 108–132° C. On recrystallization from benzene-hexane, substantially pure material is obtained; M.P. 132–135° C.

In accordance with the above procedure, but using benzoylisocyanate or phenylacetylisocyanate, in place of acetylisocyanate, there is obtained the corresponding 1-methyl-5-nitroimidazol-2-ylmethyl N-benzoylcarbamate, and 1-methyl-5-nitroimidazol-2-ylmethyl N-phenylacetylcarbamate.

Similarly, in accordance with the above procedure, but using 1 - methyl-2-mercaptomethyl-5-nitroimidazole and 1-ethyl-2-hydroxymethyl-5-nitroimidazole, in place of 1-methyl-2-hydroxymethyl-5-nitroimidazole and utilizing benzoylisocyanate, there is obtained the corresponding 1-methyl-5-nitroimidazol-2-ylmethyl N-benzoylthiolcarbamate and 1-ethyl-5-nitroimidazol-2-ylmethyl N-benzoylcarbamate.

EXAMPLE 74

1-methyl-5-nitroimidazol-2-ylmethyl N-cyanoacetylcarbamate 2 g. (0.01 mole) of 1-methyl-5-nitroimidazol-2-yl carbamate, 0.93 g. (0.011 mole) of cyanoacetic acid and 10 ml. of acetic anhydride are heated on a steam bath for 3 hours. On cooling, a crystalline product is obtained. Recrystallization from ethanol gives 1-methyl-5-nitroimidazol-2-ylmethyl N-cyanoacetylcarbamate.

EXAMPLE 75

1-methyl-5-nitroimidazol-2-ylmethyl N-acryloylcarbamate

To a solution of 2.0 g. (0.01 mole) of 1-methyl-5-nitroimidazol-2-ylmethyl carbamate in 5 ml. of dimethylformamide at 0° C. is added slowly 1.13 g. of acryloyl chloride. The mixture is allowed to warm to room temperature and stand for 8 hours. 10 ml. of water is added slowly and the product 1-methyl-5-nitroimidazol-2-ylmethyl N-acryloylcarbamate is removed by filtration.

In accordance with the above procedure, but using crotonoyl chloride, in place of acryloyl chloride, there is obtained the corresponding 1-methyl-5-nitroimidazol-2-ylmethyl N-crotonoylcarbamate.

EXAMPLE 76

1-methyl-5-nitroimidazol-2-ylmethyl allophanate 3 g. of a solution of 1-methyl-5-nitroimidazol-2-yl methanol in 75 ml. of 1,2-dimethoxy ethane is added to 4 ml. of cyanic acid at Dry Ice temperature. The cyanic acid is obtained by heat depolymerization of cyanuric acid. The reaction mixture is tightly stoppered and allowed to stand at about 0° C. for 48 hours. The solids which are formed are filtered. Extraction of the solids with 300 ml. of boiling water followed by filtration gives, within a few minutes, in the filtrate a first crop of solids which is filtered. The filtrate then deposits 1.0 g. of the desired allophanate which on recrystallization from boiling water gives analytically pure 1-methyl-5-nitroimidazol-2-ylmethyl allophanate; M.P. 210–211° C. (dec.).

EXAMPLE 77

1-methyl-5-nitroimidazol-2-ylmethyl 4',4'-dimethylallophanate

.05 mole of 1-methyl-5-nitroimidazol - 2 - ylmethyl carbamate is dissolved in 25 ml. of pyridine and cooled in an ice-water bath. To this stirred solution is added .055 mole of dimethylcarbamyl chloride. After the initial reaction, the mixture is allowed to stand for 24 hours and is then concentrated under reduced pressure. The residue is extracted with ethyl acetate. The ethyl acetate extract is washed with ice water, and the dried solution is reconcentrated. The residue is recrystallized from ethyl acetate to yield 1-methyl-5-nitroimidazol-2-ylmethyl 4',4'-dimethylallophanate.

In accordance with the above procedure but, starting with diethylcarbamoyl chloride, dipropylcarbamoyl chloride, dibutylcarbamoyl chloride, dibenzylcarbamoyl chloride, or diphenylcarbamoyl chloride, in place of dimethylcarbamoyl chloride, there is obtained the corresponding 1-methyl-5-nitroimidazol-2-ylmethyl 4',4'-diethylallophanate,
1-methyl-5-nitroimidazol-2-ylmethyl 4',4'-dipropylallophanate,
1-methyl-5-nitroimidazol-2-ylmethyl 4',4'-dibutylallophanate,
1-methyl-5-nitroimidazol-2-ylmethyl 4',4'-dibenzylallophanate, and
1-methyl-5-nitroimidazol-2-ylmethyl 4',4'-diphenylallophanate.

EXAMPLE 78

1-methyl-5-nitroimidazol-2-ylmethyl 2'-methylallophanate

.05 mole of 1-methyl-5-nitroimidazol-2-ylmethyl N-methylcarbamate is dissolved in 25 ml. of pyridine and the mixture is cooled in an ice-salt bath while .055 mole of gaseous carbamyl chloride is introduced into the stirred solution. After 30 minutes, the solution is allowed to stand at 15° C. for 24 hours. It is then concentrated and the product extracted with ethyl acetate and washed with ice water. The solution is dried and concentrated. Recrystallization from ethyl acetate or acetone yields 1-methyl-5-nitroimidazol-2-ylmethyl 2'-methylallophanate.

In accordance with the above procedure, but starting with 1-methyl-5-nitroimidazol-2-ylmethyl N-ethylcarbamate,
1-methyl-5-nitroimidazol-2-ylmethyl N-propylcarbamate,
1-methyl-5-nitroimidazol-2-ylmethyl N-butylcarbamate,
1-methyl-5-nitroimidazol-2-ylmethyl N-phenylcarbamate, and
1-methyl-5-nitroimidazol-2-ylmethyl N-benzylcarbamate, in place of 1-methyl-5-nitroimidazol-2-ylmethyl N-methylcarbamate, there is obtained the corresponding 1-methyl-5-nitroimidazol-2-ylmethyl 2'-ethylallophanate,
1-methyl-5-nitroimidazol-2-ylmethyl 2'-propylallophanate,
1-methyl-5-nitroimidazol-2-ylmethyl 2'-butylallophanate,
1-methyl-5-nitroimidazol-2-ylmethyl 2'-phenylallophanate, and
1-methyl-5-nitroimidazol-2-ylmethyl 2'-benzylallophanate.

EXAMPLE 79

1-methyl-5-nitroimidazol-2-ylmethyl N-(piperidinocarbonyl)carbamate 0.05 mole of 1-methyl-5-nitroimidazol-2-ylmethylcarbamate is dissolved in 25 ml. of pyridine and cooled in an ice-water bath. To this stirred solution is added 0.55 mole of piperidino carbonyl chloride. After the initial reaction, the mixture is allowed to stand for 24 hours and is then concentrated under reduced pressure. The residue is extracted with ethyl acetate. The ethyl acetate is washed with ice water and the dried solution is reconcentrated. The residue is recrystallized from ethyl acetate or acetone to yield 1-methyl-5-nitroimidazol-2-yl methyl N-(piperidinocarbonyl)carbamate; M.P. 78.5–80.5° C.

In accordance with the above procedure, but starting with 4-methyl-piperazinocarbonyl chloride, morpholinocarbonyl chloride and thiamorpholinocarbonyl chloride, in place of piperidinocarbonyl chloride, there is obtained the corresponding 1-methyl-5-nitroimidazol-2-ylmethyl N-(4'-methyl piperidinocarbonyl)carbamate, M.P. 101–104° C., 1-methyl-5-nitroimidazol-2-ylmethyl N-(morpholinocarbonyl) carbamate, and 1-methyl-5-nitroimidazol-2-ylmethyl N-(thiamorpholinocarbonyl)carbamate.

EXAMPLE 80

1-methyl-5-nitroimidazol-2-ylmethyl 3'-thionallophanate 0.1 mole of 1-methyl-5-nitroimidazol-2-ylmethylchloroformate is dissolved in 200 ml. of benzene and stirred with 10.6 g. of anhydrous potassium thiocyanate for four days at 20–40° C. This mixture is treated with an excess of anhydrous gaseous ammonia. On cooling, the 1-methyl-5-nitroimidazol-2-ylmethyl 2'-thionallophanate separates in crystalline form.

In accordance with the above procedure, and utilizing a benzene solution of 1-methyl-5-nitroimidazol-2-ylmethoxycarbonyl isothiocyanate as produced above but using methylamine, ethylamine, butylamine, benzylamine, phenylamine, dimethylamine, diethylamine, dibutylamine, dibenzylamine, and diphenylamine, in place of gaseous ammonia, there is obtained the corresponding 1-methyl-5-nitroimidazol-2-ylmethyl 4'-methyl-3'-thionallophanate,
1-methyl-5-nitroimidazol-2-ylmethyl 4'-methyl-3'-thionallophanate,
1-methyl-5-nitroimidazol-2-ylmethyl 4'-butyl-3'-thionallophanate,
1-methyl-5-nitroimidazol-2-ylmethyl 4'-benzyl-3'-thionallophanate,
1-methyl-5-nitroimidazol-2-ylmethyl 4'-phenyl-3'-thionallophanate,
1-methyl-5-nitroimidazol-2-ylmethyl 4',4'-dimethyl-3'-thionallophanate,
1-methyl-5-nitroimidazol-2-ylmethyl 4',4'-diethyl-3'-thionallophanate,
1-methyl-5-nitroimidazol-2-ylmethyl 4',4'-dibutyl-3'-thionallophanate,
1-methyl-5-nitroimidazol-2-ylmethyl 4',4'-dibenzyl-3'-thionallophanate, and
1-methyl-5-nitroimidazol-2-ylmethyl 4',4'-diphenyl-3'-thionallophanate.

EXAMPLE 81

1-methyl-5-nitroimidazol-2-ylmethyl N-nitrocarbamate

.05 mole of 1-methyl-5-nitroimidazol-2-ylmethyl carbamate is dissolved in .066 mole of acetic anhydride and treated with .05 mole of 95% nitric acid over a period of 2 minutes. After 11 minutes, it is poured into an equal volume of saturated sodium chloride solution. After completion of the decomposition of the acetic anhydride, the solution is extracted with ethyl acetate and the ethyl acetate extract washed with water. The dried ethyl acetate solution is saturated with ammonia gas to give the ammonium salt of 1-methyl-5-nitroimidazol-2-ylmethyl N-nitrocarbamate.

EXAMPLE 82

1-methyl-5-nitroimidazol-2-ylmethyl carbazate

A mixture of 5 g. of 1-methyl-5-nitroimidazol-2-ylmethyl phenyl carbonate, 0.5 ml. of 95% hydrazine and 25 ml. of chloroform is stirred at room temperature for one hour. At the end of this time the solid is removed by filtration to give 3.8 g. of material; M.P. 101–105° C. This product is dried in vacuo at 68° C. to remove phenol and then recrystallized from water to give substantially pure 1-methyl-5-nitroimidazol-2-ylmethyl carbazate; M.P. 135–140° C.

EXAMPLE 83

1-methyl-5-nitroimidazol-2-ylmethyl carbazate

To a solution of 1-methyl-2-hydroxymethyl-5-nitroimidazole chloroformate in dioxane as prepared in Example 1, there is added dropwise .06 mole of anhydrous hydrazine. The mixture is stirred for 90 minutes with cooling in an ice bath. The mixture is evaporated under reduced pressure, and the residue washed with water and dissolved in ethyl acetate. The ethyl acetate solution after drying over sodium sulfate, is concentrated to yield 1-methyl-5-nitroimidazol-2-ylmethyl carbazate.

EXAMPLE 84

1-methyl-5-nitroimidazol-2-ylmethyl N'-methylcarbazate

.05 mole of 1-methyl-5-nitroimidazol-2-ylmethyl chloroformate is dissolved in 50 ml. of anhydrous tetrahydrofuran and added to a solution containing .15 mole of methylhydrazine in 50 ml. of tetrahydrofuran at 15° C. After 2 hours, the methylhydrazine hydrochloride is removed by filtration. The tetrahydrofuran is removed under reduced pressure and the residue is recrystallized from ethyl acetate to yield 1-methyl-5-nitroimidazol-2-ylmethyl $N^1$-methylcarbazate.

In accordance with the above procedure, but starting with ethylhydrazine, propylhydrazine, or benzylhydrazine, in place of methylhydrazine, there is obtained the corresponding 1-methyl-5-nitroimidazol - 2 - ylmethyl $N^1$-ethylcarbazate, 1-methyl-5-nitroimidazol-2-ylmethyl $N^1$-propylcarbazate, and 1-methyl-5-nitroimidazol-2-ylmethyl $N^1$-benzylcarbazate.

EXAMPLE 85

1-methyl-5-nitroimidazol-2-ylmethyl $N^2$-isopropylidinylcarbazate 200 mg. of 1-methyl-5-nitroimidazol-2-ylmethyl carbazate is dissolved in 3 ml. of acetone and heated under reflux for 10 minutes. The solvent is removed under reduced pressure and the residue recrystallized from a 1:1 mixture of benzene and hexane to yield 1-methyl-5-nitroimidazol - 2 - ylmethyl $N^2$-isopropylidenylcarbazate; M.P. 160–162° C.

In accordance with the above procedure, but using methylethyl ketone, benzaldehyde, acetaldehyde, in place of acetone, there is obtained the corresponding 1-methyl-5 - nitroimidazol-2-ylmethyl $N^2$-2″-butylidenylcarbazate, 1-methyl - 5 - nitroimidazol-2-ylmethyl $N^2$-benzylidenylcarbazate, and 1-methyl-5-nitroimidazol-2-ylmethyl $N^2$-ethylidenecarbazate.

EXAMPLE 86

2-methyl-5-nitroimidazol-2-ylmethyl $N^2$-benzoylcarbazate

.1 mole of 1-methyl-5-nitroimidazol-2-ylmethyl carbazate is dissolved in 50 ml. of dry pyridine and cooled in ice. 0.1 mole of benzoyl chloride is added dropwise. After standing for 1 hour at 15° C., the solution is quenched with ice and water. The precipitated 1-methyl-5-nitroimidazol - 2 - ylmethyl $N^2$ - benzoylcarbazate is filtered, washed well with water and recrystallized from ethanol.

In accordance with the above procedure, but using acetic anhydride in place of benzoyl chloride, there is obtained the corresponding 1-methyl-5-nitroimidazol-2-yl methyl $N^2$-acetylcarbazate.

Similarly, but using propionic anhydride, valeric anhydride, butyric anhydride or phenylacetic anhydride, in place of acetic anhydride, there is obtained the corresponding 1-methyl-5-nitroimidazol-2-ylmethyl $N^2$-propionylcarbazate, 1-methyl-5-nitroimidazol - 2 - ylmethyl $N^2$-valerylcarbazate, 1-methyl-5-nitroimidazol-2-ylmethyl $N^2$-butyrylcarbazate, and 1 - methyl - 5 - nitroimidazol-2-ylmethyl $N^2$-phenylacetylcarbazate.

EXAMPLE 87

$N^4$-(1'-methyl-5'-nitroimidazol-2'-ylmethoxy)semicarbazide

To .05 mole of 1-methyl-5-nitroimidazol-2-ylmethyl chloroformate in 50 ml. of dry purified tetarhydrofuran is added .05 mole of semicarbazide hydrochloride. To this mixture is added .3 mole of triethylamine. The mixture is stirred vigorously for 2 hours. The solid precipitate is filtered. The tetrahydrofuran filtrate is removed under reduced pressure and the residue is well washed with water. The combined water insolubles are recrystallized from ethanol to yield $N^4$-(1'-methyl-5'-nitroimidazol-2'-yl-methoxy carbonyl)semicarbazide.

In accordance with the above procedure, but using thiosemicarbazide hydrochloride in place of semicarbazide hydrochloride, there is obtained the corresponding $N^4$-(1 - methyl - 5' - nitroimidazol - 2' - ylmethoxycarbonyl) thiosemicarbazide.

EXAMPLE 88

1-methyl-5-nitroimidazol-2-ylmethyl N-hydroxycarbamate 0.386 g. of sodium is dissolved in 40 ml. of methanol and the solution cooled in an ice bath. 1.17 g. of hydroxylamine hydrochloride is added to the cold methanol solution. To the resulting mixture there is added over a period of 45 minutes 2.33 g. of 1-methyl-5-nitroimidazol-2-ylmethyl phenyl carbonate in 60 ml. of methanol. The resulting mixture is held for 15 hours at refrigerator temperature and at the end of this time, the solid material present is removed by filtration. The solid is washed with alcohol and then with hexane, and dried to give 1-methyl-5 - nitroimidazol-2-ylmethyl N - hydroxycarbamate; M.P 189–190° C.

In accordance with the above procedure, but starting with N-methylhydroxylamine hydrochloride, N-propylhydroxylamine hydrochloride, N-phenylhydroxylamine hydrochloride, and N-benzylhydroxylamine hydrochloride, in place of hydroxylamine, there is obtained the corresponding 1-methyl-5-nitroimidazol-2-ylmethyl-N-hydroxycarbamate, 1-methyl-5-nitroimidazol - 2 - ylmethyl N-propyl-N-hydroxycarbamate, 1-methyl-5-nitroimidazol-2-ylmethyl N-phenyl-N-hydroxycarbamate, and 1-methyl-5-nitroimidazol-2-ylmethyl N-benzyl - N - hydroxycarbamate.

EXAMPLE 89

1-(2'-acetoxyethyl)-5-nitroimidazol-2-ylmethyl N-hydroxy carbamate 3.66 g. of 1-(2'-acetoxyethyl) - 5 - nitroimidazol-2-ylmethyl phenyl carbonate is dissolved in 20 ml. of methanol and treated with freshly prepared hydroxylamine from .72 g. of hydroxylamine hydrochloride and .6 g. of sodium methoxide in 20 ml. of methanol. The residue is recrystallized from ethanol to yield 1-(2'-acetoxyethyl)-5-nitroimidazol-2-ylmethyl N-hydroxycarbamate; M.P. 153–155° C.

EXAMPLE 90

1-methyl-5-nitroimidazol-2-ylmethyl N-hydroxythioncarbamate 0.56 g. (0.005 mole) of potassium t-butoxide is dissolved in 20 ml. of ethanol and 0.35 g. (0.005 mole) of hydroxylamine hydrochloride is added and the mixture stirred for 5 minutes. 0.732 g. (0.0025 mole) of 1-methyl-5 - nitroimidazol - 2 - ylmethyl phenyl thioncarbonate is added and the mixture allowed to stand for 1 hour. The solvent is removed under reduced pressure, and water added to the residue to yield 1-methyl-5-nitroimidazol-2-ylmethyl N - hydroxythioncarbamate; M.P. 94–95° C. (dec.).

In accordance with the above procedure, but starting with N - methylhydroxylamine, N - propylhydroxylamine, N-phenylhydroxylamine, and N-benzylhydroxylamine, in place of hydroxylamine, there is obtained the corresponding 1-methyl-5-nitroimidazol-2-ylmethyl N-methyl-N-hydroxythioncarbamate, 1-methyl - 5 - nitroimidazol-2-ylmethyl N-propyl-N-hydroxythioncarbamate, and 1-methyl-5-nitroimidazol-2-ylmethyl N'-benzyl-N'-hydroxythioncarbamate.

EXAMPLE 91 bis-(1-methyl-5-nitroimidazol-2-ylmethoxy N-hydroxyiminocarbonyl)disulfide

To a mixture of 0.347 g. of hydroxylamine hydrochloride and 0.56 g. potassium butoxide in 20 ml. of ethanol is added 0.732 g. of 1-methyl-5-nitroimidazol-2-ylmethyl phenyl thioncarbonate and the mixture allowed to stand for 48 hours at 5° C. A solution of iodine in methanol was added with stirring until the iodine coloration remained in the reaction mixture. Water was added and bis-(1-methyl-5-nitroimidazol - 2 - ylmethoxy N-hydroxyiminocarbonyl)disulfide was obtained as crystals; M.P. 180° C. (dec.).

EXAMPLE 92

1-methyl-5-nitroimidazol-2-ylmethyl N-methoxycarbamate 2 g. of 1-methyl-5-nitroimidazol-2-ylmethyl N-hydroxycarbamate in dissolved in 100 ml. hot methanol. After cooling the solution is treated with an excess of an ether solution of diazomethane. At first, decolorization of the diazomethane is rapid, but later it is very low. After several hours, the colorless solution is filtered from starting material. The residue from the solution is chromatographed over a column of silica gel in ethyl acetate solution. The O-methyl derivative comes directly through the column and is non-crystalline. This material is treated with one equivalent weight of p-toluenesulfonic acid in methyl ethyl ketone to give the p-toluenesulfonic acid salt of 1 - methyl-5-nitroimidazol-2-ylmethyl N-methoxy carbamate in 17% overall yield; M.P. 113–115° C.

In accordance with the above procedure, but starting with 1-methyl-5-nitroimidazol-2-ylmethyl N-methyl-N-hydroxycarbamate,
1-methyl-5-nitroimidazol-2-ylmethyl N-propyl-N-hydroxycarbamate,
1-methyl-5-nitroimidazol-2-ylmethyl N-phenyl-N-hydroxycarbamate,
1-methyl-5-nitroimidazol-2-ylmethyl N-benzyl-N-hydroxycarbamate, in place of 1-methyl-5-nitroimidazol-2-ylmethyl N-hydroxycarbamate, there is obtained the corresponding 1-methyl-5-nitroimidazol-2-ylmethyl N-methyl-N-methoxycarbamate,
1-methyl-5-nitroimidazol-2-ylmethyl N-propyl-N-methoxycarbamate,
1-methyl-5-nitroimidazol-2-ylmethyl N-phenyl-N-methoxycarbamate,
1-methyl-5-nitroimidazol-2-ylmethyl N-benzyl-N-methoxy carbamate.

In accordance with the above procedure, but using diazoethane, diazopropane, diazobutane, and phenyldiazomethane, in place of diazomethane, there is obtained the corresponding 1 - methyl-5-nitroimidazol-2-ylmethyl N-ethoxy carbamate, 1-methyl-5-nitroimidazol-2-ylmethyl N-propoxy carbamate, 1-methyl-5-nitroimidazol-2-ylmethyl N-butoxy carbamate, and 1-methyl-5-nitroimidazol-2-ylmethyl N-benzyloxycarbamate.

EXAMPLE 93

1-methyl-5-nitroimidazol-2-ylmethyl acetoxycarbamate

To a solution of 2.22 g. (0.01 mole) of 1-methyl-5-nitroimidazol-2-ylmethyl hydroxycarbamate in 10 ml. of pyridine, cooled in an ice bath, is added slowly 1.12 g. acetic anhydride. The mixture is allowed to warm to room temperature. The solvent is evaporated at reduced pressure leaving a residue which is slurried in ether and filtered giving 1-methyl-5-nitroimidazol-2-ylmethyl acetoxycarbamate.

In accordance with the above procedure, but starting with propionic anhydride, butyric anhydride, valeric anhydride or phenylacetic anhydride, in place of acetic anhydride, there is obtained the corresponding 1-methyl-5-nitroimidazol-2-ylmethyl N-propionoxycarbamate,
1-methyl-5-nitroimidazol-2-ylmethyl N-butyroxycarbamate,
1-methyl-5-nitroimidazol-2-ylmethyl N-valeroxycarbamate, and
1-methyl-5-nitroimidazol-2-ylmethyl N-phenylacetoxycarbamate.

In accordance with the above procedure, but starting with trifluoroacetic anhydride, in place of acetic anhydried, there is obtained the corresponding 1-methyl-5-nitroimidazol-2-ylmethyl N-trifluoroacetoxycarbamate.

EXAMPLE 94

1-methyl-5-nitroimidazol-2-ylmethyl N-benzoyloxycarbamate 1 g. of 1-methyl-5-nitroimidazol-2-ylmethyl hydroxycarbamate in 15 ml. of - N sodium hydroxide is stirred for 2 hours with 0.65 g. of benzoyl chloride. Benzoylation is repeated with 0.5 ml. of benzoyl chloride and additional sodium hydroxide. 25 ml. of benzene is added and the benzene layer separated, washed with water and dried over sodium sulfate. Evaporation yields 1-methyl-5-nitroimidazol-2-ylmethyl N - benzoyloxycarbamate: M.P. 147–151° C.

EXAMPLE 95

1-methyl-5-nitroimidazol-2-ylmethyl N-acetyl-N-acetoxy carbamate 0.22 g. (0.001 mole) of 1-methyl-5-nitroimidazol-2-ylmethyl hydroxycarbamate, 0.1 g. of potassium acetate and 5 ml. of acetic anhydride are heated on a steam bath for 3 hours. The reaction mixture is evaporated to dryness at reduced pressure and 5 ml. of water and 50 ml. of chloroform added to the residue. The chloroform extract on evaporation gives a crystalline product which is slurried in ether and filtered to yield 1-methyl-5-nitroimidazol-2-ylmethyl N-acetyl-N-acetoxycarbamate.

In accordance with the above procedure, but using propionic anhydride and potassium propionate, butyric anhydride and potassium butyrate, valeric anhydride and potassium valerate, phenylacetic anhydride and potassium phenyl acetate in place of acetic anhydride and potassium acetate, there is obtained the corresponding 1-methyl-5-nitroimidazol-2-ylmethyl N-propionyl-N-propionyloxycarbamate,
1-methyl-5-nitroimidazol-2-ylmethyl N-butyryl-N-butyryloxycarbamate,
1-methyl-5-nitroimidazol-2-ylmethyl-N-valeryl-N-valeryloxycarbamate, and
1-methyl-5-nitroimidazol-2-ylmethyl N-phenylacetyl-N-phenylacetoxycarbamate.

EXAMPLE 96

1-methyl-5-nitroimidazol-2-ylmethyl sulfamoylcarbamate 0.1 mole of 1-methyl-2-hydroxymethyl-5-nitroimidazole in 100 ml. of methylene chloride is treated with .1 mole of chlorosulfonylisocyanate with heating at 50° C. until all of the starting material is dissolved. On cooling the intermediate, 1 - methyl-5-nitroimidazol-2-ylmethyl carbamate-N-sulfonyl chloride crystallizes. This product in methylene chloride is treated with methylene chloride containing an excess of ammonia while cooling to −20° C. After 2 hours the excess ammonia and solvent are removed by evaporation. The product is washed with water. The 1-methyl-5-nitroimidazol-2-ylmethyl sulfamylcarbamate is recrystallized from methanol or ethanol.

In accordance with the above procedure, but using methylamine, dimethylamine, ethylamine, propylamine, aniline or benzylamine, in place of ammonia, there is obtained the corresponding 1-methyl-5-nitroimidazol-2-ylmethyl N-(N'-methylsulfamoyl)carbamate,
1-methyl-5-nitroimidazol-2-ylmethyl N-(N',N'-dimethylsulfamoyl)carbamate,
1-methyl-5-nitroimidazol-2-ylmethyl N-(N'-ethylsulfamoyl)carbamate,
1-methyl-5-nitroimidazol-2-ylmethyl N-(N'-propylsulfamoyl)carbamate,
1-methyl-5-nitroimidazol-2-ylmethyl N-(N'-phenylsulfamoyl)carbamate, and
1-methyl-5-nitroimidazol-2-ylmethyl N-(N'-benzylsulfamoyl)carbamate.

EXAMPLE 97

1-methyl-5-nitroimidazol-2-ylmethyl N-(p-toluenesulfonyl)carbamate

.1 mole of 1-methyl-5-nitroimidazol - 2 - ylcarbamate and 0.1 mole of p-toluenesulfonylisocyanate are added to 200 ml. of benzene containing 0.5 ml. of pyridine. The resulting mixture is heated under reflux until complete solution is obtained. The solvent is then removed by evaporation under reduced pressure. The partially crystalline material thus obtained is recrystallized from ethylacetate or acetone to yield 1-methyl-5-nitroimidazol-2-ylmethyl N-(p-toluenesulfonyl)carbamate; M.P. 159–172° C. (dec.).

In accordance with the above procedure, but starting with methanesulfonylisocyanate in place of p-toluenesulfonylisocyanate, there is obtained the corresponding 1 - methyl-5-nitroimidazol-2-ylmethyl N-methanesulfonyl carbamate.

In accordance with the above procedure, but starting with the corresponding isothiocyanates there are obtained the corresponding 1-methyl-5-nitroimidazol-2-ylmethyl N-substituted sulfonylthiocarbamate.

EXAMPLE 98

1-methyl-5-nitroimidazol-2-ylmethyl N-diaminophosphoryl carbamate

.1 mole of dichlorophosphoryl isocyanate is added to an ice cold solution of .1 mole of 1-methyl-2-hydroxymethyl-5-nitroimidazole dissolved in anhydrous tetrahydrofuran. After standing 18 hours at 0° C., this solution is added to an excess of ammonia gas dissolved in tetrahydrofuran. After two hours at 15° C., the mixture is filtered from ammonium chloride and the tetrahydrofuran is removed under reduced pressure. The ammonium chloride is dissolved in water and any insoluble material is combined with the residue from tetrahydrofuran. After washing with water, the 1-methyl-5-nitroimidazol-2-ylmethyl N-diaminophosphoryl carbamate is recrystallized from ethanol.

In accordance with the above procedure, but using methylamine, dimethylamine, ethylamine, propylamine, aniline and benzylamine, in place of gaseous ammonia, there is obtained the corresponding 1-methyl-5-nitroimidazol-2-ylmethyl N-[bis(methylamino)phosphoryl]carbamate,
1-methyl-5-nitroimidazol-2-ylmethyl N-[bis(dimethylamino)phosphoryl]carbamate,
1-methyl-5-nitroimidazol-2-ylmethyl N-[bis(ethylamino)phosphoryl]carbamate,
1-methyl-5-nitroimidazol-2-ylmethyl N-[bis(propylamino)phosphoryl]carbamate,
1-methyl-5-nitroimidazol-2-ylmethyl N-[bis(anilino)phosphoryl]carbamate, and
1-methyl-5-nitroimidazol-2-ylmethyl N-[bis(benzylamino)phosphoryl]carbamate.

EXAMPLE 99

4-phenyl-5-nitroimidazole 1.56 g. of 4-p-acetylaminophenyl-5-nitroimidazole is suspended in 50 ml. of ethanol and 13 ml. of concentrated sulfuric acid added dropwise with cooling and stirring, temperature being maintained below 10° C. An aqueous solution containing 1.03 g. of sodium nitrite is cooled to below 10° C. and added slowly to the ethanolic solution. The reaction mixture is maintained at a temperature of less than 10° C. and stirred for 1 hour. A further aqueous solution of sodium nitrite containing 1.03 g. of sodium nitrite is added and the reaction mixture stirred for a further hour. 252 mg. of finely divided copper bronze alloy is added and the mixture warmed on a steam bath for 15 minutes until effervescence ceases. The reaction mixture is filtered and the filtrate added to a mixture of ethyl acetate and water which is again filtered. The ethyl acetate layer is separated and the aqueous layer further extracted with ethyl acetate. The combined ethyl acetate extract is dried and the solvent removed by evaporation under reduced pressure. The residue is combined with the residues from the previous two filtrations. The mixture is sublimed in vacuo at an oil bath temperature of circa 200° C. The sublimate is taken up in acetone, filtered, concentrated and cooled to yield 4-phenyl-5-nitroimidazole; M.P. 284–288° C. (dec.).

EXAMPLE 100

1-methyl-4-phenyl-5-nitroimidazole 100 mg. of 4-phenyl-5-nitroimidazole and 0.06 g. of dimethyl sulfate are warmed to 145° C. over 45 minutes. The homogenous mixture is cooled in an ice bath, aqueous sodium hydroxide solution added and the mixture poured into excess water.

The mixture is filtered and the residue, after air drying, is recrystallized from ether ether/petroleum ether to yield 1-methyl-4-phenyl - 5 - nitroimidazole; M.P. 74.5–75.5° C.

In accordance with the above procedure, but starting with 4-chlorophenyl-5-nitroimidazole and 4-nitrophenyl-5-nitroimidazol, in place of 4-phenyl-5-nitroimidazole, there is obtained the corresponding 1-methyl-4-chlorophenyl-5-nitroimidazole and 1-methyl-4-nitrophenyl-5-nitroimidazole.

EXAMPLE 101

1-methyl-4-phenyl-5-nitroimidazol-2-ylmethyl carbamate

A mixture of 2 g. of 1-methyl-4-phenyl-5-nitroimidazole, 15 g. (0.05 mole) of paraformaldehyde and 15 ml. of dimethylsulfoxide is heated in a sealed tube overnight at 110–150° C. The dimethylsulfoxide is removed completely at reduced pressure, and the residue is dissolved in water and extracted with chloroform. The chloroform extract is dried and concentrated. The residue is dissolved in ethyl acetate, and the solution is charged on a column of alumina. Elution with ethyl acetate and evaporation of the solvent yields 1-methyl-2-hydroxymethyl-4-phenyl-5-nitroimidazole.

A solution of 2.33 g. (0.01 mole) of 1-methyl-2-hydroxymethyl-4-phenyl-5-nitroimidazole in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 1-methyl-4-phenyl-5-nitroimidazol-2-ylmethyl phenyl carbonate is separated by filtration.

0.005 mole of 1-methyl-4-phenyl-5-nitroimidazol-2-ylmethyl phenyl carbonate is dissolved slowly in 50 ml. of liquid ammonia. After solution is complete, the ammonia is permitted to evaporate. The residue is washed with water and recrystallized from methanol to yield 1-methyl-4-phenyl-5-nitroimidazol-2-ylmethyl carbamate.

In accordance with the above procedure, but starting with 1-methyl-4-chlorophenyl-5-nitroimidazole or 1-methyl-4-nitrophenyl-5-nitroimidazole, there is obtained the corresponding 1-methyl-4-chlorophenyl-5-nitroimidazol-2-ylmethyl carbamate and 1-methyl-4-nitrophenyl-5-nitroimidazol-2-ylmethyl carbamate.

EXAMPLE 102

1-methyl-4-cyano-5-nitroimidazol-2-ylmethyl carbamate

A mixture of 15.2 g. (0.1 mole) of 1-methyl-4-cyano-5-nitroimidazole, 15 g. (0.5 mole) of paraformaldehyde and 150 ml. of dimethylsulfoxide is heated in a sealed tube overnight at 120° C. The dimethylsulfoxide is removed completely at reduced pressure, and the residue is dissolved in water and extracted with chloroform. The chloroform extract is dried and concentrated. The residue is dissolved in ethyl acetate, and the solution is charged on a column of alumina. Elution with ethyl acetate and evaporation of the solvent yields 1-methyl-2-hydroxymethyl-4-cyano-5-nitroimidazole.

A solution of 1.82 g. (0.01 mole) of 1-methyl-2-hydroxymethyl-4-cyano-5-nitroimidazole in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 1-methyl-4-cyano-5-nitroimidazol-2-ylmethyl phenyl carbonate is separated by filtration.

0.005 g. of 1-methyl-4-cyano - 5 - nitroimidazol-2-ylmethyl phenyl carbonate is dissolved slowly in 50 ml. of liquid ammonia. After solution is complete, the ammonia is permitted to evaporate and the residue washed with water and recrystallized from methanol to yield 1-methyl-4-cyano-5-nitroimidazol-2-ylmethyl carbamate.

EXAMPLE 103

3-nitro-5,6-dihydroimidazo-[1,2:α]-pyrrol-7-yl carbamate

A mixture of 1.67 g. (0.01 mole) of 3-nitro-7-oxo-5,6-dihydroimidazo-[1,2:α]-pyrrole, 0.39 g. (0.01 mole) of sodium borohydride and 100 ml. of ethanol is allowed to stand at 15° C. for 6 hours. After addition of a few drops of acetic acid to decompose the excess borohydride, the solution is evaporated to a small volume, and 50 ml. of water added slowly with stirring. The product, 3-nitro-7-hydroxy-5,6-dihydroimidazo-[1,2:]-pyrrole is filtered and dried.

To a solution of 1.69 g. (0.01 mole) of the above product in 10 ml. of pyridine, cooled in an ice bath, is added 1.57 g. of phenyl chloroformate dropwise over a period of 20 minutes. The mixture is allowed to warm to room temperature and held for 48 hours. The reaction mixture is quenched in 60 ml. of ice water and the resulting solid recovered by filtration. After drying, the 3-nitro-5,6-dihydroimidazo-[1,2α]-pyrrol-7-yl phenyl carbonate is dissolved in 50 ml. of chloroform and the resulting solution added dropwise to 20 ml. of liquid ammonia, cooled in Dry Ice bath. After stirring for 30 minutes, the mixture is allowed to warm gradually to room temperature. The choroform is removed by evaporation and the residue slurried with water, 3-nitro-5,6-dihydroimidazo-[1,2α]-pyrrol-7-yl carbamate is obtained on filtration.

EXAMPLE 104

1-methyl-2-hydroxymethyl-4-nitroimidazole

To a mixture of 1.43 g. of 2-hydroxymethyl-4-nitroimidazole in 50 ml. of dry 1,2-dimethoxy ethane at 0° C. is added 0.24 g. of sodium hydride. 1.26 g. of dimethyl sulfate is added and the mixture is refluxed for 2 hours. After cooling, the solvent is evaporated under reduced pressure. 10 ml. of 4 N ammonium hydroxide solution is added and the mixture extracted with 2× 75 ml. of ethyl acetate. The ethyl acetate extract is evaporated to dryness to give 1 - methyl - 2 - hydromethyl-4-nitroimidazole; M.P. 166–168° C.

EXAMPLE 105

1-methyl-4-nitroimidazol-2-ylmethyl carbamate 3 g. of 1-methyl-2-hydroxymethyl-5-nitroimidazole are heated under reflux with 10 ml. of methyliodide in 20 ml. of benzene for 4 days. The solvent is removed to yield the methiodide which is not further purified. The 1-methyl - 2 - hydroxymethyl-5-nitroimidazole methiodide thus obtained is heated to circa 250° C. under .01 mm. pressure to yield 1-methyl-2-hydroxymethyl-4-nitroimidazole as a crystalline sublimate which is recrystallized from acetone and ether to give a product having a melting point 168–172° C.

A solution of 1.43 g. (.0091 mode) of 1-methyl-2-hydroxymethyl-4-nitroimidazole in 10 ml. of dry pyridine is stirred at 0° C. and 2.7 ml. of phenyl chloroformate is slowly added. The reaction mixture is stirred for 3–4 hours at room temperature and is poured into about 100 ml. of water. The mixture is cooled overnight and the precipitate of 1-methyl-4-nitroimidazol-2-ylmethyl phenyl carbonate is separated by filtration, (2.1 g., M.P. 105–106° C.).

2 g. of 1-methyl-4-nitroimidazol-2-ylmethyl phenyl carbonate is dissolved slowly in 20 ml. of liquid ammonia. After solution is complete, the ammonia is permitted to evaporate and the residue washed with water and recrystallized from ethanol to yield 1-methyl-4-nitroimidazol-2-ylmethyl carbamate (1.2 grams, M.P. 187–189° C.).

EXAMPLE 106

3-nitro-7-oxo-5,6-dihydroimidazo-[1,2:a]-pyrrole

Part A.—1,2 - trimethylene - 5-nitroimidazole.—1.00 gm. of 1-(β - hydroxyethyl) - 2 - methyl-5-nitroimidazole (5.85 mmol.) and 1.'50 g. of p-toluenesulfonyl chloride (7.9 mmol.) are dissolved together in 10 ml. of pyridine and the solution allowed to stand for 7 hours at room temperature. The mixture is then diluted with 50 ml. of water, cooled in ice and the resulting crystalline 1-[2-(p-toluenesulfonyloxy) - ethyl] - 2-methyl-5-nitroimidazole filtered off, washed with water and air dried. 1.43 gm. of product is obtained.

1.00 gm. of 1-[2-(p-toluenesulfonyloxy)-ethyl]-2-methyl-5-nitroimidazole (3.08 mmol.) is heated for 20 minutes at 70–75° C. in 20 ml. of absolute alcohol with 344 mg. (3.08 mmol.) of potassium t-butoxide. The ethanol is then evaporated off in vacuo and the residue treated with 10 ml. of water and filtered. The filtrate is extracted three times with 4 ml. portions of chloroform. The chloroform extracts are combined, dried over sodium sulfate and finally evaporated to dryness to give 418 mg. of pale brown oil which crystallizes on scratching. This crude product is dissolved in 1:1 ether-hexane and filtered through 5.0 gm. of basic alumina. The alumina is eluted with 1:1 ether-hexane and this eluate evaporated to dryness in vacuo to give 336 mg. of crystalline 1,2-trimethylene-5-nitroimidazole. The product is recrystallized from ether-hexane to give 50 mg. of 3-nitro-7-benzal-5,6-dihydroimidazo-[1,2:a]-pyrrole, M.P. 159–161° C. Further recrystallization from ethanol raises the melting point to 165°–167° C.

Part B.—3-nitro-7-oxo-5,6-dihydroimidazo-[1,2:a]-pyrrole

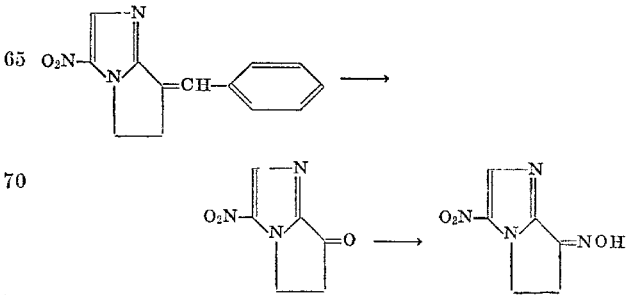

A mixture of 500 mg. of 3-nitro-7-benzal-5,6-dihydroimidazo-[1,2:a]-pyrrole (2.0 mmol.), 932 mg. of sodium periodate, 15 ml. of 1,2-dimethoxyethane, 5 ml. of water and 19 mg. of osmium tetroxide is stirred at room temperature for 3½ hours. An equal volume of methylene chloride is then added and the mixture filtered. The filtrate is washed with water and evaporated to a residue containing 3-nitro-7-oxo - 5,6 - dihydroimidazo - [1,2:a]-pyrrole.

EXAMPLE 107

3-nitro-7-hydroxy-5,6-dihydroimidazo-[1,2-a]-pyrrole 3-nitro-5,6-dihydroimidazo-[1,2-a]-pyrrole-7-one (1.67 g.) is dissolved in 25 ml. of methanol, and the solution is cooled to about 10° C. in an ice bath. Sodium borohydride (0.5 grams) is then added, and the reaction mixture is held at 10° C. for one hour, then at room temperature for two hours. The excess reducing agent is destroyed by the addition of a few drops of dilute acetic acid, the solvent is removed in vacuo, and the residue is taken up in ethyl acetate and washed with water and saturated sodium bicarbonate solution. Removal of the ethyl acetate under reduced pressure gives the crude 3-nitro-7-hydroxy-5,6-dihydroimidazo-[1,2:a]-pyrrole which is purified by recrystallization from ethyl acetate/hexane.

EXAMPLE 108

1-methyl-4-cyano-5-nitroimidazole 1-methyl-4-bromoimidazole (16 grams) is dissolved in 80 ml. of concentrated sulfuric acid cautiously with cooling. Fuming nitric acid (80 ml.) is then added with stirring and cooling, and the resulting mixture is warmed on the steam bath for two hours, cooled, and poured over ice. The residue is adjusted to pH 3–4 with dilute caustic, and the precipitated 1-methyl-4-bromo-5-nitroimidazole is collected by filtration, washed with water, and air dried. 1 - methyl-4-bromo-5-nitroimidazole (10 grams) is dissolved in 50 ml. of dry dimethylformamide containing a suspension of 15 grams of cuprous cyanide. The mixture is heated under reflux for three hours, cooled, and diluted with cold water. The product, 1-methyl-4-cyano-5-nitroimidazole, is collected by filtration, washed with water, air-dried, and recrystallized from ethanol.

EXAMPLE 109

1-methyl-4-phenyl-5-nitroimidazole 4-phenylimidazole (9 grams) is added to a solution prepared by cautious addition of 5 cc. of 70% nitric acid to 75 ml. of acetic anhydride. The resulting mixture is heated on a steam bath for five minutes, then quenched by pouring into 500 ml. of water. The product, 4-phenyl-5-nitroimidazole, crystallizes slowly, is separated, washed with water, dried, and recrystallized from ethyl acetate.

4-phenyl-5-nitroimidazole (3.8 grams) is heated with 2 cc. of dimethyl sulfate at 165° C. for 40 minutes in an oil bath. The mixture is ooled, taken up in chloroform, and the resulting mixture extracted with 0.1 N HCl. solution. The acidic extract is re-extracted with chloroform, made slightly alkaline with sodium hydroxide solution, and finally thoroughly extracted again with chloroform. The final chloroform extract is dried (MgSO₄), concentrated, and the residue purified by recrystallization from ethyl acetate/hexane, affording 1-methyl-4-phenyl-5-nitroimidazole.

EXAMPLE 110

1-(2-chloroethyl)-5-nitro-2-imidazolylmethyl carbamate

A mixture of 17.5 grams of 1-(2-chloroethyl)-5-nitroimidazole, 15 grams of paraformaldehyde and 150 ml. of dimethylsulfoxide is heated for 18 hours in a sealed tube. The dimethylsulfoxide is removed in vacuo, and the residue is dissolved in water and extracted with chloroform. The chloroform extract is dried over sodium sulfate and concentrated. The concentrated residue is dissolved in ethyl acetate and the solution is passed over a column of alumina. The ethyl acetaate eluate afforded 1-(2-chloroethyl)-2-hydroxymethyl-5-nitroimidazole after evaporation and crystallization from ethyl acetate/hexane.

The 2-hydroxymethyl compound (4.1 grams) is dissolved in a mixture of 5 ml. of dimehtylaniline and 20 ml. of dioxane. The resulting solution is added dropwise to 30 ml. of phosgene dissolved in 100 cc. of dioxane. The resulting suspension is stirred for two hours in an ice bath, then for 2 hours at room temperature. Evaporation in vacuo below 30° C. affords the crude chloroformate ester. The total crude chloroformate, after removal of the solvent and excess phosgene, is cooled to −5° C. in a salt-ice bath, and 25 ml. of liquid ammonia is added. The mixture is then allowed to warm to room temperature as the ammonia evaporates. The resulting residue is chiefly 1-(2-chloroethyl)-5-nitro-2-imidazolylmethyl carbamate and ammonium chloride. 1-(2-chloroethyl)-5-nitro-2-imidazolylmethyl carbamate is obtained by recrystallization from aqueous ethanol.

EXAMPLE 111

2-carbamyloxymethyl-5-nitroimidazole-1-acetic acid

Ethyl 2 - carbamyloxymethyl-5-nitroimidazole-1-acetate (4.5 grams) is dissolved in 200 ml. of methanol. A solution of potassium carbonate (5 grams) in 20 ml. of water is added, and the clear solution is allowed to stand at room temperature for 24 hours. The mixture is acidified to pH 3 by the addition of dilute hydrochloric acid, and the solvent is removed in vacuo, while maintaining the temperature below 40° C. The residue is distributed between equal volumes (50 ml.) of water and methylethylketone, the organic layer is dried, concentrated in vacuo to afford the crude product. Upon recrystallization from ethyl acetate, 2-carbamyloxymethyl-5-nitroimidazole-1-acetic acid is obtained.

EXAMPLE 112

1-methyl-5-nitro-2-imidazolylmethyl-N-phenoxycarbamate 1-methyl-5-nitro - 2 - imidazolylmethyl chloroformate (2.2 grams) is dissolved in 10 cc. tetrahydrofuran. O-phenyl hydroxylamine hydrochloride (1.6 grams), dissolved in 6.5 cc. N,N-dimethylaniline, is added dropwise with stirring to the solution of the chloroformate, with ice-bath cooling throughout. After one hour, the ice bath is removed, and the mixture is allowed to stand at room temperature for an additional hour. The reaction mixture is diluted with water and acidified to pH 3.5 with dilute acetic acid, then extracted with ethyl acetate. Removal of the solvent in vacuo affords the crude product. Upon crystallization from aqueous ethanol, 1-methyl-5-nitro-2-imidazoloylmethyl-N-phenoxycarbamate is obtained.

The starting materials used in the aforementioned examples may be prepared in the following manner.

PREPARATION 1

1-butyl-5-nitroimidazole 24.2 g. (0.214 moles) of 4(5)-nitroimidazole is heated with 25.0 g. (0.11 mole) of n-butyl tosylate for one hour at 180–190° C. and cooled to give a hard solid. The mixture is shaken with 175 ml. of 2.5 N aqueous sodium hydroxide until it is dissolved and diluted with 175 ml. of water to give an oily precipitate. The mixture is extracted with ether; the ether extract washed with 2.5 N aqueous hydrochloric acid and water. The aqueous acid wash is treated with excess aqueous sodium hydroxide and extracted with ether. This latter ether extract is evaporated to dryness and recrystallized from petroleum ether to yield 1-butyl-5-nitroimidazole, M.P. 51–54° C.

In accordance with the above procedure but starting with methyl tosylate, ethyl tosylate and propyl tosylate in place of n-butyl tosylate, there is obtained the corresponding 1-methyl-5-nitroimidazole, 1-ethyl-5-nitroimidazole, and 1-propyl-5-nitroimidazole.

PREPARATION 2

1-allyl-5-nitroimidazole 14.0 g. (0.124 moles) of 4(5)-nitroimidazole is heated with 26.3 g. (0.124 moles) of allyl tosylate at 140–150° C. for 15 minutes and cooled. The resultant mixture is dissolved in 150 ml. of 2.5 N sodium hydroxide and diluted with 150 ml. of water. The mixture is extracted with ether and the ether extracts extracted with 2.5 normal aqueous hydrochloric acid. The acid extracts are made basic by the addition of excess aqueous sodium hydroxide and extracted with ether. This latter ether extract is evaporated to dryness to give 1-allyl-5-nitroimidazole as an oil. The 1-allyl-5-nitroimidazole is dissolved in 50 ml. of dry ether and added to a solution of 4.01 g. of p-toluene sulfonic acid hydrate and 200 ml. of ether, the mixture cooled in an ice bath and the precipitate removed by filtration. The precipitate is recrystallized from ethyl acetate to yield 1-allyl-5-nitroimidazolium-p-toluene sulfonate, M.P. 145–149° C.

PREPARATION 3

1-phenyl-5-nitroimidazole 10 g. (.069 mole) of 1-phenylimidazole is dissolved in 30 ml. of chloroform and the solution is stirred in an ice bath while 5 g. (.037 mole) of nitronium fluoborate is added in small portions over .5 hour. After stirring for .5 hour at room temperature, the two dark phases are diluted with 200 ml. of chloroform and the mixture extracted with an excess of 1 N hydrochloric acid. The chloroform extract is evaporated and the residue dissolved in acetone-ether (1:1) and chromatographed on 12 g. of a charcoal/Supercel mixture to yield 1-phenyl-5-nitroimidazole, M.P. 150–165° C. Sublimation at less than 1 mm. of mercury pressure and 120° C. raises the melting point to 160–170° C.

U.V. $\lambda_{max.}^{MeOH}$ 291.0 m$\mu$ $\epsilon$ 5,000

PREPARATION 4

1-p-nitrophenyl-5-nitroimidazole 1.98 g. (.0137 mole) of 1-phenylimidazole is dissolved in 6 ml. of concentrated sulfuric acid and 3.0 ml. (.07 mole) of fuming nitric acid is added slowly. The mixture is heated in an oil bath at 120° C. for 1 hour, cooled and poured into ice water. The mixture is extracted with chloroform to give a partly crystalline mixture. The aqueous acid phase is made basic and extracted with chloroform to give crystalline 1-p-nitrophenylimidazole. The acid insoluble fraction is repeatedly washed with small portions of chloroform, evaporation of the solvent is followed by filtration of an acetone solution of the residue through celite/charcoal. Evaporation, followed by recrystallization from methanol gives 1-p-nitrophenyl-5-nitroimidazole; M.P. 156.8–158° C.

U.V. $\lambda_{max.}^{MeOH}$ 275.0 m$\mu$ $\epsilon$ 13,100

PREPARATION 5

1-(2'-hydroxyethyl)-5-nitroimidazole 78 g. (0.615 mole) of 5-nitroimidazole is dissolved in 1500 ml. of acetic acid upon the addition of 72 ml. (0.57 mole) of boron trifluoride etherate. 175 ml.; (3.5 moles) of ethylene oxide in 175 ml. of hexane, in a dropping funnel topped with a cold finger, is added slowly over 1 hour to the above solution maintained at 32–35° C. with a water cooling bath. The mixture is concentrated under high vacuum to 100–150 ml. volume. The residue is diluted with 500 ml. of water, neutralized to pH 7 with aqueous sodium hydroxide, and extracted with 1.5 liters of ethyl acetate. The extract is dried and evaporated to yield 1-(2'-hydroxyethyl)-5-nitroimidazole. It is convenient to isolate the compound as the hydrochloride. Hydrogen chloride is passed through the ethyl acetate extract and 1-(2'-hydroxyethyl)-5-nitroimidazolium hydrochloride is isolated; M.P. 172–175° C.

In accordance with the above procedure but starting with 1,2-epoxypropane, 1,2-epoxybutane, 1,2-epoxypentane, 1,3-epoxypropane, 1,3-epoxybutane and 1,3-epoxypentane in place of ethylene oxide, there is obtained the corresponding 1-(2'-hydroxypropyl)-5-nitroimidazole, 1-(2' - hydroxybutyl)-5-nitroimidazole, 1 - (2'-hydroxypentyl)-5-nitroimidazole, 1 - (3'-hydroxypropyl)-5-nitroimidazole, 1-(3'-hydroxybutyl)-5-nitroimidazole, and 1-(3'-hydroxypentyl)-5-nitroimidazole.

PREPARATION 6

1-(2'-oxopropyl)-5-nitroimidazole 17.1 g., (0.1 mole) of 1-(2'-hydroxypropyl)-5-nitroimidazole is dissolved in 500 ml. of dimethylsulfoxide and heated with 8 ml. of dry pyridine and 4 ml. of trifluoroacetic acid and 61.8 g. (0.3 mole) of dicyclohexylcarbodiimide for 8 hours at 15–20° C. The mixture is treated with excess oxalic acid, filtered and the filtrate evaporated to dryness under vacuum of less than 1 mm. of mercury pressure. The mixture is taken up in water, neutralized with aqueous sodium hydroxide to pH 8–9 and extracted thoroughly with ethyl acetate. The extract after drying over sodium sulfate, is treated with dry gaseous hydrogen chloride and 1-(2'-oxopropyl)-5-nitroimidazolium hydrochloride (M.P. 198–200° C.) is precipitated and removed by filtration. This compound is converted to the free base (M.P. 100° C.) by stirring with a saturated solution of sodium bicarbonate.

In accordance with the above procedure, but starting with 1-(2'-hydroxybutyl)-5-nitroimidazole, 1-(2'-hydroxypentyl) - 5 - nitroimidazole, 1-(3'-hydroxybutyl)-5-nitroimidazole and 1-(3'-hydroxypentyl)-5-nitroimidazole, in place of 1-(2'-hydroxypropyl)-5-nitroimidazole, there is obtained the corresponding 1-(2'-oxobutyl)-5-nitroimidazole, 1-(2'-oxopentyl)-5-nitroimidazole, 1-(3'-oxobutyl) - 5-nitroimidazole and 1-(3'-oxopentyl)-5-nitroimidazole.

PREPARATION 7

1-(2-acetoxypropyl)-5-nitroimidazole 11.2 g., (.054 mole) of 1-(2'-hydroxypropyl)-5-nitroimidazolium hydrochloride is heated under reflux in 100 ml. of acetic anhydride for one hour. The mixture is then concentrated and the residue dissolved in ether. The ether solution treated with anhydrous hydrogen chloride to yield 1 - (2' - acetoxypropyl)-5-nitroimidazolium hydrochloride; M.P. 165–175° C.

PREPARATION 8

1-(2'-acetoxyethyl)-5-nitroimidazole 55 g., (0.35 mole) of 1-(2'-hydroxyethyl)-5-nitroimidazole is dissolved in 200 ml. of pyridine and treated with 50 ml. of acetic anhydride. The solution is heated under reflux for one hour and then concentrated under reduced pressure to yield 1-(2'-acetoxyethyl)-5-nitroimidazole; M.P. 61–62° C.

In accordance with the above procedure but starting with 1-(2'-hydroxybutyl)-5-nitroimidazole, 1-(2'-hydroxypentyl)-5-nitroimidazole, 1-(3'-hydroxybutyl)-5-nitroimidazole, 1-(3'-hydroxypentyl)-5-nitroimidazole, and 1-(3'-hydroxypropyl)-5-nitroimidazole in place of 1-(2'-hydroxyethyl)-5-nitroimidazole, there is obtained the corresponding 1 - (2'-acetoxybutyl)-5-nitroimidazole, 1-(2'-acetoxypentyl) - 5-nitroimidazole, 1-(3'-acetoxybtuyl)-5-nitroimidazole, 1-(3'-acetoxypentyl)-5-nitroimidazole, and 1-(3'-acetoxypropyl)-5-nitroimidazole.

In accordance with the above procedure but using propionic anhydride, butyric anhydride or valeric anhydride in place of acetic anhydride together with any of the aforementioned 1 - (2'-hydroxyalkyl)-5-nitroimidazoles, there is obtained the corresponding 1-(2'-alkanoyloxyalkyl)-5-nitroimidazole.

PREPARATION 9

1-(2'-benzoyloxyethyl)-5-nitroimidazole 55 g., (0.35 mole) of 1-(2'-hydroxyethyl)-5-nitroimidazole is dissolved in 150 ml. of water and added to a mixture of 100 ml. of benzoyl chloride and 300 ml. of 2.5 N aqueous sodium hydroxide and agitating vigorously for 3 hours. The mixture is then concentrated under reduced pressure, extracted with ether, the ether extract washed with sodium hydroxide, dried over sodium sulfate and evaporated to yield 1-(2'-benzoyloxyethyl)-5-nitroimidazole.

In accordance with the above procedure but starting with phenylacetyl chloride, propionyl chloride or valeryl chloride in place of benzoyl chloride, there is obtained the corresponding 1-(2'-phenylacetoxy ethyl)-5-nitroimidazole, 1-(2'-propionoxyethyl)-5-nitroimidazole and 1-(2'-valeroxyethyl)-5-nitroimidazole.

In accordance with the above procedure but starting with any of the 1-(2'-hydroxyalkyl)-5-nitroimidazoles produced in accordance with Preparation 5, there is obtained the corresponding 1-(2'-alkanoyloxyalkyl-5-nitroimidazole.

PREPARATION 10

1-ethoxyethyl-5-nitroimidazole 11.3 g., (0.1 mole) of 5-nitroimidazole is mixed thoroughly with 24.4 g. (0.1 mole) of β-ethoxyethyl tosylate and heated to between 185–195° C. for 30 minutes. The mixture is cooled and shaken with a mixture of chloroform and 2.5 N aqueous sodium hydroxide. The chloroform layer is set aside while the aqueous layer is extracted with chloroform. The combined chloroform extracts are washed with water, dried over sodium sulfate and the solvent removed under reduced pressure. The residue is dissolved in ether and washed through a column of alumina using ether as the eluant. Evaporation of the eluate yields 1-ethoxyethyl-5-nitroimidazole, $$\lambda_{max.}^{MeOH} \ 310.0 \ m\mu$$

In accordance with the above procedure but starting with methoxyethyl tosylate, propoxyethyl tosylate, butoxyethyl tosylate and benzyloxyethyl tosylate in place of ethoxyethyl tosylate, there is obtained the corresponding 1-methoxyethyl-5-nitroimidazole, 1-propoxyethyl-5-nitroimidazole, 1-butoxyethyl-5-nitroimidazole and 1-benzyloxyethyl-5-nitroimidazole.

PREPARATION 11

1-ethoxypropyl-5-nitroimidazole 11.3 g., (0.1 mole) of 5-nitroimidazole is mixed thoroughly with 25.8 g. (0.1 mole of β-ethoxypropyl tosylate and heated to between 185–195° C. for 30 minutes. The mixture is cooled and dissolved in a mixture of chloroform and 2.5 N aqueous sodium hydroxide. The chloroform layer is set aside, and the aqueous layer extracted with chloroform. The combined chloroform extracts are washed with water, dried over sodium sulfate and the solvent removed under reduced pressure. The residue is dissolved in ether and washed through a column of alumina using ether as the eluant. Evaporation of the eluate yields 1-ethoxypropyl-5-nitroimidazole.

In accordance with the above procedure but starting with ethoxybutyl tosylate or ethoxypentyl tosylate in place of ethoxypropyl tosylate, there is obtained the corresponding 1-ethoxybutyl-5-nitroimidazole and 1-ethoxypentyl-5-nitroimidazole.

PREPARATION 12

5-nitroimidazol-1-ylacetic acid 1.5 g., (0.1 mole) of 1-(2' - hydroxyethyl) - 5nitroimidazole is taken up in 15 ml. of water and treated with 5.2 ml. of a chromic acid/sulfuric acid mixture (composition 27 g. of chromium trioxide, 2.35 ml. of concentrated sulfuric acid made up to 100 ml. with water). The reaction mixture is heated to 70° C. for one hour and allowed to stand for 18 hours. The mixture is diluted with 200 ml. of water and extracted with chloroform. The solvent is removed under reduced pressure and the residue taken up in sodium hydroxide which is extracted with ether. The ether layer is discarded. The sodium hydroxide extract is acidified with acetic acid, extracted with chloroform and the chloroform extract evaporated under reduced pressure to yield 5-nitroimidazol-1-ylacetic acid; M.P. 225–230° C.

PREPARATION 13

5-nitroimidazole-1-ylacetic acid 15.7 g., (0.1 mole) of 1-(2'-hydroxyethyl)-5-nitroimidazole is dissolved in 500 ml. of dimethylsulfoxide and heated with 8 ml. of dry pyridine and 4 ml. of trifluoroacetic acid and 61.8 g. (0.3 moles) of dicyclohexylcarbodiimide for 8 hours at 15–20° C. The mixture is treated with excess oxalic acid, filtered and the filtrate evaporated to dryness at a temperature of 80–90° C. under vacuum of less than 1 mm. of mercury pressure. The mixture is taken up in water, neutralized with aqueous sodium hydroxide to pH 8–9 and extracted thoroughly with ethyl acetate. After drying over sodium sulfate, the ethyl acetate extract is treated with dry gaseous hydrogen chloride and 5-nitroimidazol-1- ylacetaldehyde hydrochloride is removed by filtration. 1.55 g., (0.01 mole) of the aldehyde hydrochloride is dissolved in 30 ml. of water and 4 ml. of 2.5 N aqueous sodium hydroxide added. 0.011 mole of sodium hypochlorite is added and the mixture allowed to stand at room temperature for 18 hours. The reaction mixture is then made acid with acetic acid and extracted with chloroform. The chloroform extract, after drying over sodium sulfate, is evaporated under reduced pressure to yield 5-nitroimidazol-1-ylacetic acid; M.P. 225–230° C.

In accordance with the above procedure but starting with 1-(3'-hydroxypropyl)-5-nitroimidazole in place of 1-(2'-hydroxyethyl)-5-nitroimidazole, there is obtained the corresponding 5-nitroimidazol-1-ylpropionic acid.

PREPARATION 14

Ethyl 5-nitroimidazol-1-ylacetate 22.6 g., (0.2 mole) of 5-nitroimidazole is dissolved in 250 ml. of nitromethane and 26 ml. (0.2 mole) of boron trifluoride etherate is added. The mixture is cooled to 0° C. and a solution of 25 ml. of diazoacetic ester in 25 ml. of nitromethane is added. An additional 12 ml. of diazoacetic acid is then added and the solution concentrated under reduced pressure. The residue is taken up in ethyl acetate and the ethyl acetate solution washed with ice cold aqueous dilute ammonia. A precipitate of 5-nitroimidazole is formed and is separated by filtration. The filtrate is thoroughly washed with water. After drying the ethyl acetate phase over sodium sulfate, dry hydrogen chloride gas is passed through the solution. Ethyl 5-nitroimidazol-1-yl-acetate hydrochloride; M.P. 165–175° C., is obtained as a crystalline precipitate.

The ester hydrochloride is dissolved in water from which ethyl 5-nitroimidazol-1-ylacetate; M.P. 76–77° C., crystallizes.

In accordance with the above procedure, but starting with methyl diazoacetate, propyl diazoacetate or benzyl diazoacetate in place of diazoacetic ester there is obtained the corresponding methyl, propyl and benzyl 5-nitroimidazol-1-ylacetates.

PREPARATION 15

Ethyl 5-nitroimidazol-1-ylpropionate 22.6 g. (0.2 mole) of 5-nitroimidazole is dissolved in 250 ml. of nitromethane and 26 ml. (0.2 mole) of boron trifluoride etherate is added. The mixture is cooled to 0° C. and a solution of 25 ml. of diazopropionic ester in 25 ml. of nitromethane is added. An additional 12 ml. of diazopropionic acid is then added and the solution concentrated under reduced pressure. The residue is taken up in ethyl acetate and the ethyl acetate solution washed with ice cold aqueous dilute ammonia. A precipitate of 5-nitroimidazole is formed and is separated by filtration. The filtrate is thoroughly washed with water. After drying the ethyl acetate phase over sodium sulfate, dry hydrogen chloride gas is passed through the solution. Ethyl 5-nitroimidazol-1-ylpropionate hydrochloride is obtained as a crystalline precipitate.

The ester hydrochloride is dissolved in water from which ethyl 5-nitroimidazol-1-ylpropionate crystallizes.

In accordance with the above procedure, but starting with methyl diazopropionate, propyl diazopropionate or benzyl diazopropionate in place of diazopropionic ester there is obtained the corresponding methyl-5-nitroimidazol-1-ylpropionate, propyl - 5 - nitroimidazol-1-ylpropionate, and benzyl-5-nitroimidazol-1-ylpropionate.

PREPARATION 16

5-nitroimidazol-1-ylacetic acid 10 g. (.05 mole) of ethyl-5-nitroimidazol-1-ylacetate dissolved in 50 ml. of methanol is treated with 50 ml. of 1 N potassium hydroxide (.05 mole) in 50 ml. of methanol. After ten minutes the solution is diluted with ether (50 ml.) which causes the potassium salt to crystallize. It is filtered, washed with 50% methanol-ether and dried.

This potassium salt is dissolved in 40 ml. of water and acidified slowly with concentrated hydrochloric acid to pH 2 or lower. The crystalline acid is filtered off, washed with water and dried; M.P. 226–228° C.

U.V. $\lambda_{max.}^{CH_3OH}$ 297.5 m$\mu$, 226.0 m$\mu$; $E_{1\,ml.}^{1\%}$ 458, 199

$\lambda_{max.}^{CH_3OH/HCl}$ 266.0 m$\mu$; $E_{1\,ml.}^{1\%}$ 335

PREPARATION 17

Ethyl 5-nitroimidazol-1-ylacetate 17.1 g. (0.1 mole) of 5-nitroimidazol-1-ylacetic acid is taken up in 200 ml. of ethanol and heated under reflux for 5 hours, during which time a slow stream of dry hydrogen chloride is passed through the reaction mixture. The ethanol is then removed by evaporation under reduced pressure and the residue recrystallized from acetone to yield ethyl 5-nitroimidazol - 1 - ylacetate hydrochloride; M.P. 165–175° C.

The ester hydrochloride is dissolved in water. On standing for 10 minutes, ethyl-5-nitroimidazol - 1 - ylacetate; M.P. 76–77° C., is precipitated in crystalline form and is isolated by filtration.

In accordance with the above procedure, but using methanol, propanol or butanol in place of ethanol, there is obtained the corresponding methyl, propyl or butyl ester.

In accordance with the above procedure but starting with 5-nitroimidazol-1-ylpropionic acid in place of 5-nitroimidazol-1-ylacetic acid, there is obtained the corresponding ethyl, methyl, propyl and butyl 5-nitroimidazol-1-ylpropionates.

PREPARATION 18

5-nitroimidazol-1-ylacetonitrile 3.4 g. (0.02 mole) of 5 nitroimidazol-1-ylacetamide in 50 ml. of dry benzene and 10 ml. of thionyl chloride are heated under reflux for 6 hours. The solvent and excess thionyl chloride are removed by evaporation under reduced pressure and the residue dissolved in chloroform. The chloroform is washed with dilute sodium carbonate solution and dried over sodium sulfate. Dry hydrogen chloride gas is introduced into the chloroform solution and 5-nitroimidazol-1-ylacetonitrile hydrochloride is isolated as a crystalline precipitate.

The 5-nitroimidazol - 1 - ylacetonitrile hydrochloride is treated with sodium bicarbonate solution. The mixture is extracted with ethyl acetate and the ethyl acetate removed under reduced pressure to yield 5-nitroimidazol-1-ylacetonitrile.

In accordance with the above procedure, but starting with 5-nitroimidazol-1-ylpropionamide in place of 5-nitroimidazol-1-ylacetamide, there is obtained the corresponding 5-nitroimidazol-1-ylpropionitrile.

PREPARATION 19

1-(2'-ethylthioethyl)-5-nitroimidazole

A mixture of 3.11 g. (0.01 mole) of 5-nitroimidazol-1-ylethyl p-toluenesulfonate and 1.03 g. (0.012 mole) of the potassium salt of ethanethiol in 20 ml. of dry dimethylformamide is heated at about 100° C. overnight. The reaction mixture is cooled and is poured into 500 ml. of ice water containing a slight excess of ammonia. The mixture is extracted with ethyl acetate. The extract is dried and concentrated leaving a residue of 1-(2'-ethylthioethyl)-5-nitroimidazole.

In accordance with the above procedure but starting with 5-nitroimidazol-1-ylpropyl tosylate and 5-nitroimidazol-1-ylbutyl tosylate in place of ethyl tosylate, there is obtained the corresponding 1-(3'-ethylthiopropyl)-5-nitroimidazole, 1-(4'-ethylthiobutyl)-5-nitroimidazole.

In accordance with the above procedure, but using the potassium salt of methanethiol, propanethiol, thiophenol and benzyl mercaptan in place of ethanethiol, there is obtained the corresponding 1-(2'-methylthioethyl)-5-nitroimidazole, 1-(2'-propylthioethyl)-5-nitroimidazole, 1-(2'-phenylthioethyl) - 5 - nitroimidazole and 1-(2'-benzylthioethyl)-5-nitroimidazole.

PREPARATION 20

1-(2'-ethylsulfinylethyl)-5-nitroimidazole

A solution of 1.0 g. (0.005 mole) of 1-(2'-ethylthioethyl)-5-nitroimidazole is cooled to about −20 to −30° C. and a cold solution of 55 ml. (0.0055 mole) of 0.1 N monoperphthalic acid in 1,2-dimethoxyethane is added. The mixture is kept overnight in the cold room. The mixture is concentrated to dryness at reduced pressure leaving a residue which, after neutralization with dilute ammonia, is extracted several times with chloroform. Evaporation of the chloroform extract leaves a residue of 1-(2'-ethylsulfinylethyl)-5-nitroimidazole.

In accordance with the above procedure, but starting with 1-(2'-ethylthiopropyl)-5-nitroimidazole,
1-(2'-ethylthiobutyl)-5-nitroimidazole,
1-(2'-methylthioethyl)-5-nitroimidazole,
1-(2'-propylthioethyl)-5-nitroimidazole,
1-(2'-phenylthioethyl)-5-nitroimidazole and
1-(2'-benzylthioethyl)-5-nitroimidazole, in place of 1-(2'-ethylthioethyl)-5-nitroimidazole, there is obtained the corresponding 1-(2'-ethylsulfinylpropyl)-5-nitroimidazole,
1-(2'-ethylsulfinylbutyl)-5-nitroimidazole,
1-(2'-methylsulfinylethyl)-5-nitroimidazole,
1-(2'-propylsulfinylethyl)-5-nitroimidazole,
1-(2'-phenylsulfinylethyl)-5-nitroimidazole, and
1-(2'-benzylsulfinylethyl)-5-nitroimidazole.

PREPARATION 21

5-nitroimidazol-1-ylethylethylsulfone

A mixture of 438 mg. (0.02 moles) of 1-(2'-ethylsulfinylethyl)-5-nitroimidazole, 2 ml. of glacial acetic acid and 2 ml. of 30% hydrogen peroxide is heated for 8 hours at 100° C. The solution is concentrated under reduced pressure (but not to dryness), water is added to the residue. 5-nitroimidazol-1-ylethylethylsulfone which precipitates its separated by filtration, washed with water and air dried.

In accordance with the above procedure but starting with 1-(2'-methylsulfinylethyl)-5-nitroimidazole,
1-(2'-propylsulfinylethyl)-5-nitroimidazole, 1-(2'-butylsulfinylethyl)-5-nitroimidazole,
1-(2'-methylsulfinylethyl)-5-nitroimidazole,
1-(2'-ethylsulfinylpropyl)-5-nitroimidazole,
1-(2-phenylsulfinylethyl)-5-nitroimidazole, and
1-(2'-benzylsulfinylethyl)-5-nitroimidazole, in place of 1-(2'-ethylsulfinylethyl)-5-nitroimidazole, there is obtained the corresponding 5-nitroimidazol-1-ylmethylethylsulfone,
5-nitroimidazol-1-ylpropylethylsulfone,
5-nitroimidazol-1-ylbutylethylsulfone,
5-nitroimidazol-1-ylethylmethylsulfone,
5-nitroimidazol-1-ylethylpropylsulfone,
5-nitroimidazol-1-ylethylphenylsulfone, and
5-nitroimidazol-1-ylethylbenzylsulfone.

PREPARATION 22

1-(2'-p-toluenesulfonyloxyethyl-5-nitroimidazole 20 g., (0.127 mole) of 1-(2'-hydroxyethyl)-5-nitroimidazole in 50 ml. of dry pyridine is reacted with 75 g. of p-toluene sulfonyl chloride at 15° C. for 4 hours. The reaction mixture is poured into ice and water and the crystalline precipitate is separated by filtration, washed with water and air dried to yield 1-(2'-p-toluenesulfonyloxyethyl)-5-nitroimidazole; M.P. 126–127° C.

In accordance with the above procedure, but starting with 1-(2'-hydroxy-propyl)-5-nitroimidazole,
1-(2'-hydroxy butyl)-5-nitroimidazole,
1-(2'-hydroxy pentyl)-5-nitroimidazole,
1-(3'-hydroxy propyl)-5-nitroimidazole,
1-(3'-hydroxy butyl)-5-nitroimidazole, and
1-(3'-hydroxy pentyl)-5-nitroimidazole, in place of 1-(2'-hydroxy ethyl)-5-nitroimidazole, there is obtained the corresponding 1-(2'-p-toluenesulfonyloxypropyl)-5-nitroimidazole,
1-(2'-p-toluenesulfonyloxybutyl)-5-nitroimidazole,
1-(2'-p-toluenesulfonyloxypentyl)-5-nitroimidazole,
1-(3'-p-toluenesulfonyloxypropyl)-5-nitroimidazole,
1-(3'-p-toluenesulfonyloxybutyl)-5-nitroimidazole, and
1-(3'-p-toluenesulfonyloxypentyl)-5-nitroimidazole.

PREPARATION 23

1-(2'-N-morpholinylethyl)-5-nitroimidazole 16 g., (.057 mole) of 1-(2'-p-toluenesulfonyloxyethyl)-5-nitroimidazole and 9.3 ml. of morpholine are heated at 95° C. for 4 hours. The reaction mixture is taken up in water and extracted with ether. Evaporation of the ether yields 1-(2'-N-morpholinylethyl)-5-nitroimidazole; M.P. 109–110° C.

In accordance with the above procedure, but starting with pyrrolidine, piperidine, dimethylamine, and diethylamine, in place of morpholine, there is obtained the corresponding 1 - (2'-N-pyrrolidinylethyl)-5-nitroimidazole, 1-(2'-N-piperidinylethyl)-5-nitroimidazole, 1-(2'-NN-dimethylaminoethyl)-5-nitroimidazole, and 1-(2'-NN-diethylaminoethyl)-5-nitroimidazole.

PREPARATION 24

1-methyl-2-hydroxymethyl-5-nitroimidazole 27.9 g. of 1-methyl-5-nitroimidazole and 30.1 g. of paraformaldehyde are added to 154 ml. of dimethylsulfoxide and the resulting solution is sealed into a glass-lined tube. The solution is heated at 110° C. for 24 hours, with shaking. The dimethylsulfoxide is removed by distillation at 53–56° C./2 mm. The residue is extracted with 3×150 ml. of hot benzene. The benzene extracts are combined and cooled to room temperature. 1-methyl-2-hydroxymethyl-5-nitroimidazole crystallizes, and is recovered by filtration. The yield of product is 23 g.; M.P. 112–114.5° C.

PREPARATION 25

1-[2'-(tetrahydropyran-2''-yloxy)ethyl]-2-hydroxymethyl-5-nitroimidazole 15.7 g., (0.1 mole) of 1-(2'-hydroxyethyl)-5-nitroimidazole is heated under reflux in 200 ml. of dihydropyran in the presence of 1 g. of p-toluene sulfonic acid for 12 hours. The solvent is removed by evaporation under reduced pressure. The residue is taken up in a mixture of chloroform and aqueous sodium bicarbonate. The chloroform phase after drying over sodium sulfate, is evaporated. The residue is dissolved in 75 ml. of dimethylsulfoxide containing 15 g. of paraformaldehyde, and the resulting solution is sealed into a glass-lined tube. The solution is heated at 110° C. for 24 hours, with shaking. The mass is then removed from the reaction vessel and the dimethylsulfoxide removed by distillation at 53–56° C./2 mm. The residue is extracted with 3×150 ml. of hot benzene. The benzene extracts are combined and concentrated to a small volume. 1-(2-hydroxymethyl-5-nitroimidazol-1-yl) ethyl tetrahydropyranyl ether crystallizes and is recovered by filtration.

PREPARATION 26

1-methyl-2-formyl-5-nitroimidazole 100 gm. (0.64 mole) of 1-methyl-2-hydroxymethyl-5-nitroimidazole is dissolved in 3500 ml. of benzene at 70° C. There is added over a 20 minute period 460 gm. of lead tetraacetate (previously washed with glacial acetic acetic acid and air dried in the dark). The reaction mixture is stirred at 78° C. for 8 hours during which time white, crystalline lead diacetate precipitates from the solution. The mixture is allowed to stand overnight at room temperature, and the lead diacetate then removed by filtration and washed with 2× 100 ml. of benzene. Then combined benzene filtrate and washes are extracted with two 1 liter portions of saturated aqueous potassium bicarbonate, then with 1500 ml. of water. The aqueous extracts are combined and extracted with 3× 2500 ml. portions of chloroform. The chloroform extracts are backwashed individually with 500 ml. of water and then combined with the benzene solution and evaporated in vacuo to dryness. The residue is dissolved in 500 ml. of 10% sulfuric acid and warmed on the steam cone at 75–90° C. for 35 minutes.

The acidic solution is then cooled to room temperature and neutralized with sodium bicarbonate. This aqueous solution is then extracted with 4× 2500 ml. portions of chloroform and each extract is backwashed in turn with 500 ml. of water. The organic extracts are combined and evaporated to dryness, in vacuo. The crystalline residue thus obtained is dissolved in a minimum volume of chloroform and filtered over about 250 gm. of silica gel. The silica gel is eluted with 7500 ml. of methylene dichloride. The eluate is evaporated in vacuo to give a residue of substantially pure 1-methyl-2-formyl-5-nitroimidazole. Recrystallization of the product from 500 ml. of boiling hexane affords 79 gm. of 1-methyl-2-formyl-5-nitroimidazole; M.P. 90–94° C.

PREPARATION 27

1-methyl-2-(1'-hydroxyethyl)-5-nitroimidazole

A solution of methyl magnesium iodide is prepared from 4.5 gm. of magnesium, 26.3 gm. of methyl iodide and 90 ml. of diethyl ether. 2.8 mg. of this solution is diluted with 15 ml. of ether, and added to a solution of 0.5 gm. of 1-methyl-2-formyl-5-nitroimidazole in 20 ml. of diethyl ether. The mixture is refluxed for 20 minutes. An additional 15 ml. of diethyl ether is then added, followed by 6.7 ml. of 0.5 N hydrochloric acid. The organic phase is separated, dried over sodium sulfate and evaporated to dryness in vacuo to give 0.27 g. of 1-methyl-2-(1'-hydroxyethyl)-5-nitroimidazole. This material is dissolved in ether, an equal volume of petroleum ether added, and the resulting solution evaporated to give crystalline 1-methyl-2-(1'-hydroxyethyl)-5-nitroimidazole.

The acidic aqueous layer is extracted with an equal volume of methylene chloride. The methylene chloride solution is evaporated to a residue which is dissolved in a minimum volume of methylene chloride. One-half volume of petroleum ether is added and the solution evaporated to give a residue of 1-methyl-2-(1'-hydroxyethyl)-5-nitroimidazole.

The solid products obtained are combined and dissolved in ethyl acetate. The solution is filtered through acid-washed alumina, and the filtrate evaporated to a small volume. 1-methyl-2 - (1' - hydroxyethyl) - 5-nitroimidazole crystallizes; M.P. 144–145° C. It is recrystallized from ethyl acetate to give pure 1-methyl-2-(1'-hydroxyethyl)-5-nitroimidazole; M.P. 145–147° C.

PREPARATION 28

1-methyl-2-(1'-hydroxyethyl)-5-nitroimidazole

To a solution of 1.5 g., (.01 mole) of 1-methyl-5-nitroimidazole-2-carboxaldehyde in 15 ml. of 1,2-dimethoxymethane at 0° C. containing 1.33 ml. of boron trifluoride etherate is added 0.9 g. of diazomethane in 50 ml. of diethyl ether solution dropwise over about 20 minutes. Nitrogen gas is evolved. After stirring for one hour of 0° C., the solution is allowed to warm gradually to room temperature. The solvent is evaporated. Chloroform (100 ml.) and 20 ml. of water (containing 5 ml. of 4 N ammonium hydroxide) are added to the residue. The chloroform layer is separated, washed with 10 ml. of water, dried over anhydrous sodium sulfate and evaporated. The residue is chromatographed on silica gel to give 1-methyl-2-acetyl-5-nitroimidazole; M.P. 98° C.

To 1.83 g., (0.01 mole) of 1-methyl-2-acetyl-5-nitroimidazole dissolved in 50 ml. of ethanol is added 0.38 g. of sodium borohydride. The solution is allowed to stand overnight at room temperature. Following the addition of a few drops of glacial acetic acid to destroy unreacted sodium borohydride, 20 ml. of water is added and the solution evaporated to about 20 ml. 1-methyl-2-(1'-hydroxyethyl) - 5-nitroimidazole is separated by filtration, washed with water and air dried.

In accordance with the above procedure but using diazoethane, diazopropane or phenyldiazomethane in place of diazomethane, there is obtained the corresponding 1 - methyl-2-(1'-hydroxypropyl) - 5 - nitroimidazole, 1-methyl-2-(1'-hydroxybutyl) - 5 - nitroimidazole, and 1-methyl-2-(1'-hydroxy-phenethyl)-5-nitroimidazole.

PREPARATION 29

α-(1-methyl-5-nitroimidazol-2-yl)benzyl alcohol 6 g. of 2-benzylimidazole is added to 17 ml. of concentrated nitric acid in 75 ml. of acetic anhydride and cooled in an ice bath. The reaction mixture is warmed on a steam bath for 30 minutes, and then poured into crushed ice. The crude product is extracted with 3×100 ml. of chloroform. The combined chloroform extract is washed with 3×15 ml. water, dried over anhydrous sodium sulfate and evaporated to dryness. The residue dissolved in 50 ml. acetone. The addition of diethyl ether to the cloud-point results in the crystallization of 2-benzyl-4(5)-nitroimidazole.

2.03 g. of 2-benzyl-4(5)-nitroimidazole and 1.3 g. of dimethyl sulfate are heated for 30 minutes at 120° C. After cooling, 100 ml. of chloroform and 10 ml. of 4 N sodium hydroxide solution are added. The chloroform extract after washing with 3×10 ml. of water is dried over anhydrous sodium sulfate and evaporated. The crude 1-methyl-2-benzyl-5-nitromidazole is purified by recrystallization from ethanol.

3.22 g. of 1-methyl-2-benzyl-5-nitroimidazole is dissolved in a mixture of 45 ml. of water and 15 ml. of sulfuric acid.

5.25 g. of sodium dichromate dihydrate in 30 ml. of water is added. 75 ml. of sulfuric acid is added so as to maintain the temperature between 75 and 90° C. Heating is continued for one hour at about 70° C. The reaction mixture is poured onto crushed ice and concentrated sodium hydroxide is added to neutrality. The product, 1-methyl-2-benzoyl-5-nitroimidazole, is filtered.

To 2.15 g. of 1-methyl-2-benzoyl-5-nitroimidazole in 100 ml. of ethanol is added 0.28 g. of sodium borohydride. The mixture is allowed to stand overnight. After the addition of a few drops of glacial acetic acid, 25 ml. of water is added and the ethanol evaporated. The product, α-(1-methyl-5-nitroimidazol-2-yl)benzyl alcohol is removed by filtration.

PREPARATION 30

2-(1-methyl-5-nitroimidazol-2-yl)-ethanol

A mixture of 70 g. (0.5 mole) of 1,2-dimethyl-5-nitroimidazole, 75 g. (2.5 mole) of paraformaldehyde, and 1 liter of dry dimethylsulfoxide is heated in a glasslined, rocking autoclave at 120–150° C. overnight. The bulk of the dimethylsulfoxide is removed at reduced pressure. The residue is dissolved in 400 ml. of 2.5 N hydrochloric acid, and the solution is exhaustively extracted with chloroform to remove the rest of the dimethylsulfoxide. The aqueous phase is adjusted to pH 7.5 by the addition of 50% sodium hydroxide solution, and is again extracted exhaustively with chloroform. The extract is dried and concentrated leaving an oily residue which soon crystallizes. The solid is dissolved in a little ethyl acetate, and the solution is charged to a column of alumina. Elution with ethyl acetate and evaporation of the solvent yields 2 - (1 - methyl-5-nitroimidazol-2-yl)-ethanol; M.P. 149–151° C.;

$\lambda_{max.}^{MeOH}$ 310 m$\mu$ ($\epsilon$, 8800); 2-(1-methyl-5-nitroimidazol-2-yl)propan-1,3-diol; M.P. 123–125° C.;

$\lambda_{max.}^{MeOH}$ 310 m$\mu$ ($\epsilon$, 9000); and 2-(1-methyl-5-nitroimidazol-2-yl)prop-2-en-1-ol; M.P. 140–142° C.;

$\lambda_{max.}^{MeOH}$ 221 m$\mu$ ($\epsilon$, 9900), 315 m$\mu$, ($\epsilon$, 9700).

PREPARATION 31

3-(1-methyl-5-nitroimidazol-2-yl)prop-2-en-1-ol

A mixture of 0.155 g., (0.001 mole) 1-methyl-2-formyl-5-nitroimidazole, 0.304 g. (0.001 mole) of formylmethyltriphenylphosphorane in 6 ml. of benzene is heated under reflux for 18 hours. The solvent is removed under pressure to give a crystalline residue which is dissolved in 75 ml. of ether. The solution is washed with 1 N aqueous hydrochloric acid. The hydrochloric acid fraction is made basic by the addition of excess potassium bicarbonate and the resulting aqueous solution extracted with ether. The ether extract is dried and the solvent removed. The residue is taken up in warm benzene and chromatographed on silica gel. Elution with ether followed by recrystallization from ethanol yields 3-(1-methyl-5-nitroimidazol-2-yl)-prop-2-en-1-al; M.P. 147–149° C.

PREPARATION 32

3-(1-methyl-5-nitroimidazol-2-yl)prop-2-en-1-ol 8.29 g., (0.046 mole) 3-(1-methyl-5-nitroimidazol-2-yl)prop-2-en-1-ol is taken up in 2.2 liters of ethanol and 0.97 g., (.026 mole) of sodium borohydride in 20 ml. of water is added and the mixture allowed to stand for 5 hours. The reaction mixture is then made neutral to pH paper by the addition of 7 ml. of glacial acetic acid, and concentrated under reduced pressure to 35 ml. The solids are separated by filtration. The product is recrystallized from butanol to yield 3-(1-methyl-5-nitroimidazol-2-yl)prop-2-en-1-ol; M.P. 132–134° C.

PREPARATION 33

3-(1-methyl-5-nitroimidazol-2-yl)propanol

A mixture of 200 mg. (0.001 mole) of 3-(1-methyl-5-nitroimidazol - 2 - yl) - prop - 2 - en - 1 - ol and 430 mg. (0.0022 mole) of potassium azodicarboxylate in 15 ml. of methanol is stirred under nitrogen at 15° C. Glacial acetic acid (0.264 ml., 0.0044 mole) is added and the resulting solution is stirred overnight. The solvent is removed at reduced pressure. The residue is dissolved in 5 ml. of water and the solution is extracted continuously with chloroform for 1–2 hours. The extract is dried and concentrated leaving a residue. The residue crystallizes on addition of water to yield 3 - (1 - methyl - 5 - nitroimidazol - 2 - yl)propanol; M.P. 170–175° C.

PREPARATION 34

1-methyl-2-chloromethyl-5-nitroimidazole 1.0 gm. (0.0064 mole) of 1 - methyl - 2 - hydroxymethyl - 5 - nitroimidazole is dissolved in 100 ml. of refluxing benzene. To this hot solution is aded 20 ml. of thionyl chloride. The solution is warmed on a steam cone for 20 minutes and then evaporated to dryness in vacuo. The residue of 1-methyl-2-chloromethyl-5-nitroimidazole hydrochloride thus obtained is flushed several times with benzene to remove traces of thionyl chloride. (The 1 - methyl - 2 - chloromethyl - 5 - nitroimidazole hydrochloride prepared in this manner is suitable for synthetic purposes without further purification). It is further purified as follows: It is dissolved in 25 ml. of water and the solution made slightly alkaline (pH 8–9) with dilute sodium hydroxide and extracted with 3× 100 ml. of chloroform. The chloroform extracts are combined, backwashed with water and evaporated in vacuo to dryness to give substantially pure 1-methyl-2-chloromethyl-5-nitroimidazole.

The 1 - methyl - 2 - chloromethyl - 5 - nitroimidazole is characterized as the p-toluene sulfonic acid salt: To a 20% (w./w.) solution of the imidazole in chloroform there is added a solution of excess p-toluene sulfonic acid in ether. The 1 - methyl-2-chloromethyl-5-nitroimidazole p-toluene sulfonic acid salt precipitates and is recovered by filtration and dried to substantially pure material; M.P. 153–155° C.

In accordance with the above procedure, but using thionyl bromide in place of thionyl chloride, there is obtained the corresponding 1 - methyl - 2 - bromomethyl-5-nitroimidazole.

PREPARATION 35

1-methyl-2-p-toluenesulfonyloxymethyl-5-nitroimidazole

To a solution of 1.57 g. (0.01 mole) of 1-methyl-2-hydroxymethyl - 5 - nitroimidazole in 10 ml. of dry pyridine, cooled to −20° C., is added 1.90 g. (0.01 mole) of p-toluenesulfonyl chloride. The mixture is kept at −20° C. overnight. After the addition of 20 ml. of ice-water, the solid product is removed by filtration.

In accordance with the above procedure, but starting with methane sulfonyl chloride in place of p-toluene sulfonyl chloride, there is obtained the corresponding 1-methyl - 2 - methanesulfonyloxymethyl - 5 - nitroimidazole.

PREPARATION 36

1-methyl-2-mercaptomethyl-5-nitroimidazole 250 mg. of 1 - methyl - 2 - chloromethyl - 5 - nitroimidazole and 106 mg. of thiourea are added to 2 ml. of dry ethanol, and the resulting mixture refluxed for 17 hours. At the end of this time the mixture is cooled to about 15° C. and the solid material removed by filtration. 1.26 g. of 1 - methyl - 5 - nitroimidazol - 2 - yl-methyl isothiouronium chloride is added to 20 ml. of water and 2 ml. of 2.5 N sodium hydroxide in a nitrogen atmosphere. The mixture is heated at 55° C. for 15 minutes. At the end of this time the mixture is cooled to room temperature and extracted with three 10 ml. portions of chloroform. The chloroform extracts are combined and concentrated to dryness to give 1-methyl-2-mercaptomethyl-5-nitroimidazole suitable for use in making carbamates.

PREPARATION 37

1-methyl-5-nitroimidazol-2-ylmethyl-phenyl carbonate 15.9 ml. dry pyridine and 4.87 g. (0.031 mole) of 1-methyl - 2 - hydroxymethyl - 5 - nitroimidazole are added to a flask fitted with a stirrer, thermometer and addition funnel. The mixture is stirred at room temperature until the solid dissolves and then cooled to 0° C. 5.05 g. (0.0322 mole) of phenylchloromormate is added to the stirred solution over and 80 minute period, while maintaining the temperature at 5–10° C. with external cooling. On completion of the addition the reaction mixture is stirred at about 25° C. for 2½ hours. It is then poured into 60 ml. of ice-water with good agitation. The resulting slurry is stirred for 40 minutes and the resulting solid 1-methyl-5-nitroimidazole-2-ylmethyl phenyl carbonate collected by filtration. The solid is washed thoroughly with water and dried in vacuo at 50° C. A yield of 8.24 g. is obtained; M.P. 92–95° C. Recrystallization from 1:3 methanol-hexane gives pure product; M.P. 100–100.5° C.

In accordance with the above procedure, but starting with 1 - methyl - 2 - mercaptomethyl - 5 - nitroimidazole, in place of 1 - methyl - 2 - hydroxymethyl - 5 - nitroimidazole, there is obtained the corresponding 1-methyl-5-nitroimidazol-2-yl-methyl phenyl thiocarbonate.

In accordance with the above procedure, but starting with 1 - methyl - 2 - (1 - hydroxyethyl) - 5 - nitroimidazole, 1 - methyl - 2 - (2 - hydroxyethyl) - 5 - nitroimidazole and 3 - (1 - methyl - 5 - nitroimidazol - 2 - yl) prop-2-en-1-ol in place of 1-methyl-2-hydroxymethyl-5-nitroimidazole, there is obtained the corresponding 1-(1-methyl - 5 - nitroimidazol - 2 - yl) - ethylphenyl carbonate, 2 - (1 - methyl - 5 - nitroimidazol - 2 - yl) - ethylphenyl carbonate, and 3 - (1 - methyl - 5 - nitroimidabol-2-yl)prop-2-en-1-yl phenyl carbonate.

PREPARATION 38

1-methyl-5-nitroimidazol-2-ylmethylphenyl thiocarbonate 5.17 g. phenoxythiocarbonyl chloride is added dropwise to a cold solution of 4.71 g. of 1-methyl-2-hydroxymethyl-5-nitroimidazole in 15 ml. of pyridine. During addition the pyridine solution is cooled in an ice bath. After about one-third of the carbonyl chloride is added, 10 ml. of pyridine is added to the reaction mixture. On completion of the addition, the mixture is allowed to warm to room temperature and stirred for three and one-half hours. It is then poured into about an equal volume of an ice-water mixture. A gummy precipitate forms. The water is decanted from this precipitate and the solid triturated with 70 ml. of methanol. Water (70 ml.) is added and the solid product removed by filtration. It is recrystallized from benzene-hexane to give 1-methyl-5-nitroimidazol-2-ylmethyl phenyl thionocarbonate; M.P. 92–98° C. On further recrystallization from benzene-hexane the product melts at 103–105° C.

In accordance with the above procedure, but starting with 1 - methyl - 2 - mercaptomethyl - 5 - nitroimidazole in place of 1 - methyl - 2 - hydroxymethyl - 5 - nitroimidazole, there is obtained the corresponding 1-methyl-5-nitroimidazol-2-ylmethyl phenyl dithiocarbonate.

What is claimed is:
1. A compound having the formula

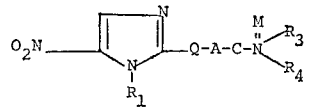

wherein Q is lower alkylene or lower alkylidene; A and M are each oxygen or sulfur; $R_1$ is lower alkyl or substituted lower alkyl wherein said substituent is lower alkenyl, hydroxy, loweralkanoyloxy, lower alkoxy, phenyl lower alkoxy, lower alkylthio, phenyl lower alkylthio, dilower alkylamino, or loweralkylsulfonyl; and $R_3$ and $R_4$ are each hydrogen or lower alkyl.

2. A compound according to claim 1 having the designation 1 - (2' - acetoxyethyl) - 5 - nitroimidazol - 2 - ylmethyl carbamate.

3. A compound of claim 1 having the designation 1-(2'-hydroxyethyl)-5-nitroimidazol-2-ylmethyl carbamate.

4. A compound having the formula

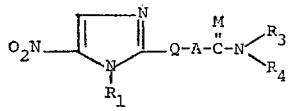

wherein $R_1$ is lower alkyl; Q is lower alkylene or lower alkylidene; A and M are each oxygen or sulfur; and $R_3$ and $R_4$ are each hydrogen, lower alkyl; or $R_3$ and $R_4$ together are morpholino, thiamorpholino, piperidino, piperazino, 4-methyl-piperazino, or pyrrolidino.

5. A compound of claim 4 having the designation 1-methyl-5-nitroimidazol-2-yl-4-morphonoline carboxylate.

6. A compound having the formula

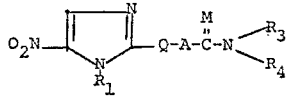

wherein $R_1$ is lower alkyl; Q is lower alkylene or lower alkylidene; A and M are each oxygen or sulfur, and $R_3$ and $R_4$ are each hydrogen or lower alkyl.

7. A compound according to claim 6 having the designation 1-methyl-5-nitroimidazol-2-ylmethyl carbamate.

8. A compound of claim 6 having the designation 1-methyl-5-nitroimidazol-2-ylmethyl thiolcarbamate.

9. A compound of claim 6 having the designation 1-methyl-5-nitroimidazol-2-ylmethylthiocarbamate.

10. A compound of claim 6 having the designation 1-(1'-methyl-5'-nitroimidazol-2'-yl)ethyl carbamate.

11. A compound of claim 6 having the designation 1-ethyl-5-nitroimidazol-2-ylmethyl carbamate.

12. A compound of claim 6 having the designation 2-(1'-methyl-5'-nitroimidazol-2'-yl)-ethyl carbamate.

13. A compound of claim 6 having the designation 1-methyl-5-nitroimidazol-2-ylmethyl N-methylcarbamate.

14. A compound of claim 6 having the designation 1-methyl-5-nitroimidazol-2-ylmethyl N-methylthioncarbamate.

References Cited
UNITED STATES PATENTS

| | | | |
|---|---|---|---|
| 3,299,090 | 1/1967 | Hoff et al. | 260—309 |
| 3,325,507 | 6/1967 | Kollonitsch | 260—309 |
| 3,378,552 | 4/1968 | Henry | 260—309 |
| 3,458,258 | 7/1969 | Gal | 260—309 |

NATALIE TROUSOF, Primary Examiner

U.S. Cl. X.R.

99—4; 260—240 A, 243 B, 247.1, 247.2 A, 247.5, 268 C, 268 H, 268 BC, 293.4 H, 293.4 R, 293.4 C, 294.3 B, 294.7 G, 294.7 B, 309, 309.7; 424—246, 248, 250, 267, 273

UNITED STATES PATENT OFFICE
CERTIFICATE OF CORRECTION

Patent No. 3,646,027          Dated February 29, 1972

Inventor(s) John A. Carlson, Dale R. Hoff, & Clarence S. Rooney

It is certified that error appears in the above-identified patent and that said Letters Patent are hereby corrected as shown below:

In Column 75, Claim 5, line 2, "morphonoline" should read -- morpholine --.

In Column 76, Claim 9, line 2, "ylmethylthiocarbamate" should read -- ylmethylthioncarbamate --.

Signed and sealed this 4th day of July 1972.

(SEAL)
Attest:

EDWARD M. FLETCHER, JR.　　　　　　　　ROBERT GOTTSCHALK
Attesting Officer　　　　　　　　　　　Commissioner of Patents